US011955057B2

(12) United States Patent
Kim et al.

(10) Patent No.: US 11,955,057 B2
(45) Date of Patent: Apr. 9, 2024

(54) DISPLAY APPARATUS

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Jinho Kim, Suwon-si (KR); Yong-Sang Kim, Suwon-si (KR); Donggun Oh, Suwon-si (KR); Eun Kyo Jung, Suwon-si (KR); Jungwoo Lee, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 197 days.

(21) Appl. No.: 17/552,083

(22) Filed: Dec. 15, 2021

(65) Prior Publication Data

US 2022/0319397 A1 Oct. 6, 2022

Related U.S. Application Data

(63) Continuation of application No. PCT/KR2021/014188, filed on Oct. 14, 2021.

(30) Foreign Application Priority Data

Mar. 30, 2021 (KR) ........................ 10-2021-0041378

(51) Int. Cl.
*G09G 3/32* (2016.01)

(52) U.S. Cl.
CPC ......... *G09G 3/32* (2013.01); *G09G 2310/061* (2013.01); *G09G 2310/08* (2013.01);
(Continued)

(58) Field of Classification Search
CPC ...... G09G 3/32; G09G 3/3233; G09G 3/3241; G09G 3/325; G09G 3/3258; G09G 3/3283;
(Continued)

(56) References Cited

U.S. PATENT DOCUMENTS 9,135,855 B2 9/2015 Kawae et al.
9,349,313 B2 5/2016 Kawae et al.
(Continued)

FOREIGN PATENT DOCUMENTS

JP 2020-98187 A 6/2020
KR 10-2014-0022345 A 2/2014
(Continued)

OTHER PUBLICATIONS

International Search Report (PCT/ISA/210) and Written Opinion (PCT/ISA/237) dated Jan. 25, 2022 issued by the International Searching Authority in International Application No. PCT/KR2021/014188.

*Primary Examiner* — Benjamin C Lee
*Assistant Examiner* — Nathan P Brittingham
(74) *Attorney, Agent, or Firm* — Sughrue Mion, PLLC

(57) ABSTRACT

A display apparatus includes display panel including a pixel array in which pixels, each of which including a plurality of inorganic light emitting elements, are disposed in a plurality of row lines, and sub pixel circuits corresponding to inorganic light emitting elements of the pixel array, a driving unit configured to set an image data voltage sequentially to the sub pixel circuits based on a first driving voltage, and drive the sub pixel circuits so that a driving current corresponding to the set image data voltage is provided sequentially to the inorganic light emitting elements of the pixel array based on a second driving voltage; a sensing unit configured to sense a current flowing through a driving
(Continued)

transistor included in each of the sub pixel circuits based on a specific voltage which is applied to the sub pixel circuits, and output sensing data corresponding to the sensed current; and a correction unit configured to correct an image data voltage to be applied to each of the sub pixel circuits based on the sensing data, wherein the first driving voltage and the second driving voltage are applied to the sub pixel circuits through a first wiring and a second wiring, respectively, the first wiring and the second wiring being separate wirings.

13 Claims, 39 Drawing Sheets

(52) U.S. Cl.
CPC ............... *G09G 2320/0209* (2013.01); *G09G 2320/0233* (2013.01); *G09G 2320/064* (2013.01)

(58) Field of Classification Search
CPC ............... G09G 3/3291; G09G 3/2081; G09G 2310/061; G09G 2310/08; G09G 2320/0233; G09G 2320/064
See application file for complete search history.

(56) References Cited

U.S. PATENT DOCUMENTS

| | | | | |
|---|---|---|---|---|
| 10,467,960 | B2 | 11/2019 | Do et al. | |
| 10,643,539 | B2 | 5/2020 | Yang et al. | |
| 10,657,902 | B2 | 5/2020 | Lee et al. | |
| 10,770,007 | B2 | 9/2020 | Kim et al. | |
| 10,777,140 | B2 | 9/2020 | Kim et al. | |
| 10,825,380 | B2 | 11/2020 | Kim et al. | |
| 10,937,373 | B2 | 3/2021 | Baek | |
| 11,056,047 | B2 | 7/2021 | Shigeta et al. | |
| 2014/0049182 | A1 | 2/2014 | Kawae et al. | |
| 2014/0152709 | A1 | 6/2014 | Kawae et al. | |
| 2018/0151132 | A1 | 5/2018 | Lee et al. | |
| 2019/0371231 | A1 | 12/2019 | Kim et al. | |
| 2020/0105195 | A1* | 4/2020 | Song | G09G 3/3241 |
| 2020/0106976 | A1 | 4/2020 | Lee et al. | |
| 2020/0265777 | A1 | 8/2020 | Shigeta et al. | |
| 2020/0394953 | A1 | 12/2020 | Kim et al. | |
| 2021/0210003 | A1 | 7/2021 | Kim et al. | |
| 2021/0304670 | A1 | 9/2021 | Shigeta et al. | |
| 2022/0199033 | A1* | 6/2022 | Hong | G09G 3/3266 |
| 2023/0351958 | A1* | 11/2023 | Liu | H01L 27/1222 |

FOREIGN PATENT DOCUMENTS

| | | | |
|---|---|---|---|
| KR | 20170080138 | A * | 12/2015 |
| KR | 10-2018-0023188 | A | 3/2018 |
| KR | 10-2018-0050083 | A | 5/2018 |
| KR | 10-2018-0057285 | A | 5/2018 |
| KR | 10-2018-0125761 | A | 11/2018 |
| KR | 10-1998174 | B1 | 7/2019 |
| KR | 10-2019-0140760 | A | 12/2019 |
| KR | 1020190136882 | A | 12/2019 |
| KR | 10-2020-0050585 | A | 5/2020 |
| KR | 10-2020-0064617 | A | 6/2020 |
| KR | 102122179 | B1 | 6/2020 |
| KR | 1020200101605 | A | 8/2020 |
| KR | 10-2156776 | B1 | 9/2020 |
| KR | 1020200144039 | A | 12/2020 |
| KR | 10-2021-0007508 | A | 1/2021 |
| KR | 10-2021-0087867 | A | 7/2021 |
| KR | 10-2312350 | B1 | 10/2021 |
| WO | 2020/056672 | A1 | 3/2020 |

* cited by examiner

DISPLAY APPARATUS

CROSS-REFERENCE TO RELATED APPLICATION(S)

This application is a bypass continuation of International Application No. PCT/KR2021/014188, filed on Oct. 14, 2021, which is based on and claims priority to Korean Patent Application No. 10-2021-0041378, filed on Mar. 30, 2021, in the Korean Intellectual Property Office, the disclosures of which are incorporated by reference herein in their entireties.

BACKGROUND

1. Field

The disclosure relates to a display apparatus and, more particularly to, a display apparatus including a pixel array including self-emitting elements.

2. Description of Related Art

In a related art display apparatus where an inorganic light emitting element such as a red light emitting diode (LED), a green LED, and a blue LED (hereinafter, LED refers to an inorganic light emitting element) is driven as a sub pixel, a gray scale of a sub pixel is represented by a pulse amplitude modulation (PAM) driving method.

In this example, depending on the magnitude of a driving current, the wavelength as well as a gray scale of emitted light may change, resulting in decrease in color reproducibility of an image.

Each sub pixel is driven through a sub pixel circuit including a driving transistor. A threshold voltage Vth or mobility μ of the driving transistor may be different for each driving transistor. This results in a decrease in the luminance uniformity of the display apparatus and thus is problematic.

In addition, when the driving current flows, it is necessary to compensate the influence of the drop of the driving voltage generated differently for each position of the display panel to the setting of the data voltage.

SUMMARY

One or more embodiments provide a display apparatus for providing improved color reproducibility with respect to an input image signal and a driving method thereof.

One or more embodiments provide a display apparatus including sub pixel circuits capable of driving an inorganic light emitting element more efficiently and stably, and a driving method thereof.

One or more embodiments provide a display apparatus including a driving circuit suitable for high density integration by optimizing a design of various circuits driving an inorganic light emitting element, and a driving method thereof.

One or more embodiments provide a display apparatus capable of solving a problem of deterioration of luminance uniformity due to a threshold voltage or mobility nonconformity of a driving transistor, and compensating for an effect of a drop of a driving voltage generated differently for each position of the display panel in a setting process of a data voltage, and a method for driving thereof.

One or more embodiments improve luminance non-uniformity and horizontal crosstalk problems by a sweep load.

In accordance with an aspect of an embodiment, there is provided a display apparatus including a display panel including a pixel array in which pixels, each of which including a plurality of inorganic light emitting elements, are disposed in a plurality of row lines, and sub pixel circuits corresponding to of inorganic light emitting elements of the pixel array, a driving unit configured to set an image data voltage sequentially to the sub pixel circuits based on a first driving voltage, and drive the sub pixel circuits so that a driving current corresponding to the set image data voltage is provided sequentially to the inorganic light emitting elements of the pixel array based on a second driving voltage, a sensing unit configured to sense a current flowing through a driving transistor included in each of the sub pixel circuits based on a specific voltage which is applied to the sub pixel circuits, and output sensing data corresponding to the sensed current, and a correction unit configured to correct an image data voltage to be applied to each of the sub pixel circuits based on the sensing data, wherein the first driving voltage and the second driving voltage are applied to the sub pixel circuits through a first wiring and a second wiring, respectively, the first wiring and the second wiring being separate wirings.

The driving unit is configured to set the image data voltage to the sub pixel circuits in an order of the plurality of row lines, and drive the sub pixel circuits so that the driving current corresponding to the set image data voltage is provided in the order of the plurality of row lines to the inorganic light emitting elements of the pixel array.

The sub pixel circuits are driven in an order of a data setting period and a plurality of light emitting periods for each of the plurality of row lines, and the driving unit is configured to set the image data voltage to sub pixel circuits of a row line among the plurality of row lines in the data setting period, and drive the sub pixel circuits of the row line so that the driving current is provided to inorganic light emitting elements of the row line, in each of the plurality of light emitting periods.

A first light emitting period among the plurality of light emitting periods is temporally consecutive with the data setting period, and the plurality of light emitting periods are spaced apart by a preset time interval.

The driving transistor includes a first driving transistor and a second driving transistor, and each of the sub pixel circuits includes: a constant current generator circuit which includes the first driving transistor and configured to provide the driving current of a magnitude corresponding to a voltage difference between a source terminal and a gate terminal of the first driving transistor, to a corresponding inorganic light emitting element through the first driving transistor, and a pulse width modulation (PWM) circuit which includes the second driving transistor and configured to control a time at which the driving current is provided to the corresponding inorganic light emitting element based on a voltage difference between the source terminal and the gate terminal of the second driving transistor, wherein the image data voltage includes a constant current generator data voltage and a PWM data voltage, and wherein the driving unit is further configured to set the constant current generator data voltage and the PWM data voltage, respectively, to the gate terminal of the first driving transistor and the second driving transistor during the data setting period.

The first driving voltage is applied to the source terminal of the first driving transistor and the second driving transistor during the data setting period, and wherein the second driving voltage is applied to the source terminal of the first driving transistor and the first driving voltage is applied to the source terminal of the second driving transistor during the plurality of light emitting periods.

Each of the sub pixel circuits further includes a driving voltage changing unit, and the driving unit is further configured to control the driving voltage changing unit to apply the first driving voltage to the source terminal of the first driving transistor in the data setting period and apply the second driving voltage to the source terminal of the first driving transistor in the plurality of light emitting periods.

The constant current generator circuit further includes: a capacitor connected between the source terminal and the gate terminal of the first driving transistor, wherein the voltage difference between the source terminal and the gate terminal of the first driving transistor is maintained through the capacitor regardless of change in the driving voltage applied to the source terminal of the first driving transistor.

Each of the sub pixel circuits further includes a first transistor including a gate terminal connected to a drain terminal of the second driving transistor and a source terminal connected to a drain terminal of the first driving transistor in the plurality of light emitting periods, wherein the constant current generator circuit is further configured to provide the driving current flowing through the first driving transistor to the inorganic light emitting element while the first transistor is turned on, and wherein the PWM circuit is further configured to turn off the first transistor, based on the second driving transistor being turned on based on a sweep voltage applied in a state where the PWM data voltage is set to the gate terminal of the second driving transistor.

The PWM circuit includes a reset unit to turn on the first transistor before each of the plurality of light emitting periods starts.

The specific voltage includes a first specific voltage applied to the constant current generator circuit and a second specific voltage applied to the PWM circuit, and the sensing unit is further configured to: sense a first current flowing through the first driving transistor based on the first specific voltage and output first sensing data corresponding to the first current, and sense a second current flowing through the second driving transistor based on the second specific voltage and output second sensing data corresponding to the second current.

Each of the sub pixel circuits further includes: a second transistor to transfer the first current to the sensing unit; and a third transistor to transfer the second current to the sensing unit, wherein each of the sub pixel circuits is further configured to: provide the first current to the sensing unit through the second transistor which is turned-on while the first specific voltage is applied to the constant current generator circuit, and provide the second current to the sensing unit through the third transistor which is turned-on while the second specific voltage is applied to the PWM circuit.

The correction processor is further configured to correct the constant current generator data voltage based on the first sensing data and the PWM data voltage based on the second sensing data.

The sensing unit is further configured to sense the current flowing through the driving transistor based on the specific voltage applied in a blanking interval of one image frame.

The driving unit is further configured to apply the specific voltage to sub pixel circuits corresponding to some row lines among the plurality of row lines for each image frame.

According to embodiments, changing the wavelength of light emitted from the inorganic light emitting element according to gray scale may be prevented.

Also, stains that may appear in an image due to the threshold voltage and mobility difference between driving transistors, or the forward voltage non-conformity of inorganic light emitting elements may be easily compensated. In addition, the color correction may be facilitated.

In the case of forming a modular display panel by combining the display modules, or forming one display panel using the display module, the stain compensation and color correction may be more easily performed.

In addition, the effect of the drop of the driving voltage generated differently for each position of the display panel on the process of setting the data voltage may be compensated for.

A more optimized driving circuit may be designed, and an inorganic light emitting element may be driven stably and efficiently.

The luminance non-uniformity and the horizontal cross-talk problem caused by the sweep load may be improved.

DETAILED DESCRIPTION

Herein, detailed descriptions of related art techniques are omitted to not obscure the description. In addition, the description of the same configurations will be omitted.

The suffix "part" for a component used herein is added or used in consideration of the convenience of the specification, and it is not intended to have a meaning or role that is distinct from each other.

The terminology used herein is to describe an embodiment, and is not limiting. A singular expression includes plural expressions unless the context clearly indicates otherwise.

As used herein, the term "has," "may have," "includes" or "may include" indicates existence of a corresponding feature (e.g., a numerical value, a function, an operation, or a constituent element such as a component), but does not exclude existence of an additional feature.

As used herein, the terms such as "1st" or "first," "2nd" or "second," etc., may modify corresponding components regardless of importance or order and are used to distinguish one component from another without limiting the components. For example, a first component may be referred to as a second component, and similarly, a second component may also be referred to as a first component.

If it is described that an element (e.g., first element) is "operatively or communicatively coupled with/to" or is "connected to" another element (e.g., second element), it may be understood that the element may be connected to the other element directly or through still another element (e.g., third element).

When it is mentioned that one element (e.g., first element) is "directly coupled" with or "directly connected to" another element (e.g., second element), it may be understood that there is no element (e.g., third element) present between the element and the other element.

The terms used herein may be interpreted in a meaning commonly known to those of ordinary skill in the art unless otherwise defined.

Certain embodiments will be described in detail with reference to the accompanying drawings.

Figure 1:
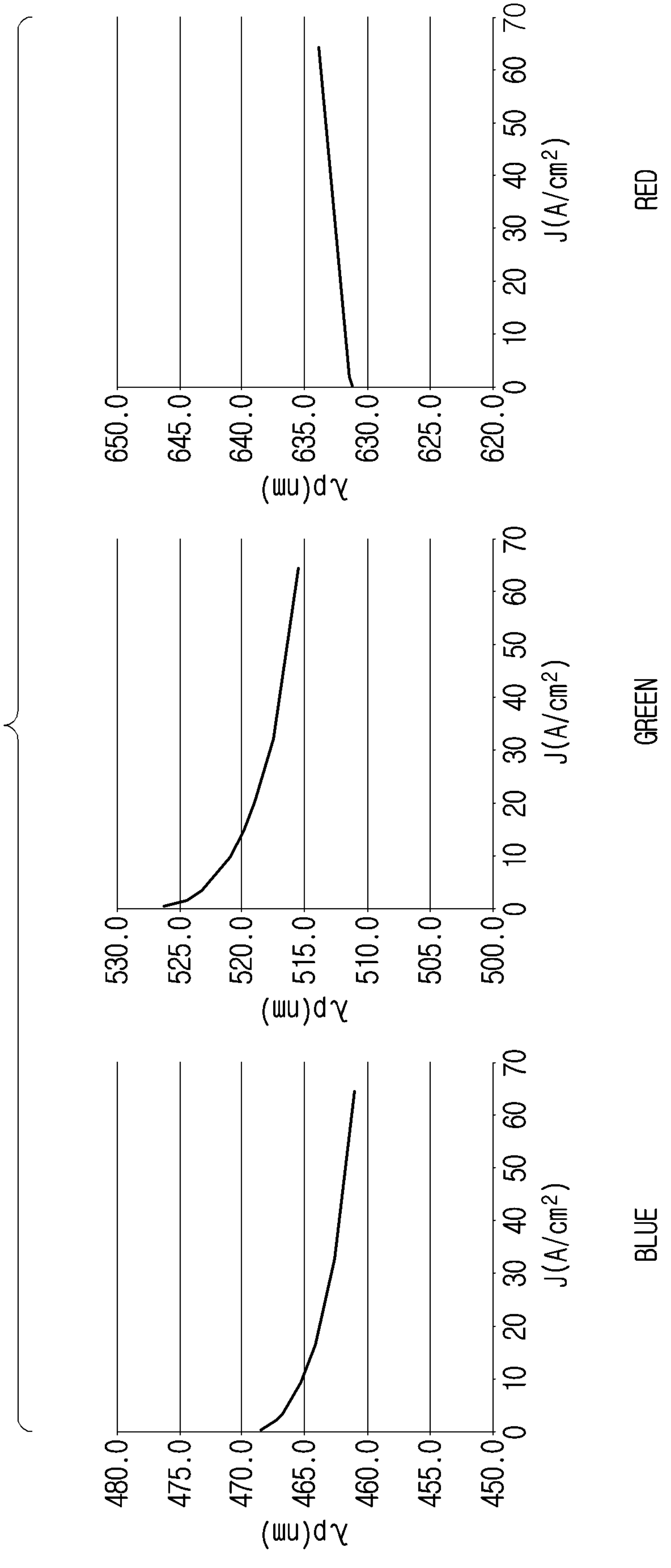
FIG. 1 is a graph illustrating a change in wavelength according to the size of a driving current flowing through a blue LED, a green LED, and a red LED.

FIG. 1 is a graph illustrating a change in wavelength according to the size of a driving current flowing through a blue LED, a green LED, and a red LED.

Figure 2:
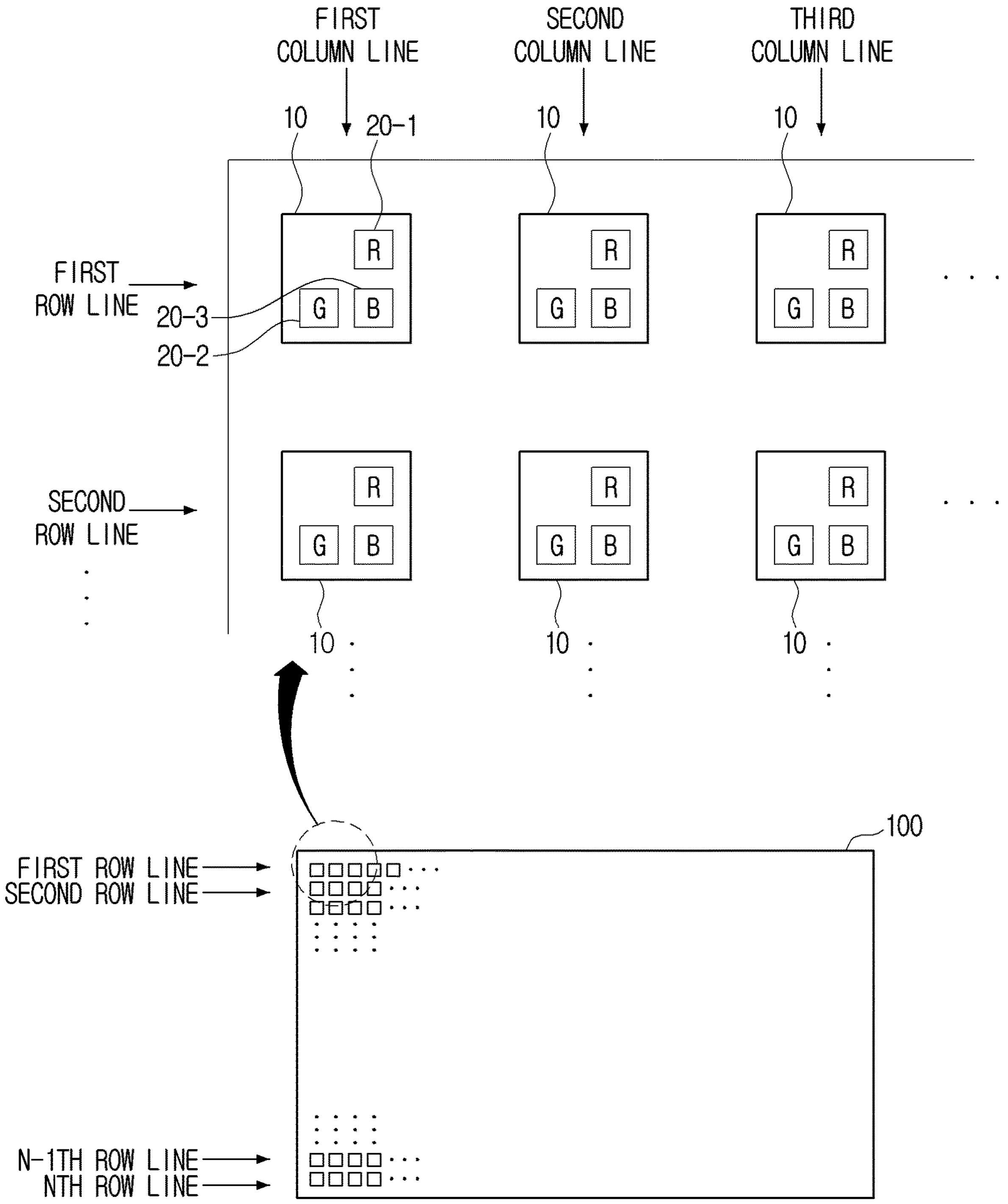
FIG. 2 illustrates a pixel structure of a display apparatus according to an embodiment.

FIG. 2 illustrates a pixel structure of a display panel according to an embodiment.

Referring to FIG. 2, a display panel 100 includes a plurality of pixels 10 disposed or arranged in a matrix form, that is, pixel array.

The pixel array includes a plurality of row lines or a plurality of column lines. The row line may also be called a horizontal line, a scan line, or a gate line, and the column line may also be called a vertical line or a data line.

Depending on cases, a term row line, column line, horizontal line, vertical line may be used as a word to refer to a line on a pixel array, and the term such as a scan line, gate line, and data line may be used as a word to refer to the actual wiring on the display panel 100 to which data or signals are transferred.

Each pixel 10 of the pixel array may include three types of sub pixels including a red (R) sub pixel 20-1, a green (G) sub pixel 20-2, and a blue (B) sub pixel 20-3.

Each pixel 10 may include a plurality of inorganic light emitting elements forming the R, G, and B sub pixels 20-1, 20-2, and 20-3, respectively.

For example, each pixel 10 may include three types of inorganic light emitting elements, such as R inorganic light emitting elements constituting the R sub pixels 20-1, G inorganic light emitting elements constituting the G sub pixels 20-2, and B inorganic light emitting elements constituting the B sub pixels 20-3.

Alternatively, each pixel 10 may include three blue inorganic light emitting elements. In this example, a color filter for implementing R, G, and B colors may be provided on each inorganic light emitting element. The color filter may be a quantum dot (QD) color filter, but is not limited thereto.

Although not shown, sub pixel circuits for driving the inorganic light emitting element may be provided on the display panel 100 for each inorganic light emitting element.

Each of the sub pixel circuits may provide driving current to the inorganic light emitting element based on the applied image data voltage.

To be specific, the image data voltage includes a constant current generator data voltage and a PWM data voltage. Each sub pixel circuit may represent a gray scale of an image by providing a driving current of magnitude corresponding to a constant current generator data voltage to the inorganic light emitting element for a time corresponding to the PWM data voltage. The details will be described later.

The sub pixel circuits included in each row line of the display panel 100 may be driven in order of image data voltage setting (or programming) and providing driving current based on the set PWM data voltage.

According to an embodiment, the sub pixel circuits included in each row line of the display panel 100 may be driven in the order of row lines.

For example, the image data voltage setting operation of sub pixel circuits included in one row line (e.g., the first row line) and the image data voltage setting operation of sub pixel circuits included in a next row line (e.g., the second row line) may be sequentially performed in the order of row lines. A driving current providing operation of the sub pixel circuits included in the one row line and a driving current providing operation of the sub pixel circuits included in the next row line may be sequentially performed in the order of the row lines.

Figure 3A:
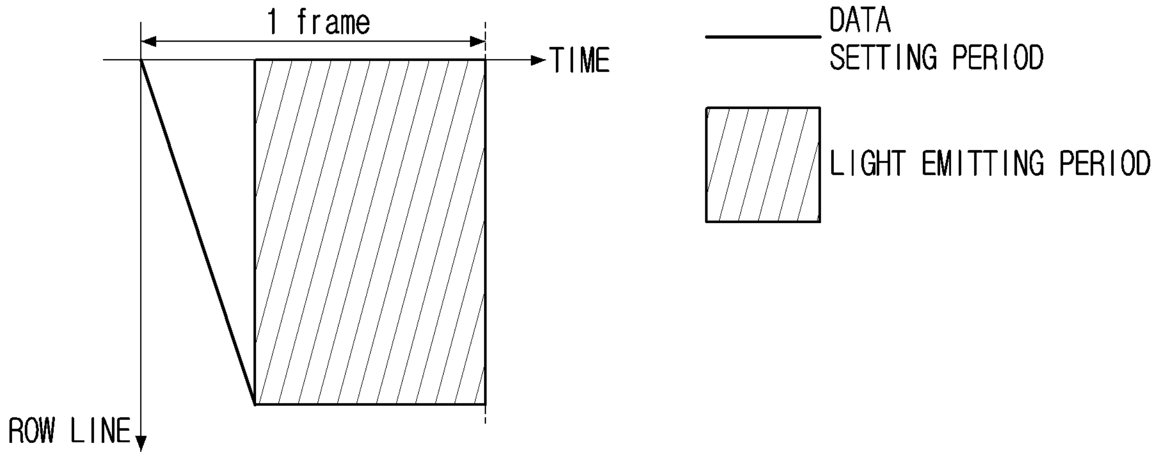
FIG. 3A (RELATED ART)
FIG. 3A is a conceptual diagram illustrating a driving method of a related art display panel.
Figure 3B:
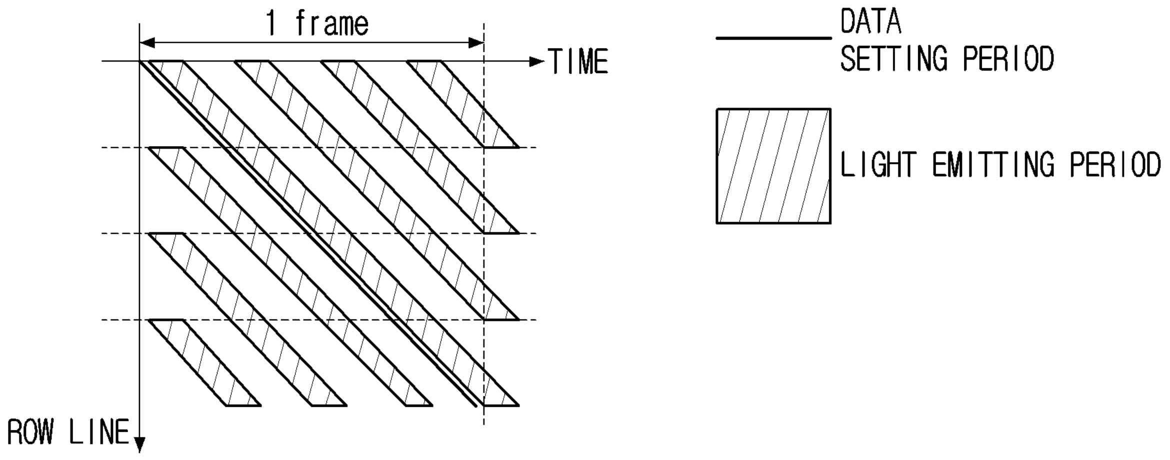
FIG. 3B is a conceptual diagram illustrating a driving method of a display panel according to an embodiment.

FIG. 3A is a conceptual diagram illustrating a driving method of a related art display panel. FIG. 3B is a conceptual diagram illustrating a driving method of a display panel according to an embodiment.

FIGS. 3A and 3B illustrate a way to drive a display panel during one image frame time. Referring to FIGS. 3A and 3B, a vertical axis represents a row line and a horizontal axis represents time. The data setting period represents a driving period of the display panel 100 in which the image data voltage is set to the sub pixel circuits included in each row line, and the light emitting period represents a driving period of the display panel 100 in which the sub pixel circuits included in each row line provide a driving current to the inorganic light emitting element based on the image data voltage. The inorganic light emitting elements emit light according to the driving current in the light emitting period.

Referring to FIG. 3A, in the related art, after image data voltage setting is completed for the entire row line of the display panel in the order of row lines, a light emitting period is collectively proceeds.

In this example, the entire row lines of the display panel emit light simultaneously during the light emitting period, requiring high peak current, and thus, there is a problem in that peak power consumption required for a product is increased. When peak power consumption increases, a capacity of a power supply device such as a switched mode power supply (SMPS) installed in a product increases, resulting in an increase in cost and a volume, which causes design restriction.

As shown in FIG. 3B, according to an embodiment, a data setting period and a light emitting period (specifically, a plurality of light emitting periods) of each row line are sequentially performed in the order of row lines.

As described above, when the light emitting period for each row line is sequentially driven in a row line sequence, the number of row lines that simultaneously emit light may be reduced, and thus the amount of the peak current required may be reduced in comparison with the related art, and accordingly, peak power consumption may be reduced.

According to various embodiments, a phenomenon in which the wavelength of light emitted from the inorganic light emitting element is changed according to the gray scale may be prevented by PWM driving the inorganic light emitting element in an active matrix (AM) method. By driving the display panel 100 so that sub pixel circuits sequentially emit light in a row line sequence, instantaneous peak power consumption may be reduced.

Referring to FIG. 2, the R, G, and B sub pixels 20-1 to 20-3 are arranged in an L-shape in which left and right of the sub pixel circuits are changed in one-pixel region. However, an embodiment is not limited thereto, and the R, G, and B sub pixels 20-1 to 20-3 may be arranged in a line in a pixel region, and may be arranged in various shapes according to an embodiment.

Referring to FIG. 2, a three-type sub pixel may form one pixel as an example. However, according to an embodiment, four kinds of sub pixel circuits such as R, G, B, and white (W) may form one pixel, and any other number of sub pixel circuits may form one pixel.

Figure 4:
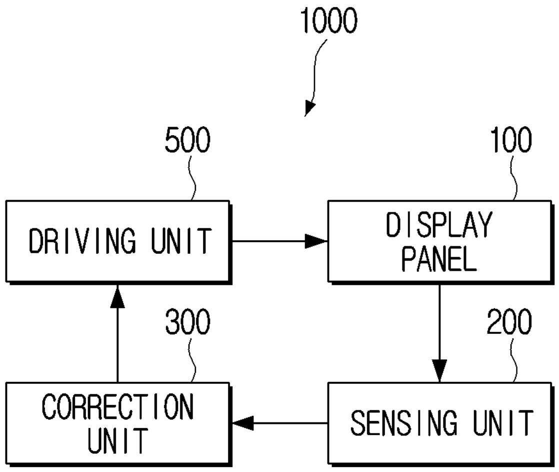
FIG. 4 is a block diagram illustrating a display apparatus according to an embodiment.

FIG. 4 is a block diagram illustrating a display apparatus according to an embodiment. Referring to FIG. 4, a display apparatus 1000 (e.g., an electronic apparatus) includes the display panel 100, a sensing unit 200 (e.g., a sensing circuit or a detector), a correction unit 300 (e.g., a correction processor), and a driving unit 500 (e.g., a driver).

The driving unit 500 drives the display panel 100. The driving unit 500 may provide various control signals, data signals, driving voltage signals, or the like, to the display panel 100 to drive the display panel 100.

As described above, according to an embodiment, the display panel 100 may be driven in the order of a row line. The driving unit 500 may include a gate driver for driving the pixels on the pixel array in a row line unit.

The driving unit 500 may include a data driver for providing an image data voltage and a specific voltage to each pixel (or each sub pixel) on the pixel array.

The driving unit 500 may include a demultiplexer (DeMUX) circuit for selecting each of the R, G, and B sub pixels 20-1 to 20-3 included in one pixel 10.

The driving unit 500 may include a driving voltage providing circuit for providing a driving voltage (e.g., a first driving voltage (VDD_PWM), a second driving voltage (VDD_PAM), a ground voltage VSS, a Vset voltage, etc. to be described below), or the like, to each sub pixel circuit included in the display panel 100.

The driving unit 500 may include a clock signal providing circuit for providing various clock signals for driving the gate driver or the data driver, and may include a sweep voltage providing circuit for providing a sweep voltage (or a sweep signal) to be described later.

At least some of the various driving units or circuits of the driving unit 500 described above may be implemented with a separate chip form to be mounted on an external printed circuit board (PCB) together with a timing controller (TCON), and may be connected to sub pixel circuits formed on a thin film transistor (TFT) layer of the display panel 100 through the film on glass (FOG) wiring.

At least some of the various driving units or circuits of the driving unit 500 described above may be implemented in a separate chip form and arranged on a chip on film (COF) form on a film, and may be connected to sub pixel circuits formed on the TFT layer formed on the display panel 100 through the FOG wiring.

At least some of the various driving units or circuits of the driving unit 500 described above may be implemented with a separate chip form to be arranged on a COG form (that is, arranged on a rear surface (an opposite side of a surface on which the TFT layer is formed with respect to the glass substrate) of the glass substrate (described below) of the display panel 100), and may be connected to the sub pixel circuits formed on the TFT layer of the display panel 100 through the connection wiring.

At least some of the various driving units or circuits of the driving unit 500 described above may be formed in the TFT layer together with the sub pixel circuits formed in the TFT layer in the display panel 100 and may be connected to the sub pixel circuits.

For example, among various driving units or circuits of the driving unit 500 described above, the gate driving unit, the sweep voltage providing circuit, and the DeMUX circuit may be formed in the TFT layer of the display panel 100, the data driving unit may be arranged on the rear surface of the glass substrate of the display panel 100, and the driving voltage providing circuit, the clock signal providing circuit, and the TCON may be arranged on the external PCB, but is not limited thereto.

According to an embodiment, the driving unit 500 may set the image data voltage in the order of row lines to the sub pixel circuits of the display panel 100, and may drive the sub pixel circuits such that a driving current corresponding to the set image data voltage is provided to the inorganic light emitting elements of the pixel array in the order of row lines.

The display panel 100 may include a pixel array as described above in FIG. 2, and display an image corresponding to an applied image data voltage.

Each sub pixel circuit included in the display panel 100 may provide a driving current in which magnitude and driving time (or pulse width) are controlled based on an applied image data voltage, to a corresponding inorganic light emitting element.

The inorganic light emitting elements constituting the pixel array may emit light according to the driving current provided from the corresponding sub pixel circuits, thereby displaying an image on the display panel 100.

The sub pixel circuits for providing the driving current to the inorganic light emitting element include a driving transistor. The driving transistor is a key configuration for determining the operation of the sub pixel circuits, and in theory, an electrical characteristic such as the threshold voltage Vth of the driving transistor or the mobility μ should be equal to each other between the sub pixel circuits of the display panel 100. However, the threshold voltage Vth and mobility μ of the actual driving transistor may be different for sub pixel circuits due to various factors such as a process non-conformity or a time change, and this non-conformity may cause deterioration of image and thus needs to be compensated.

In various embodiments, an electrical characteristic non-conformity of driving transistors is compensated through an external compensation scheme. In the external compensation scheme, a current flowing through a driving transistor is sensed, and an image data voltage is corrected on the basis of a sensing result, thereby compensating a threshold voltage (Vth) and a mobility μ non-conformity of driving transistors among sub pixel circuits.

The sensing unit 200 is configured to sense currents flowing through the driving transistor included in the sub pixel circuits and output sensing data corresponding to the sensed current.

Specifically, the sensing unit 200 may convert a current flowing through a driving transistor into sensing data when a current based on a specific voltage flows through the driving transistor, and output the converted sensing data to the correction unit 300. Here, the specific voltage refers to a voltage applied to the sub pixel circuits separately from the image data voltage in order to sense the current flowing through the driving transistor included in the sub pixel circuits.

The correction unit 300 is configured to correct the image data voltage applied to the sub pixel circuits based on the sensing data.

The correction unit 300 may obtain a compensation value for correcting the image data based on the sensing data output from the sensing unit 200 and the lookup table including the sensing data value for each voltage.

The sensing data value by voltage of the lookup table refers to the sensing data value corresponding to the current flowing through the activing transistor when a particular voltage is applied to the driving transistor, and may be theoretically or experimentally pre-calculated and stored in a form of a lookup table.

According to an embodiment, the voltage-specific sensing data value of the lookup table may include first reference sensing data corresponding to a first specific voltage, and second reference sensing data corresponding to a second specific voltage.

In addition, the lookup table may be pre-stored in various memory devices, e.g., (not shown) inside or outside the correction unit 300, and the correction unit 300 may load the lookup table from the memory.

The correction unit 300 may correct image data voltage applied to the sub pixel circuits by correcting the image data based on the obtained compensation value. Accordingly, the threshold voltage Vth and mobility μ non-conformity of the driving transistor between the sub pixel circuits may be compensated.

There is a resistance component in the display panel 100. Therefore, when a driving current flows through the inorganic light emitting element, IR drop occurs, which causes a drop in the driving voltage. As described below, since the driving voltage is applied to one end of the driving transistor and becomes the reference for setting the image data voltage, drop in driving voltage may interrupt setting the accurate image data voltage.

As described above, since the data setting period and the light emitting period are progressed in the order of the row lines, the sub pixel circuits of the other row lines operate in the data setting period while the sub pixel circuits of some row lines of the display panel 100 operate in the light emitting period, so that the driving voltage drop may become more problematic.

In various embodiments, the above-described driving voltage drop problem may be solved by differing the driving voltage used in the data setting period and the light emitting period, or by correcting the image data voltage. The detailed description will be described later.

Figure 5:
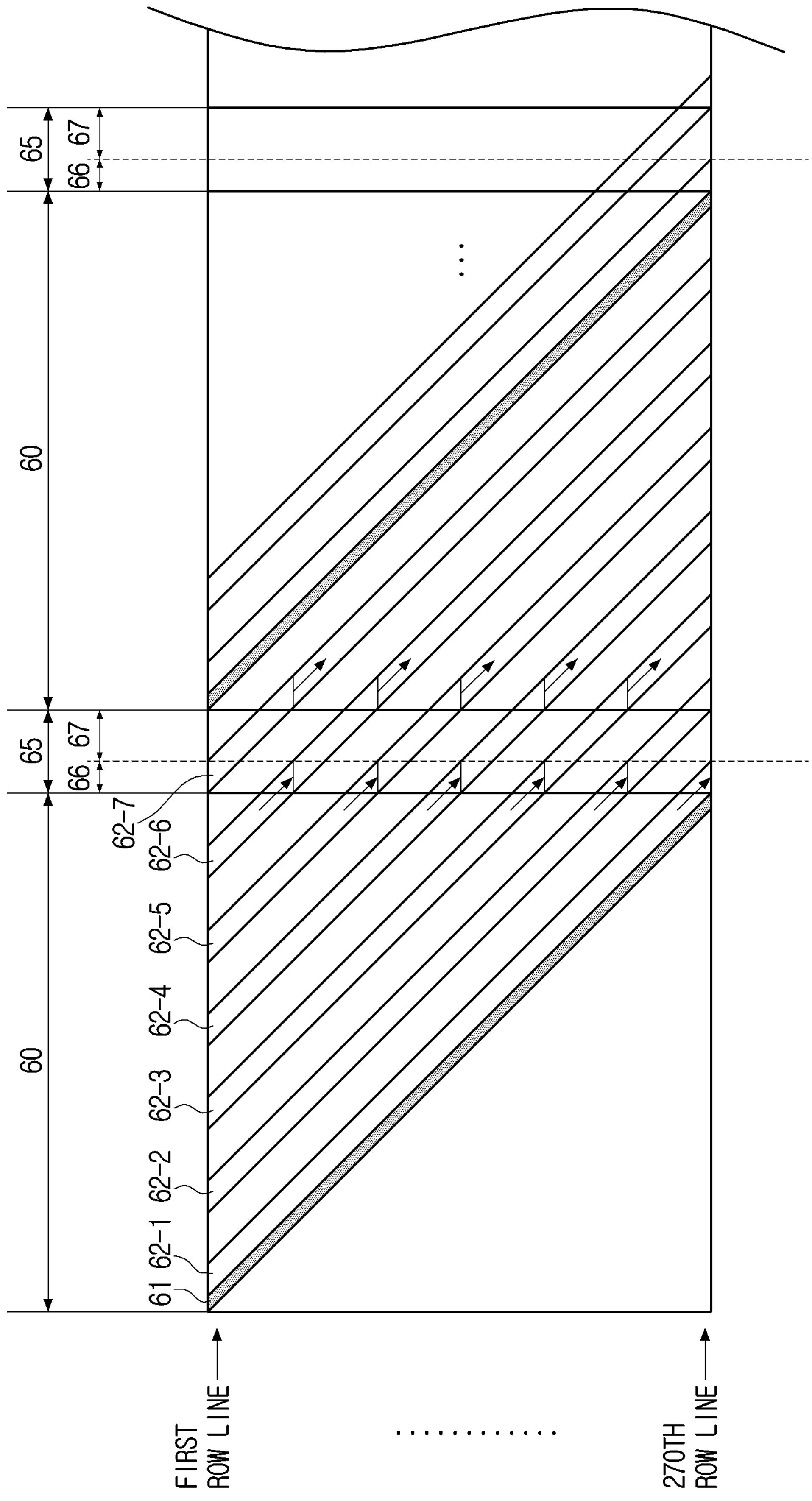
FIG. 5 is a diagram for describing a method of driving a display panel according to an embodiment.

FIG. 5 is a diagram for describing a method of driving a display panel 100 according to an embodiment.

FIG. 5 conceptually illustrates a driving method of the display panel 100 for two consecutive image frames. In FIG. 5, the vertical axis represents a row line, a horizontal axis represents time, and reference numeral 60 denotes an image frame period, and reference numeral 65 denotes a blanking interval.

Referring to FIG. 5, the display panel 100 includes 270 row lines, and for one image frame (specifically, image data voltage of one image frame), seven light emitting periods 62-1, 62-2, 62-3, 62-4, 62-5, 62-6, and 62-7 are progressed, but the number of row lines or the number of light emitting periods is not limited thereto.

Referring to FIG. 5, for one image frame, a single data setting period 61 and a plurality of light emitting periods 62-1 through 62-7 are progressed for each row line.

During the data setting period 61, an image data voltage may be set to sub pixel circuits included in each row line. In each of the plurality of light emitting periods 62-1 to 62-7, sub pixel circuits included in each row line may provide a driving current to the inorganic light emitting element based on the set image data voltage.

The driving unit 500, during the data setting period 61, may apply a control signal for setting the image data voltage (Hereinafter referred to as a scan signal. For example, SP(n), SPWM(n) and SCCG(n) which will be described later are included) to the sub pixel circuits of each row line.

The driving unit 500, during the plurality of light emitting periods 62-1 to 62-7, may apply a control signal for controlling a driving current providing operation (Hereinafter referred to as an emission signal and SET(n), Emi_PWM(n), Emi_PAM(n), Sweep(n) which will be described later are included) to the sub pixel circuits of each row line.

Referring to FIG. 5, the data setting period 61 and each of the light emitting periods 62-1 to 62-7 may be sequentially progressed in the order of row lines for the entire row line of the display panel 100.

The driving unit 500 may apply a scan signal to the sub pixel circuits sequentially from the first row line to the last row line of the display panel 100.

The driving unit 500 may apply an emission signal to the sub pixel circuits sequentially from the first row line to the last row line of the display panel 100.

According to the example shown in FIG. 5, the first light emitting period 62-1 of the first row line may be temporally consecutive with the data setting period 61, and the plurality of light emitting periods 62-1 to 62-7 have a time interval and are spaced from each other by a predetermined time interval.

The predetermined time interval between the light emitting periods and the number of light emitting periods proceeding in each row line for one image frame may be set based on the size of the display panel 100 and/or the shutter speed of the camera, or the like. However, an embodiment is not limited thereto.

Since the shutter speed of the camera is several times faster than one image frame time, the image displayed on the display panel 100 taken in the camera may be distorted, if the display panel 100 is driven so that one light emitting period is progressed in a row line sequence over one image frame time.

The display panel 100 may be driven so that a plurality of light emitting periods are progressed at a predetermined time interval during one image frame time, and by setting the predetermined time interval based on the shutter speed of the camera, the image displayed on the display panel 100 is not distorted even if the display panel 100 is captured at any moment.

Referring to FIG. 5, a blanking interval 65 represents a time interval between consecutive image frame periods 60 in which valid image data is not applied. Referring to FIG. 5, the blanking interval 65 does not include the data setting period 61. Accordingly, the image data voltage is not applied to the display panel 100 during the blanking interval 65.

As described above, separate from that the image data voltage is not applied in the blanking interval 65, the inorganic light emitting elements may emit light in some of the blanking intervals 65. Referring to the arrows included in the time interval indicated by reference numeral 66 in FIG. 5, the light emitting period of some row lines are progressed within the blanking interval 65.

In addition, there may be a non-emission period 67 in which all inorganic light emitting elements of the display panel 100 do not emit light in the blanking interval 65. Since no current flows over the display panel 100 in the non-emission period 67, an operation such as a failure detection of the display panel 100 may be performed.

The configuration and the external compensation method of a display apparatus 1000 according to an embodiment will be described in detail with reference to FIG. 6.

Figure 6:
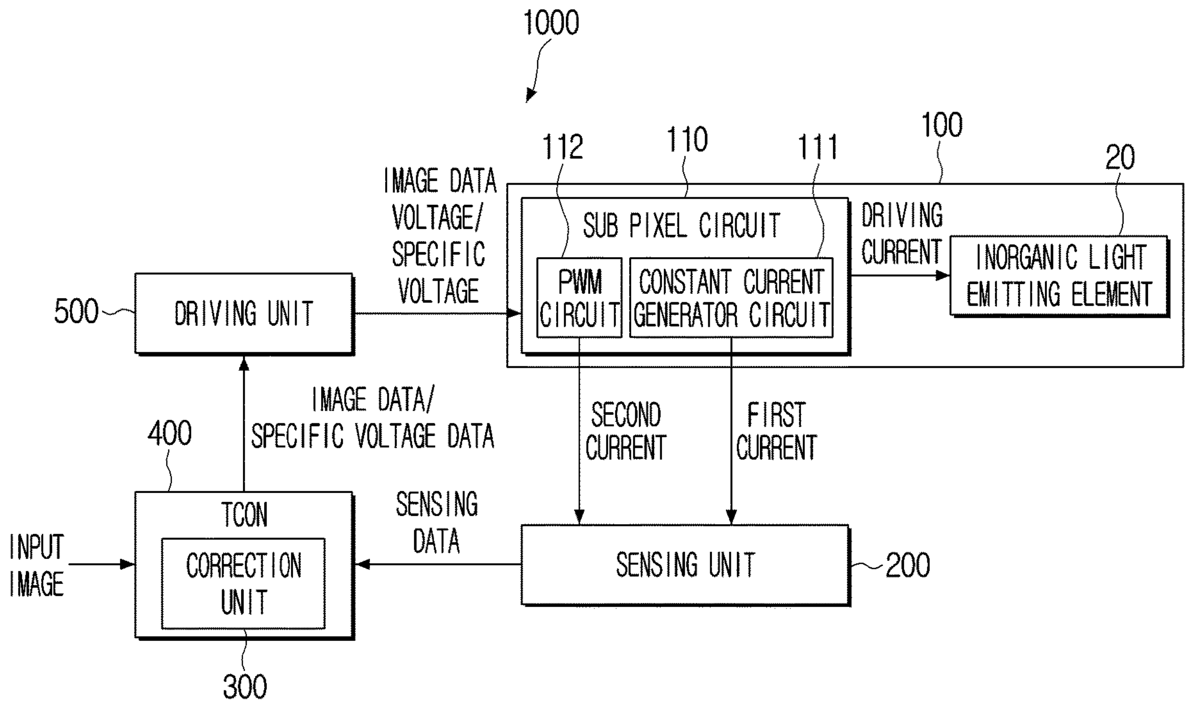
FIG. 6 is a detailed block diagram of a display apparatus according to an embodiment.

FIG. 6 is a detailed block diagram of a display apparatus according to an embodiment. In describing FIG. 6, a duplicate description will be omitted.

Referring to FIG. 6, the display apparatus 1000 includes the display panel 100, the sensing unit 200, the correction unit 300, a TCON 400, and the driving unit 500.

The TCON 400 controls the overall operation of the display apparatus 1000. The TCON 400 may perform sensing driving of the display apparatus 1000. In addition, the TCON 400 may perform display driving of the display apparatus 1000.

Here, the sensing driving is a driving operation of updating the compensation value to compensate for the threshold voltage Vth and mobility μ of the driving transistors included in the display panel 100, and the display driving is a driving operation of displaying an image on the display panel 100 based on the image data voltage to which the compensation value is reflected.

When the display driving is performed, the TCON 400 provides image data for the input image to the driving unit 500. The image data provided to the driving unit 500 may be image data corrected by the correction unit 300.

The correction unit 300 may correct the image data for the input image based on the compensation value. The compensation value may be a compensation value obtained through sensing driving to be described later.

As shown in FIG. 6, the correction unit 300 may be implemented as a function module of the TCON 400 mounted on the TCON 400. However, an embodiment is not limited thereto, and the correction unit 300 may be mounted on a separate processor different from the TCON 400, and may be implemented as a separate chip in an application specific integrated circuit (ASIC) or a field-programmable gate array (FPGA) method.

The driving unit 500 may generate an image data voltage based on the image data provided by the TCON 400, and provide or apply the generated image data voltage to the display panel 100. Accordingly, the display panel 100 may display an image on the basis of the image data voltage provided by the driving unit 500.

When the sensing driving is performed, the TCON 400 may provide specific voltage data for sensing the current flowing through the driving transistor included in one or more sub pixel circuits 110 to the driving unit 500.

The driving unit 500 may generate a specific voltage corresponding to the specific voltage data and provide the specific voltage to the display panel 100, and accordingly, a current based on a specific voltage may flow over the driving transistor included in the sub pixel circuits 110 of the display panel 100.

The sensing unit 200 may sense the current flowing through the driving transistor and output the sensing data to the correction unit 300, and the correction unit 300 may obtain or update the compensation value for correcting the image data based on the sensing data.

Hereinafter, each configuration of FIG. 6 will be further described.

The display panel 100 includes an inorganic light emitting element 20 constituting a sub pixel and sub pixel circuits 110 for providing a driving current to the inorganic light emitting element 20. Referring to FIG. 6, only one sub pixel related configuration included in the display panel 100 is illustrated, but the sub pixel circuits 110 and the inorganic light emitting element 20 may be provided for each sub pixel as described above.

The inorganic light emitting element 20 may emit light with different luminance depending on the magnitude of the driving current provided from the sub pixel circuits 110 and the driving time of the driving current, and may express the gray scale value of the image. The term "pulse width" or "duty ratio" may be used instead of the term driving time.

For example, the inorganic light emitting element 20 may represent a brighter gray scale value as the magnitude of the driving current is larger. Further, the inorganic light emitting element 20 may represent a brighter gray-scale value as the driving time of the driving current increases (i.e., the longer the pulse width or the higher the duty ratio).

The inorganic light emitting element 20 may refer to a light emitting element that is manufactured using an inorganic material which is different from organic LED (OLED) manufactured using an organic material.

According to an embodiment, the inorganic light emitting element 20 may be a micro LED (μLED) having a size that is less than or equal to 100 micrometers (μm).

The display panel in which each sub pixel is implemented with the micro LED is called a micro LED display panel. The micro LED display panel is one of a flat display panel and may include a plurality of inorganic LEDs, each of which is less than or equal to 100 micrometers. The micro LED display panel may provide better contrast, response time, and energy efficiency compared to a liquid crystal display (LCD) panel requiring backlight. The OLED and the micro LED have good energy efficiency, but the micro LED may provide better performance than the OLED in terms of luminance, light emission efficiency, and operating life.

The sub pixel circuits 110 provide a driving current to the inorganic light emitting element 20 when the display is driven. Specifically, the sub pixel circuits 110 may provide a driving current having a controlled magnitude and a driving time to the inorganic light emitting element 20 based on an image data voltage (e.g., a constant current generator data voltage, a PWM data voltage) applied from the driving unit 500.

In other words, the sub pixel circuits 110 may control the luminance of light emitted by the inorganic light emitting element 20 by driving the inorganic light emitting element 20 with the PAM and/or a PWM scheme.

The sub pixel circuits 110 may include a constant current generator circuit 111 for providing a constant current having a constant magnitude to the inorganic light emitting element 20 based on the constant current generator data voltage, and a PWM circuit 112 for controlling the time at which the constant current flows through the inorganic light emitting element 20 based on the PWM data voltage. Here, a constant current provided to the inorganic light emitting element 20 becomes a driving current.

Although not shown in the drawings, each of the constant current generator circuit 111 and the PWM circuit 112 includes a driving transistor. For convenience, the driving transistor included in the constant current generator circuit 111 is referred to as a first driving transistor, and the driving transistor included in the PWM circuit 112 is referred to as a second driving transistor.

When the sensing driving described above is performed, if a first specific voltage is applied to the constant current generator circuit 111, a first current corresponding to the first specific voltage flows over the first driving transistor, and when a second specific voltage is applied to the PWM circuit 112, a second current corresponding to the second specific voltage flows over the second driving transistor.

Accordingly, the sensing unit 200 may sense the first and second currents, respectively, and output first sensing data corresponding to the first current and second sensing data corresponding to the second current to the correction unit 300, respectively. The sensing unit 200 may include a current detector and an analog to digital converter (ADC). In this example, the current detector may be implemented using an operational amplifier (OP-AMP) and a current integrator including a capacitor, but an embodiment is not limited thereto.

The correction unit 300 may correct the image data voltage applied to the sub pixel circuits 110 based on the sensing data.

In detail, the correction unit 300 may identify the first reference sensing data value corresponding to the first specific voltage in the lookup table including the sensing data value for each voltage, compare the identified sensing data value with the first sensing data value output from the sensing unit 200, and calculate or obtain a first compensation value for correcting the constant current generator data voltage.

The correction unit 300 may identify the second reference sensing data value corresponding to the second specific voltage in the lookup table including the sensing data value for each voltage, and compare the identified sensing data value with the second sensing data value output from the sensing unit 200 to calculate or obtain a second compensation value for correcting the PWM data voltage.

The first and second compensation values obtained as described above may be stored or updated in an internal memory or external memory of the correction unit 300, and may be used for correcting image data voltage when the display operation is performed afterwards.

For example, the correction unit 300, by correcting the image data to be provided to the driving unit 500 (in particular, a data driver (not shown) using the compensation value, may correct the image data voltage applied to sub pixel circuits 110.

Since the data driver provides an image data voltage based on the input image data to the sub pixel circuits 110, the correction unit 300 may correct the image data voltage that is applied to sub pixel circuits 110 by correcting the image data value.

Specifically, when the display driving is performed, the correction unit 300 may correct the data value of the constant current generator among the image data based on the first compensation value. The correction unit 300 may correct the PWM data value among the image data on the basis of the second compensation value. Accordingly, the correction unit 300 may correct the constant current generator data voltage and the PWM data voltage applied to the sub pixel circuits 110, respectively.

The driving unit 500 may include a gate driver that provides the scan signal and the emission signal described above to drive the pixels of the pixel array in a row line unit. The gate driver providing the scan signal may be referred to as a scan driver, and the gate driver providing the emission signal may be referred to as an emission driver.

The driving unit 500 may include a data driver for providing an image data voltage (i.e., constant current generator data voltage, PWM data voltage) and a specific voltage (i.e., a first specific voltage, a second specific voltage) to sub pixel circuits.

The data driver may include a digital to analog converter (DAC) for converting the image data and specific voltage data provided by the TCON 400, respectively, to image data voltage and a specific voltage.

Figure 7A:
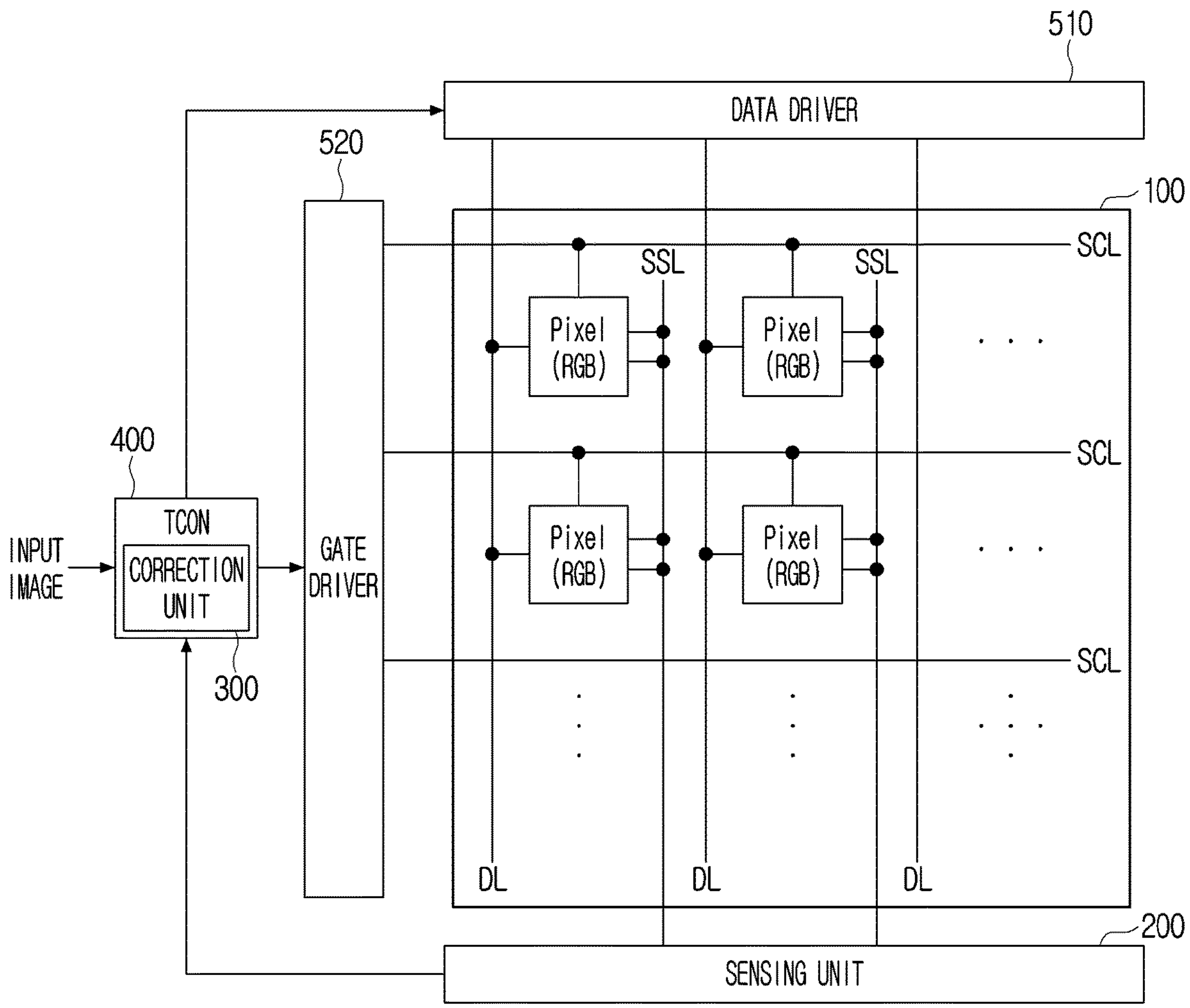
FIG. 7A illustrates an example of an implementation of a sensing unit according to an embodiment.
Figure 7B:
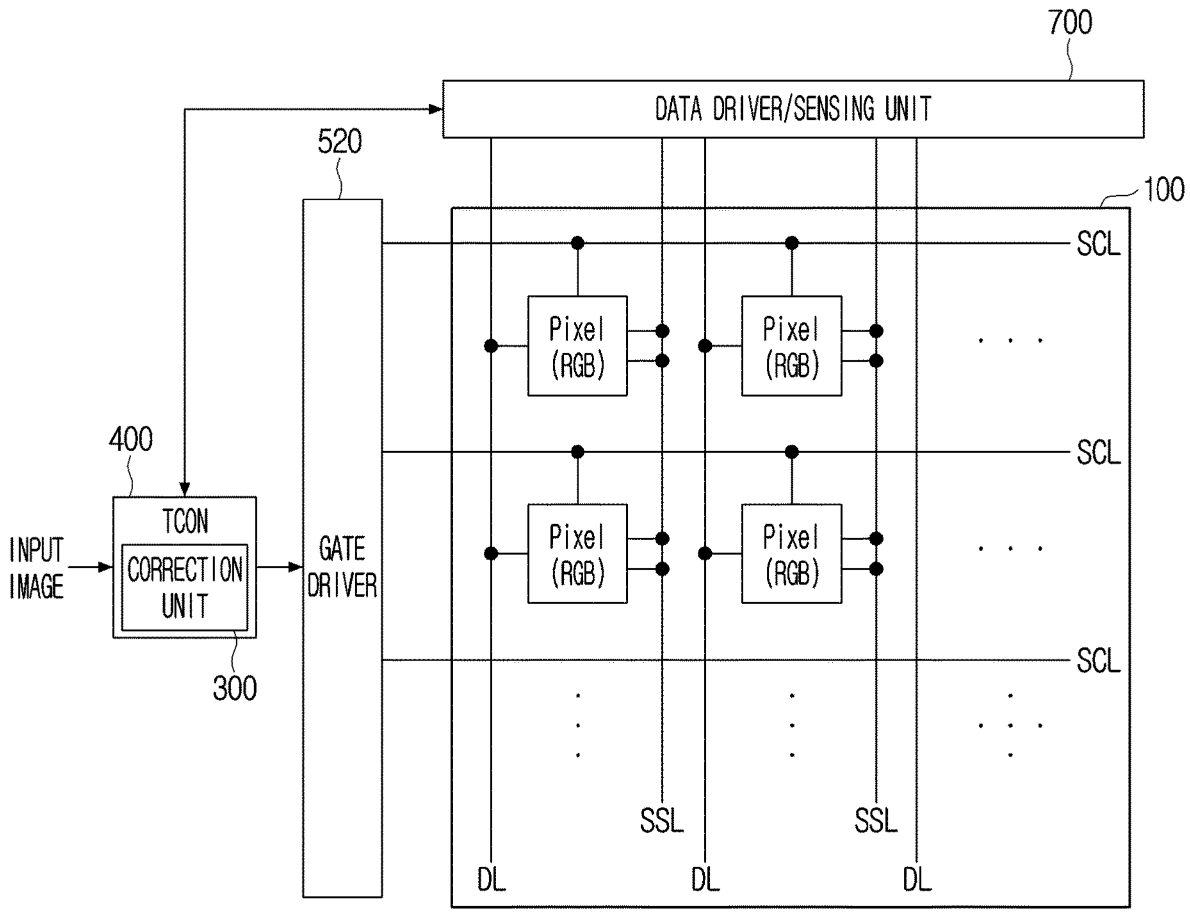
FIG. 7B illustrates an example of an implementation of a sensing unit according to an embodiment.

FIGS. 7A and 7B are diagrams illustrating an embodiment of the sensing unit 200. Referring to FIGS. 7A and 7B, the display panel 100 includes a plurality of pixels arranged in each area where a plurality of data lines DL and a plurality of scan lines SCL cross each other in a matrix form.

At this time, each pixel may include three sub pixels, such as R, G, and B. The display panel 100 may include an inorganic light emitting element 20 of a color corresponding to a sub pixel and sub pixel circuits 110 provided for each inorganic light emitting element as described above.

The data line DL is a wiring line to apply image data voltage (to be specific, constant current generator data voltage and PWM data voltage) or specific voltage (to be specific, first specific voltage and second specific voltage) to each sub pixel circuits 110 of the display panel 100, and the scan line SCL is a wiring line for driving a pixel (or sub pixel) in a row line unit by applying a scan signal or an emission signal applied from the gate driver 520 to each of the sub pixel circuits 110 of the display panel 100.

Accordingly, the image data voltage or a specific voltage applied from the data driver 510 through the data line DL may be applied to sub pixel circuits of a selected row line through a scan signal (e.g., SPWM(n), SCCG(n), SP(n), etc.) applied from the gate driver 520.

The voltages (image data voltages and specific voltages) to be applied to each of the R, G, and B sub pixels may be time-division multiplexed to be applied to each pixel of the display panel 100. The time-division multiplexed voltages may be applied to corresponding sub pixel circuits through a DeMUX circuit (not shown).

Unlike FIGS. 7A and 7B, a separate data line may be provided for each of the R, G, and B sub pixels, and in this example, the voltages (image data voltage and specific voltage) to be applied to each of the R, G, and B sub pixels may be simultaneously applied to the corresponding sub pixels through the corresponding data line. In this example, the DeMUX circuit (not shown) will not be required.

This is the same for the sensing line SSL. According to an embodiment, the sensing line SSL may be provided for each column line of a pixel, as shown in FIGS. 7A and 7B. In this example, a DeMUX circuit (not shown) may be required for the operation of the sensing unit 200 for each of the R, G, and B sub pixels.

Unlike the example shown in FIGS. 7A and 7B, in the case where the sensing line SSL is provided in the column line unit of the sub pixel, a separate DeMUX circuit (not shown) is not required for the operation of the sensing unit 200 for each of the R, G, and B sub pixels. However, compared to an embodiment shown in FIGS. 7A and 7B, the unit configuration of the sensing unit 200 will be required by more than three times.

Referring to FIGS. 7A and 7B, for convenience, only one scan line SCL is shown for one row line. However, the number of actual scan lines may vary depending on the driving method or implementation of the sub pixel circuits 110 included in the display panel 100. For example, scan lines for providing scan signals (SPWM(n), SCCG(n), SP(n)), or emission signals (SET(n), Emi_PWM(n), Emi_PAM(n), Sweep(n)) may be provided for each row line.

The first and second currents flowing through the first and second driving transistors may be transmitted to the sensing unit 200 through the sensing line SSL based on the specific voltage, as described above. Accordingly, the sensing unit 200 may sense the first and second currents, respectively, and output first sensing data corresponding to the first current and second sensing data corresponding to the second current to the correction unit 300, respectively.

According to an embodiment, the sensing unit 200 may be implemented as an IC separate from the data driver 510 as shown in FIG. 7A, or may be implemented in an IC which also includes the data driver 510, as shown by a reference numeral 700 in FIG. 7B.

As described above, the correction unit 300 may correct the constant current generator data voltage based on the first sensing data output from the sensing unit 200, and correct the PWM data voltage based on the second sensing data.

Referring to FIGS. 7A and 7B, the first and second currents are transmitted to the sensing unit 200 through a separate sensing line SSL separate from the data line DL. However, an embodiment is not limited thereto. For example, in the example in which the data driver 510 and the sensing unit 200 are implemented as one IC, as shown in FIG. 7B, the first and second currents may be transmitted to the sensing unit 200 through the data line DL without the sensing line SSL.

Below, various embodiments will be further described with reference to FIGS. 8A to 11B.

Figure 8A:
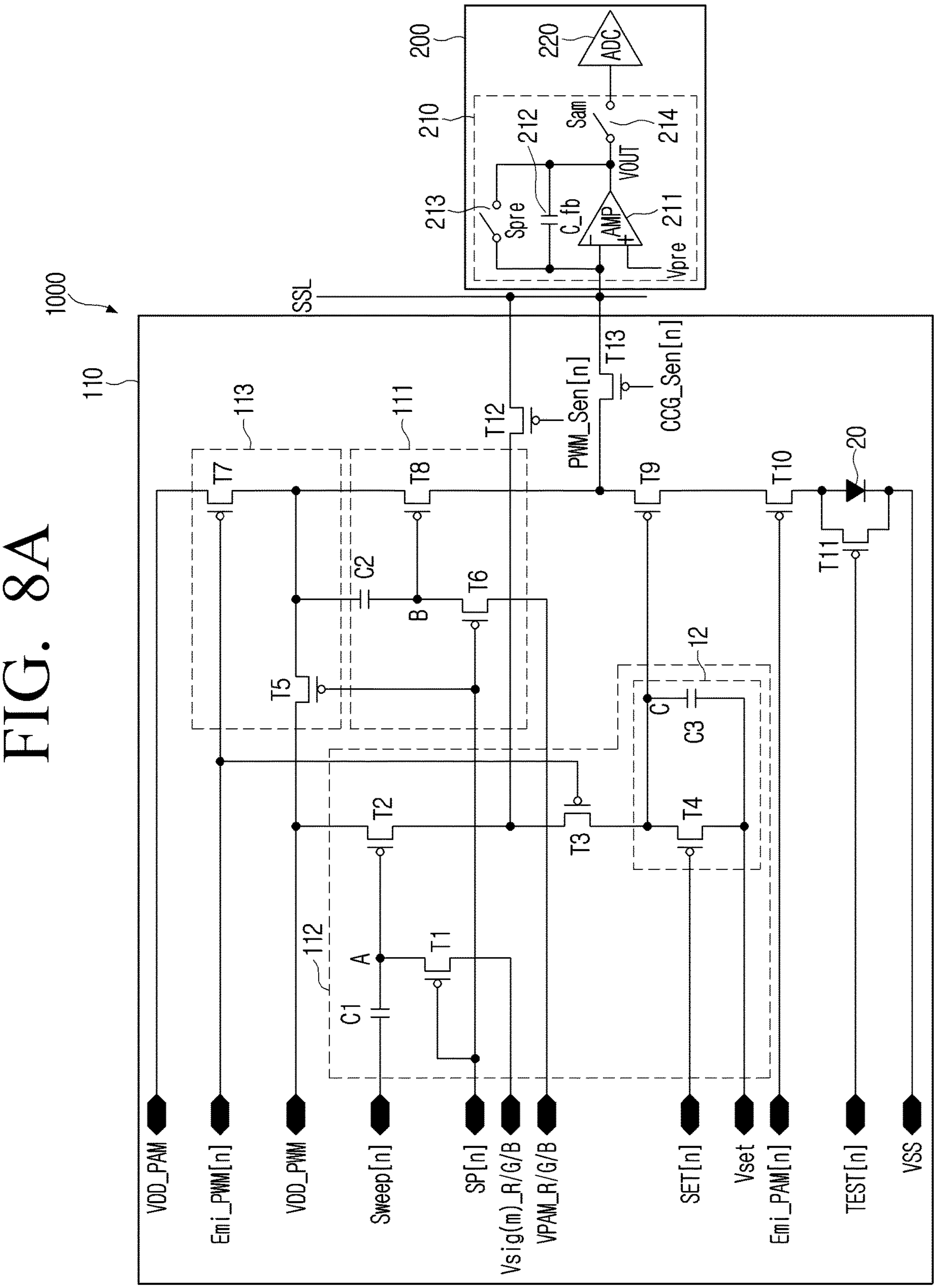
FIG. 8A is a detailed circuit diagram of sub pixel circuits and sensing units according to an embodiment.

FIG. 8A is a detailed circuit diagram of sub pixel circuits 110 and sensing unit 200 according to an embodiment. FIG. 8A specifically illustrates a circuit related to one sub pixel, that is, a unit configuration of one inorganic light emitting element 20, the sub pixel circuits 110 for driving the inorganic light emitting element 20, and the sensing unit 200 for sensing the current flowing through the driving transistor T2, T8 included in the sub pixel circuits 110.

Referring to FIG. 8A, the sub pixel circuits 110 may include the constant current generator circuit 111, a PWM circuit 112, a driving voltage changing unit 113 (e.g., a driving voltage changing circuit), a transistor T9, a transistor T10, a transistor T11, a transistor T12, and a transistor T13.

The constant current generator circuit 111 includes a capacitor C2 connected between the source terminal and the gate terminal of the first driving transistor T8 and a transistor T6 for applying a constant current generator data voltage which is controlled to be turned on or off according to the scan signal SP(n) and applied through the data signal line (VPAM_R/G/B) to a gate terminal of the first driving transistor T8.

The driving voltage changing unit 113 may change the driving voltage applied to the first driving transistor T8. The driving voltage changing unit 113 may apply the first driving voltage VDD_PWM to the source terminal of the first driving transistor T8 during the data setting period according to the control of the driving unit 500, and apply the second driving voltage VDD_PAM to the source terminal of the first driving transistor T8 during the light emitting period.

The driving voltage changing unit 113 may include a transistor T5 having a source terminal connected to a first driving voltage VDD_PWM terminal, a drain terminal connected to a source terminal of the first driving transistor T8, and a gate terminal receiving the scan signal SP(n). The driving voltage changing unit 113 may include a transistor T7 having a source terminal connected to a second driving voltage VDD_PAM terminal, a drain terminal connected to a source terminal of the first driving transistor T8, and a gate terminal receiving an emission signal Emi_PWM(n).

The first driving voltage VDD_PWM and the second driving voltage VDD_PAM may be applied to the sub pixel circuits 110 from a driving voltage supply circuit (not shown) through a separate wiring (e.g., through a first wiring or wire and a second wiring or a wire) and thus do not affect each other. The first driving voltage VDD_PWM and the second driving voltage VDD_PAM be the voltage of the same magnitude, but are not limited thereto.

The PWM circuit 112 includes a second driving transistor T2 where the source terminal is connected to the first driving voltage VDD_PWM terminal, the capacitor C1 for coupling the sweep voltage sweeping two different voltages to the gate terminal of the second driving transistor T2, and a transistor T1 controlled to be turned on and off according to the scan signal SP(n) and configured to, while being turned on, apply, to the gate terminal of the second driving transistor T2, the PWM data voltage applied through the data signal line (Vsigm(m)_R/G/B).

The PWM circuit 112 includes a reset unit 12. The reset unit 12 is configured to forcibly turn on the transistor T9 before each light emitting period starts.

In order for the driving current to flow to the inorganic light emitting element 20, the transistor T9 needs to be turned on. However, when the light emitting of the inorganic light emitting element 20 in each light emitting period is terminated as described later, the transistor T9 is off, and it is needed that the transistor T9 is forcibly turned on before the next light emitting period begins.

According to an embodiment, by allowing the transistor T9 to be turned on at the beginning of each of the plurality of light emitting periods through the above configurations and the operation of the reset unit 12 described later, each light emitting period is able to operate normally.

Referring to FIG. 8A, the drain terminal of the second driving transistor T2 is connected to the gate terminal of the transistor T9 through the transistor T3 that is turned on according to the emission signal Emi_PWM(n).

Accordingly, the PWM circuit 112 may control the on/off operation of the transistor T9 through the operation of the reset unit 12 and the on/off operation of the second driving transistor T2, thereby controlling the time at which the driving current flows through the inorganic light emitting element 20 in the light emitting period.

The transistor has a source terminal connected to the drain terminal of the transistor T9, and a drain terminal connected to the anode terminal of the inorganic light emitting element 20. The transistor T10 may be turned on/off according to the control signal Emi_PAM(n) to electrically connect and disconnect the transistor T9 and the inorganic light emitting element 20. The on/off timing of the transistor T10 is related to the implementation of the black gray scale, and the detailed description thereof will be described later.

The transistor T11 is connected between the anode terminal and the cathode terminal of the inorganic light emitting element 20. The transistor T11 may be used for different purposes before and after the inorganic light emitting element 20 is mounted on the TFT layer to be described later, and is electrically connected to the sub pixel circuits 110.

For example, before the inorganic light emitting element 20 is connected to the sub pixel circuits 110, the transistor T11 may be turned on according to a control signal TEST to check whether the sub pixel circuits 110 are abnormal. After the inorganic light emitting element 20 is connected to the sub pixel circuits 110, the transistor T11 may be turned on according to a control signal TEST to discharge the charge remaining in the inorganic light emitting element 20.

A source terminal of the transistor T13 is connected to a drain terminal of the first driving transistor T8, and a drain terminal is connected to the sensing unit 200. The transistor T13 is turned on according to the control signal CCG_Sen (n) while the sensing operation is performed, and transmits a first current flowing through the first driving transistor T8 to the sensing unit 200 through a sensing line SSL.

A source terminal of the transistor T12 is connected to a drain terminal of the second driving transistor T2, and a drain terminal of the transistor T12 is connected to the sensing unit 200. The transistor T12 is turned on according to the control signal PWM_Sen(n) while the sensing operation is performed, and transmits a second current flowing through the second driving transistor T2 to the sensing unit 200 through the sensing line SSL.

The cathode terminal of the inorganic light emitting element 20 is connected to the ground voltage (VSS) terminal.

Referring to FIG. 8A, a unit configuration of the sensing unit 200 includes a current integrator 210 and an ADC 220. The current integrator 210 may include an amplifier 211, an integration capacitor 212, a first switch 213, and a second switch 214.

The amplifier 211 may include an inverting input terminal (−) connected to the sensing line SSL to receive first and second currents flowing through the first and second driving transistors T8 and T2 of the sub pixel circuits 110, and a non-inverting input terminal(+) receiving the reference voltage Vpre and an output terminal Vout.

The integration capacitor 212 may be connected between the inverting input terminal (−) of the amplifier 211 and the output terminal Vout, and the first switch 213 may be connected to both ends of the integration capacitor 212. Both ends of the second switch 214 may be connected to the output terminal Vout of the amplifier 211 and the input terminal of the ADC 220, respectively, and may be switched according to the control signal Sam.

A unit configuration of the sensing unit 200 shown in FIG. 8A may be provided for each sensing line SSL. For example, when a sensing line is provided for each column line of a pixel in the display panel 100 including 480 pixel column lines, the sensing unit 200 may include 480 unit configurations. As another example, when the sensing line is provided for each column line of R, G, and B sub pixels in the display panel 100 including 480-pixel column lines, the sensing unit 200 may include 1440 (=480×3) unit configurations.

Figure 8B:
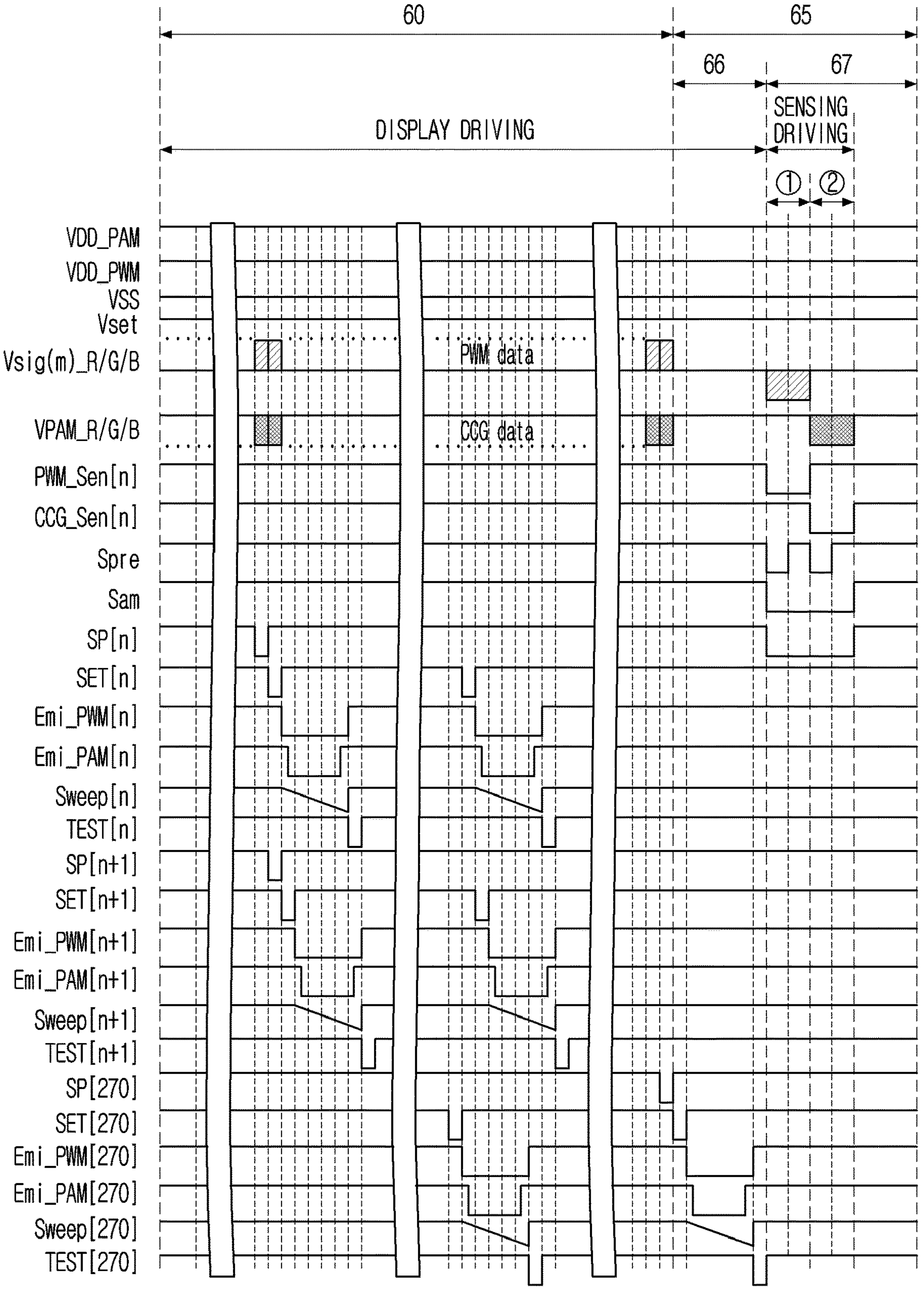
FIG. 8B is a driving timing diagram of the sub pixel circuits shown in FIG. 8A.

FIG. 8B is a driving timing diagram of the sub pixel circuits 110 shown in FIG. 8A. FIG. 8B illustrates various control signals, driving voltage signals, and data signals applied to the sub pixel circuits 110 during one image frame period and the blanking interval.

Referring to FIG. 8B, the display panel 100 may drive in the order of display driving and sensing driving.

During the display driving period, the display panel 100 is applied with the control signals SP, SET, Emi_PWM, Emi_PAM, Sweep and Test as illustrated in FIG. 8B. For example, during the display drive period, the sub pixel circuits 110 included in the nth row line of the display panel 100 may be applied with control signals SP(n), SET(n), Emi_PWM(n), Emi_PAM(n), Sweep(n) and Test(n) as shown in 8B.

As described above, the sub pixel circuits included in each row line of the display panel 100 may be in the order of a data setting period and a plurality of light emitting periods. The sub pixel circuits included in the entire row line of the display panel 100 may be driven in the order of row lines.

Referring to FIG. 8B, after the scan signal SP(n) related to the image data voltage setting operation is applied, based on one row line (e.g., $n^{th}$ row line), the emission signals SET(n), Emi_PWM(n), Emi_PAM(n), Sweep(n) related to the driving current providing operation are applied multiple times.

In addition, referring to the relationship between the row lines, it may be identified that the scan signal SP (n) for the $n^{th}$ row line and the scan signal SP (n+1) for the (n+1)th row line are sequentially applied in the order of the row lines. Accordingly, it may be identified that the emission signals for the $n^{th}$ row line (SET(n), Emi_PWM(n), Emi_PAM(n), Sweep(n)) and the emission signals for the $n+1^{th}$ row line (SET(n+1), Emi_PWM(n+1), Emi_PAM(n+1), Sweep(n+1)) are sequentially applied in the order of row lines.

Hereinafter, referring to the circuit of the control signals (SP(n), SET(n), Emi_PWM(n), EMi_PAM(n) and Sleep(n)) related to the nth row lines of FIG. 8B and the circuit of FIG. 8A, a specific operation of sub pixel circuits 110 will be described.

First, when the low-level scan signal SP(n) is applied to the sub pixel circuits 110 in the data setting period, the transistor T1 of the PWM circuit 112, the transistor T6 of the constant current generator circuit 111, and the transistor T5 of the driving voltage changing unit 113 are turned on.

When the transistor T1 is turned on, the PWM data voltage applied from the second data driver (not shown) is applied to as a gate terminal (hereinafter, A node) of the second driving transistor T2 through the data signal line Vsig(m)_R/G/B.

Since the first driving voltage VDD_PWM is applied to the source terminal of the second driving transistor T2, a voltage corresponding to a difference between the first driving voltage VDD_PWM and the PWM data voltage is set between the source terminal and the gate terminal of the second driving transistor T2.

The PWM data voltage may be higher than the first driving voltage VDD_PWM. Therefore, the second driving transistor T2 remains turned off state while the PWM data voltage is set to the A node.

When the transistor T6 is turned on, the constant current generator data voltage CCG data applied from the first data driver (not shown) is applied to the gate terminal (hereinafter, referred to as B node) of the first driving transistor T8 through the data signal line VPAM_R/G/B.

Since the transistor T5 of the driving voltage changing unit 113 is also turned on according to the scan signal SP(n), the first driving voltage VDD_PWM is applied to the source terminal of the first driving transistor T8 during the data setting period. Accordingly, a voltage corresponding to a difference between the first driving voltage VDD_PWM and the constant current generator data voltage is set between the source terminal and the gate terminal of the first driving transistor T8.

The constant current generator data voltage may be lower than the first driving voltage VDD_PWM. Therefore, when the constant current generator data voltage is set to the B node, the first driving transistor T8 maintains a turned-on state.

When the first light emitting period for the $n^{th}$ row line starts, a low-level emission signal SET (n) is applied to the transistor T4. Accordingly, the low voltage Vset is charged to the capacitor C3 through the turned-on transistor T4, and the gate terminal (hereinafter, C node) of the transistor T9 is applied with the low voltage, and the transistor T9 is turned on.

During the first light emitting period, the emission signal Emi_PWM(n), Emi_PAM(n) and Sweep(n) are applied to the sub pixel circuits 110 as illustrated in FIG. 8B.

When the low-level emission signal Emi_PWM(n) is applied to the transistor T7 of the driving voltage changing unit 113, the transistor T7 may be turned on, and the second driving voltage VDD_PAM is applied to the source terminal of the first driving transistor T8.

Even if the voltage applied to the source terminal of the first driving transistor T8 is changed from the first driving voltage (VDD_PWM) to the second drive voltage (VDD_PAM), the voltage between the source terminal and the gate terminal of the first driving transistor T8 may be maintained as the setting voltage in the data setting interval by the capacitor C2. Thus, the first driving transistor (T8) still remains as the turned-on state.

If the low-level emission signal Emi_PAM(n) is applied to the transistor T10, the transistor T10 is turned on.

The driving current flows to the inorganic light emitting element 20, through the transistor T7 turned on according to the signal of the Emi_PWM(n) signal, the first driving transistor T8 maintaining the turned-on state, the transistor T9 turned on according to the SET(n) signal, and transistor T10 turned on according to Emi_PAM(n) signal. The size of the driving current is determined based on the voltage difference between the source terminal and the gate terminal of the first driving transistor T8, in particular, the magnitude of the constant current generator data voltage set at the gate terminal of the first driving transistor T8.

If the emission signal sweep(n), for example, a linearly decreasing sweep voltage is applied to the capacitor C1, as shown in FIG. 8B, the applied sweep voltage is coupled to the A node, and thus the voltage of the A node is linearly reduced.

Accordingly, when the difference value between the voltage of the A node and the voltage of the first driving voltage VDD_PWM reaches the threshold voltage value of the second driving transistor T2, the second driving transistor T2 is turned on, and the first driving voltage VDD_PWM of the high level is applied to the gate terminal of the transistor T9 through the turned-on second driving transistor T2.

Accordingly, the transistor T9 is turned off, and the driving current does not flow to the inorganic light emitting element 20, and the inorganic light emitting element 20 may stop emitting light. The time at which the driving current is provided to the inorganic light emitting element 20 is determined by the voltage difference between the source terminal of the second driving transistor T2 and the gate terminal, and in particular, by the magnitude of the PWM data voltage set to the gate terminal of the second driving transistor T2.

The emission signals (SET(n), Emi_PWM(n), Emi_PAM (n), and Sweep(n)) are respectively applied in the light emitting periods after the second time for the nth row line, and the inorganic light emitting elements 20 emit light on the basis of the image data voltage set in the data setting period.

There may be a charge remaining on the inorganic light emitting element 20 even when light emission of the inorganic light emitting element 20 has been completed. This causes the inorganic light emitting element 20 to be finely emitted even when the light emitting period has ended, which may be particularly problematic when expressing a low gray-scale (e.g., black).

According to an embodiment, as shown in FIG. 8B, after each light emitting period is terminated (i.e., after application of a low-level emission signal Emi_PWM(n) is completed), a low-level TEST(n) signal is subsequently applied directly. Accordingly, the charge remaining on the inorganic light emitting element 20 through the turned-on transistor T11 may be completely discharged to the ground voltage VSS terminal, and the problem described above may be solved.

Although the operation related to the $n^{th}$ row line has been described above, the operation of the remaining row lines may also be sufficiently understood through the above description.

Referring to the timing diagram of FIG. 8B in detail, the points in time when the emission signal Emi_PWM(n) and the emission signal Emi_PAM(n) become low levels are different from each other. This is to implement the black gray scale as described above.

Specifically, when the PWM data voltage corresponding to the black gray scale is set at the node A, the transistor T9 should be turned off when the light emitting period starts. Theoretically, at the point in time when the emission signal Emi_PWM(n) becomes low, the first driving voltage VDD_PWM is applied to the node C through the turned-on second driving transistor T2 and the turned-on transistor T3 so that the transistor T9 is turned off immediately. (When the transistor T9 is turned off immediately, the driving current does not flow through the inorganic light emitting element 20 at all, and a black gray scale is expressed.)

In reality, however, the transistor T9 might not be immediately turned off because time is taken until the first drive voltage VDD_PWM charged to the C node. Specifically, until the first driving voltage VDD_PWM is applied to the C node, charging of the capacitor C3 is started and the voltage that may turn off the transistor T9 is charged to the C node, the transistor T9 may maintain the turned-on state, and accordingly, a leakage of the driving current is generated in the transistor T9.

In the case where the transistor T9 and the inorganic light emitting element 20 are directly connected without the transistor T10, even if the PWM data voltage corresponding to the black gray scale is set to the A node, the driving current leaked from the transistor T9 may flow through the inorganic light emitting element 20 for a predetermined time, so that the accurate black gray scale cannot be embodied.

To solve this problem, according to an embodiment, the transistor T10 may be disposed between the transistor T9 and the inorganic light emitting element 20. The driving unit 500 may apply the emission signal Emi_PAM(n) so that the transistor T10 is turned on after a predetermined time elapses from the time when the emission signal Emi_PWM (n) becomes a low level. Here, the predetermined time may be at least a time at which the voltage of the C node is charged to a voltage capable of turning off the transistor T9 from the Vset voltage.

In this example, the leakage current, which may occur because even when the PWM data voltage corresponding to the black gray scale is set to the A node, the transistor T9 is not immediately turned off, may be blocked by the transistor T10. Accordingly, an accurate black gray scale may be implemented.

Referring to FIGS. 8A and 8B, in the source terminal of the first driving transistor T8 of the constant current generator circuit 111, different driving voltages may be applied to the data setting period and the light emitting period through the driving voltage changing unit 113.

This is to apply the first driving voltage VDD_PWM to the constant current generator circuit 111 to set an accurate voltage between the source terminal and the gate terminal of the first driving transistor T8, by applying the first driving voltage VDD_PWM which does not generate a voltage drop according to the driving current during the data setting period to the constant current generator circuit 111.

In detail, since there is a resistance component in the display panel 100, an IR voltage drop may occur when a driving current flows, thereby causing a drop of the second driving voltage VDD_PAM. Also, as described above, in various embodiments, while the sub pixel circuits of some row lines of the display panel 100 operate in the light emitting period, the sub pixel circuits of the other row line operate in the data setting period.

When the second driving voltage VDD_PAM is equally applied to the data setting interval and the light emitting period, the second driving voltage VDD_PAM applied to the low line (specifically, sub pixel circuits of the low line) operating in the data setting interval may be affected by the drop of the second driving voltage (VDD_PAM) by the driving current flowing through the low line (specifically, constant current generator circuits of the low line) operating in the light emitting period, and this interferes with setting of the exact voltage between the source terminal and the gate terminal of the first driving transistor (T6) belonging to the low line operating in the data setting interval.

The resistance component present in the actual display panel 100 has a different value for each area of the display panel 100. Accordingly, when the driving current flows, the difference between the IR voltage drop value, that is, the voltage drop of the second driving voltage VDD_PAM, is generated for each area of the display panel 100, and this also needs to be compensated.

According to an embodiment, the driving unit 500 may control the driving voltage changing unit 113 to apply the first driving voltage VDD_PWM without a voltage drop according to the driving current to the constant current generator circuit 111 in the data setting period, thereby setting an accurate voltage to be set between the source terminal and the gate terminal of the first driving transistor T8.

The driving voltage applied to the constant current generator circuit 111 is changed to the second driving voltage VDD_PAM in the light emitting period subsequently, the voltage between the source terminal and the gate terminal of the first driving transistor T8 set in the data setting period is maintained by the capacitor C2, so that there is no problem for the constant current generator circuit 111 in providing driving current corresponding to the constant current generator data voltage set in the data setting period to the inorganic light emitting element 20.

The driving current does not flow in the second driving transistor T2 of the PWM circuit 112. Therefore, the voltage drop of the first driving voltage (VDD_PWM) is not generated in the data setting period and the light emitting period or the drop is in an ignorable level, so if the first driving voltage VDD_PWM is applied to the PWM circuit 112 in the data setting period and the light emitting period in the same manner, it would not be problematic.

According to an embodiment, the same constant current generator data voltage may be applied to all the constant current generator circuits 111 of the display panel 100. Therefore, a driving current (i.e., a constant current) of the same magnitude is provided to the inorganic light emitting element 20 through the constant current generator circuit 111. Accordingly, the wavelength change problem of the LED according to the change in the size of the driving current may be solved.

Also, a PWM data voltage corresponding to a gray scale value of each sub pixel may be applied to each PWM circuit 112 of the display panel 100. Therefore, the gray scale of each sub pixel may be expressed by controlling the driving time of the driving current through the PWM circuit 112.

While the same constant current generator voltage is applied to one display panel, a different constant current generator voltage may be applied to the other display panel. Therefore, when a plurality of display panels each constituted of the display panel 100 are connected to form one large display device, the luminance non-conformity or color non-conformity between the display panels may be compensated through constant current generator voltage adjustment.

For convenience, it has been described that the same constant current generator data voltage is applied to the constant current generator circuit 111, in terms of the wavelength change problem solution of the LED and the gray scale representation of the image. However, as described above, in various embodiments, since the constant current generator data voltage is corrected to compensate for the threshold voltage and mobility non-conformity between the first driving transistors T8, the constant current generator data voltage corrected by the sensing operation is applied to the actual constant current generator circuit 111. This is also the same as the PWM data voltage applied to the PWM circuit 112.

Referring back to FIG. 8B, the sensing driving period may include the PWM circuit 112 sensing period ① and the constant current generator circuit 111 sensing period ②.

During the PWM circuit 112 sensing period ①, the second current flowing through the second driving transistor T2 is transmitted to the sensing unit 200 based on the second specific voltage.

During the constant current generator circuit 111 sensing period ②, the first current flowing through the first driving transistor T8 is transmitted to the sensing unit 200 based on the first specific voltage.

Accordingly, the sensing unit 200 may output first sensing data and the second sensing data, respectively, based on the first and second currents.

According to an embodiment, the sensing driving may be performed within a blanking interval 65, as shown in FIG. 8B. The blanking interval 65 refers to a time interval in which valid image data valid is not input to the display panel 100. For example, as for an image of 120 Hz, the display driving period may occupy 7.3 ms and the blanking interval of 1 ms within one image frame time, but an embodiment is not limited thereto.

Accordingly, the sensing unit 200 may sense a current flowing through the driving transistor T8 and T2 based on a specific voltage applied in the blanking interval 65 of one image frame, and may output sensing data corresponding to the sensed current.

However, embodiments are not limited thereto. For example, the sensing driving may be performed during a booting period, a power-off period, or a screen-off period of a display apparatus 1000. Here, the booting period refers to a period until the screen is turned on after the system power is applied, and the power-off period refers to a period until the system power is released after the screen is turned off, and the screen-off period may refer to a period where the system power is applied but the screen is turned off.

Referring to FIGS. 8A and 8B, the operation of the display apparatus 1000 in the sensing driving period will be described in detail with reference to FIGS. 8A and 8B.

In detail, during the PWM circuit 112 sensing period ①, a second specific voltage is applied from the second data driver to the data signal line Vsig(m)_R/G/B. The second specific voltage may be any predetermined voltage for turning on the second driving transistor T2. The transistor T1 is turned on according to the scan signal SP(n), and the second specific voltage is inputted to the A node through the turned-on transistor T1.

The transistor T12 is turned on according to the control signal PWM_Sen (n) in the PWM sensing period ①, and the second current flowing through the second driving transistor T2 is transmitted to the sensing unit 200 through the turned-on transistor T12.

During the PWM circuit 112 sensing period ①, the first switch 213 of the sensing unit 200 is turned on and off according to the control signal Spre. Hereinafter, a period in which the first switch 213 is turned on within the PWM circuit 112 sensing period ① is referred to as a first initialization period, and a period in which the first switch 213 is turned off is referred to as a first sensing period.

Since the first switch 213 is turned on in the first initialization period, the reference voltage Vpre input to the non-inverting input terminal + of the amplifier 211 is maintained in the output terminal Vout of the amplifier 211.

Since the first switch 213 is turned off in the first sensing period, the amplifier 211 operates as a current integrator to integrate the second current. The voltage difference between both ends of the integration capacitor 212 due to the second current flowing through the inverting input terminal (−) of the amplifier 211 in the first sensing period increases as the sensing time elapses, that is, the amount of charge accumulated increases.

However, according to the virtual ground characteristic of the amplifier 211, the voltage of the inverting input terminal (−) in the first sensing period is maintained at the reference voltage Vpre regardless of the increase in the voltage difference of the integration capacitor 212, so that the voltage of the output terminal Vout of the amplifier 211 is lowered in response to the voltage difference between both ends of the integration capacitor 212.

In this principle, the second current flowing into the sensing unit 200 in the first sensing period is accumulated as an integral value Vpsen, which is a voltage value, through the integration capacitor 212. Since the drop slope of the voltage of the output terminal Vout of the amplifier 211 increases as the second current increases, the magnitude of the integral value Vpsen becomes smaller as the second current increases.

The integration value Vpsen is input to the ADC 220 while the second switch 214 is maintained in the power-on state in the first sensing period, and is converted into the second sensing data in the ADC 220 and output to the correction unit 300.

During the constant current generator circuit 111 sensing period ②, a first specific voltage is applied from the first data driver to the data signal line VPAM_R/G/B. The first specific voltage is a predetermined voltage for turning on the first driving transistor T8. The transistor T6 is turned on according to the scan signal SP(n), and the first specific voltage is input to the B node through the turned-on transistor T6.

In the sensing period ② of the constant current generator circuit 111, the transistor T13 is turned on according to the control signal CCG_Sen(n), and the first current flowing through the first driving transistor T8 is transmitted to the sensing unit 200 through the turned-on transistor T13.

Even during the constant current generator circuit 111 sensing period ②, the first switch 213 of the sensing unit 200 is turned on and off according to the control signal Spre. Hereinafter, the period in which the first switch 213 is turned on in the constant current generator circuit 111 sensing period ② is referred to as the second sensing period, and the turned-off period is referred to as the second sensing period.

In the second initialization period, since the first switch 213 is turned on, the reference voltage Vpre input to the non-inverting input terminal + of the amplifier 211 is maintained in the output terminal Vout of the amplifier 211.

Since the first switch 213 is turned off in the second sensing period, the amplifier 211 operates as a current integrator to integrate the first current. The voltage difference between both ends of the integration capacitor 212 due to the first current flowing into the inverting input terminal (−) of the amplifier 211 in the second sensing period increases as the sensing time passes, that is, as the amount of charge accumulated increases.

However, due to the virtual ground characteristics of the amplifier 211, the voltage of the inverting input terminal (−) in the second sensing period is maintained at the reference voltage Vpre regardless of the increase in the voltage difference of the integration capacitor 212, so that the voltage of the output terminal Vout of the amplifier 211 is lowered in response to the voltage difference between both ends of the integration capacitor 212.

In this principle, the first current flowing into the sensing unit 200 in the second sensing period is accumulated as an integral value Vcsen, which is a voltage value through the integration capacitor 212. Since the descent gradient of the voltage of the output terminal Vout of the amplifier 211 increases as the first current increases, the magnitude of the integrated value Vcsen becomes smaller as the first current increases.

The integration value Vcsen is input to the ADC 220 while the second switch 214 is maintained to be the power-on state in the second sensing period, and is converted into the first sensing data from the ADC 220 and then output to the correction unit 300.

Accordingly, the correction unit 300 may obtain first and second compensation values based on the first and second sensing data output from the sensing unit 200, and store and update the obtained first and second compensation values in a memory. When the display operation is performed, the correction unit 300 may correct the constant current generator data voltage and the PWM data voltage to be applied to the sub pixel circuits 110 based on the first and second compensation values, respectively.

According to an embodiment, the first specific voltage and the second specific voltage may be applied to sub pixel circuits of one row line per one image frame. That is, according to an embodiment, the sensing driving described above may be performed on one row line per one image frame.

The sensing driving described above may be sequentially performed in the order of the row lines of the display panel 100. Therefore, for example, when the display panel 100 includes 270 row lines, sensing driving on sub pixel circuits included in the first row line may be performed after the first image frame is displayed, and sensing driving on sub pixel circuits included in the second row line may be performed after the second image frame is displayed. In this manner, after the $270^{th}$ image frame is displayed, the sensing driving on sub pixel circuits included in the $270^{th}$ row line may be performed, so that the sensing driving of the sub pixel circuits included in the entire row line included in the display panel 100 may be completed once.

The sensing driving described above may proceed in a random row line order. In this example, the sensing driving on entire row line of the display panel 100 in the above example may be performed in a random order while the 270 consecutive image frames are displayed.

According to an embodiment, the first specific voltage and the second specific voltage may be applied to sub pixel circuits of a plurality of row lines per one image frame. The sensing driving described above with respect to the plurality of row lines per image frame may be performed. In this example, the sensing driving described above may proceed sequentially, in a plurality of row line units, sequentially or in a random order.

The sensing driving in the order of the PWM circuit 112 sensing period ① and the constant current generator circuit 111 sensing period ② is described as an example, but an embodiment is not limited thereto, and according to an embodiment, the PWM circuit 112 sensing period ① may proceed first and then constant current generator circuit 111 sensing period ② later.

In addition, that the sensing driving is performed after the display driving is described as an example, but an embodiment is not limited thereto and according to an embodiment, the sensing driving may be performed first and then display driving may be performed afterwards.

Hereinafter, various embodiments will be described with reference to FIGS. 9A to 11B. Embodiments shown in FIGS. 9A to 11B are similar in configuration and operation principle to those described above with reference to FIGS. 8A and 8B, and thus, a duplicate description will be omitted and the difference will be mainly described.

Figure 9A:
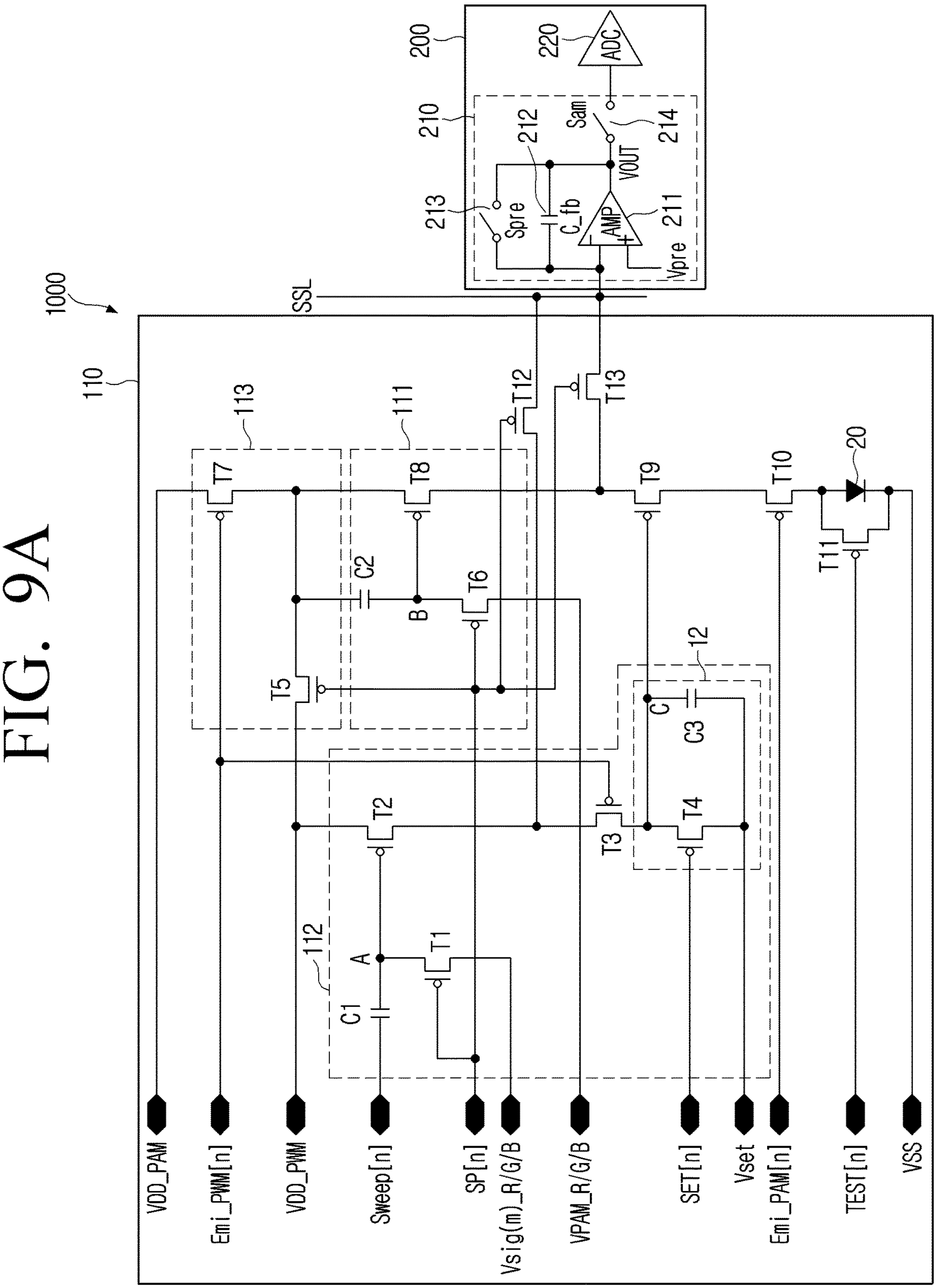
FIG. 9A is a detailed circuit diagram of sub pixel circuits and sensing units according to an embodiment.
Figure 9B:
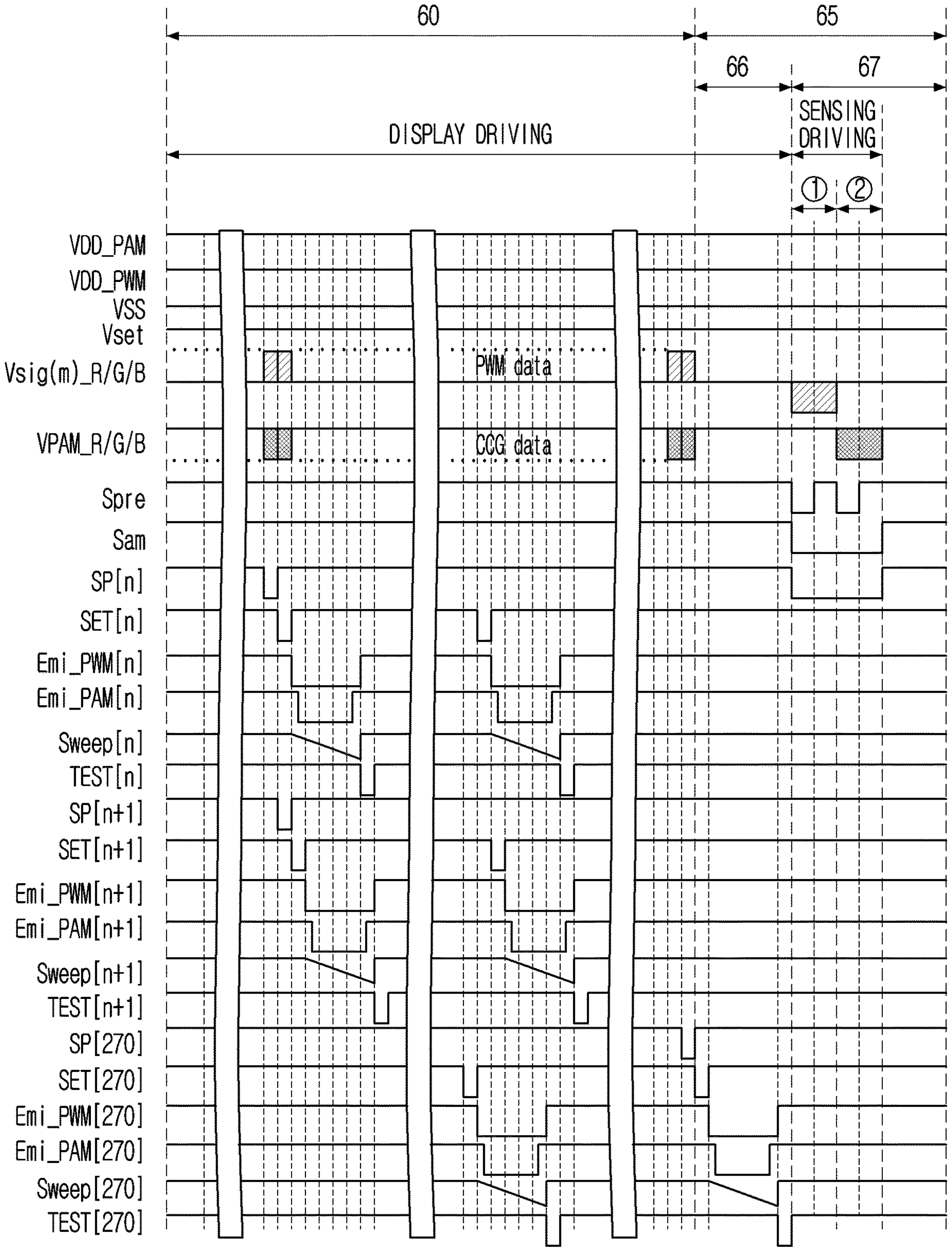
FIG. 9B is a driving timing diagram of the sub pixel circuits shown in FIG. 9A.

FIG. 9A is a detailed circuit diagram of the sub pixel circuits 110 and the sensing unit 200 according to an embodiment, and FIG. 9B is a driving timing diagram of the sub pixel circuits 110 illustrated in FIG. 9A.

The sub pixel circuits 110 shown in FIG. 9A are different from FIG. 8A only in that the sub pixel circuits 110 shown in FIG. 9A use the scan signal SP(n) without using a separate control signal (PWM_Sen(n), CCG_Sen(n) of FIG. 8A), and the rest of the sub pixel circuits 110 shown in FIG. 8A are the same as the sub pixel circuits 110 shown in FIG. 8A. The driving timing shown in FIG. 9B is also the same as the driving timing of FIG. 8B, except that there is no control signal PWM_Sen(n), CCG_Sen(n).

Referring to FIGS. 9A and 9B, the transistors T12 and T13 are turned on together as well as transistors T1, T5, and T6 as the low-level scan signal SP(n) is applied to the data setting period. However, in this example, by turning off the switch (not shown) inside the amplifier 211, a current may be prevented from flowing to the sensing unit 200. Accordingly, the sensing driving operation is not performed in the data setting period, and only the data setting operation is performed.

A switch inside the amplifier 211 may be turned on in the sensing driving interval. Therefore, in the sensing driving period, the first current and the second current may flow to the sensing unit 200, and accordingly, the sensing operation described above may be performed.

The second specific voltage is applied to the gate terminal of the second driving transistor T2 during the sensing period ① of the PWM circuit 112, and the first specific voltage is applied to the gate terminal of the first driving transistor T8 during the constant current generator circuit 111 sensing period ②, and the time when the second specific voltage is applied and the time at which the first specific voltage is applied are not overlapped with each other. Therefore, the sensing driving operation described with reference to FIGS. 8A and 8B may be performed in the same manner without using a separate control signal PWM_Sen (n), CCG_Sen(n).

The rest descriptions of the display driving and the sensing driving of the sub pixel circuits 110 overlap the descriptions of FIGS. 8A and 8B, a description will be omitted.

Figure 10A:
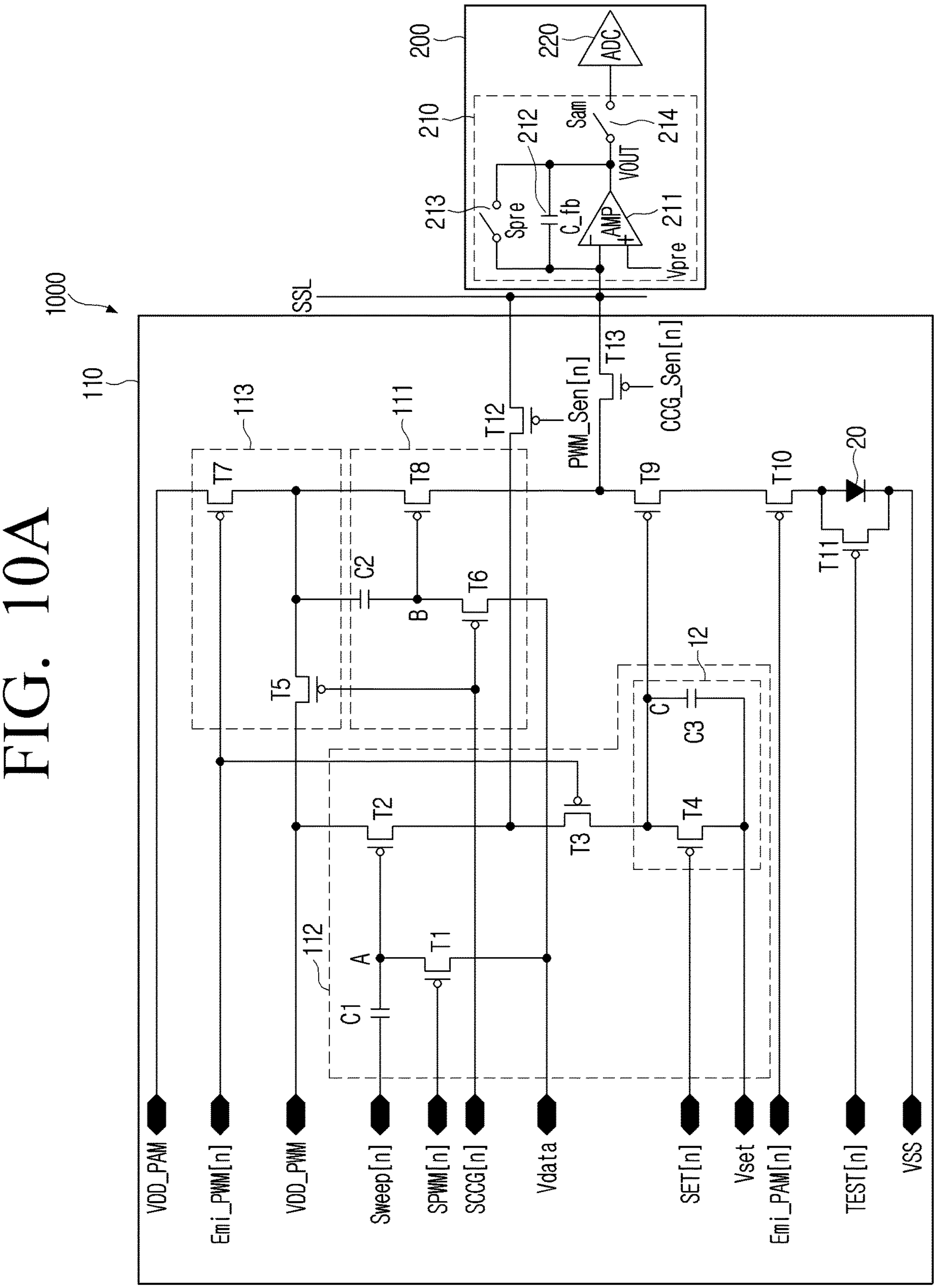
FIG. 10A is a detailed circuit diagram of sub pixel circuits and sensing units according to an embodiment.
Figure 10B:
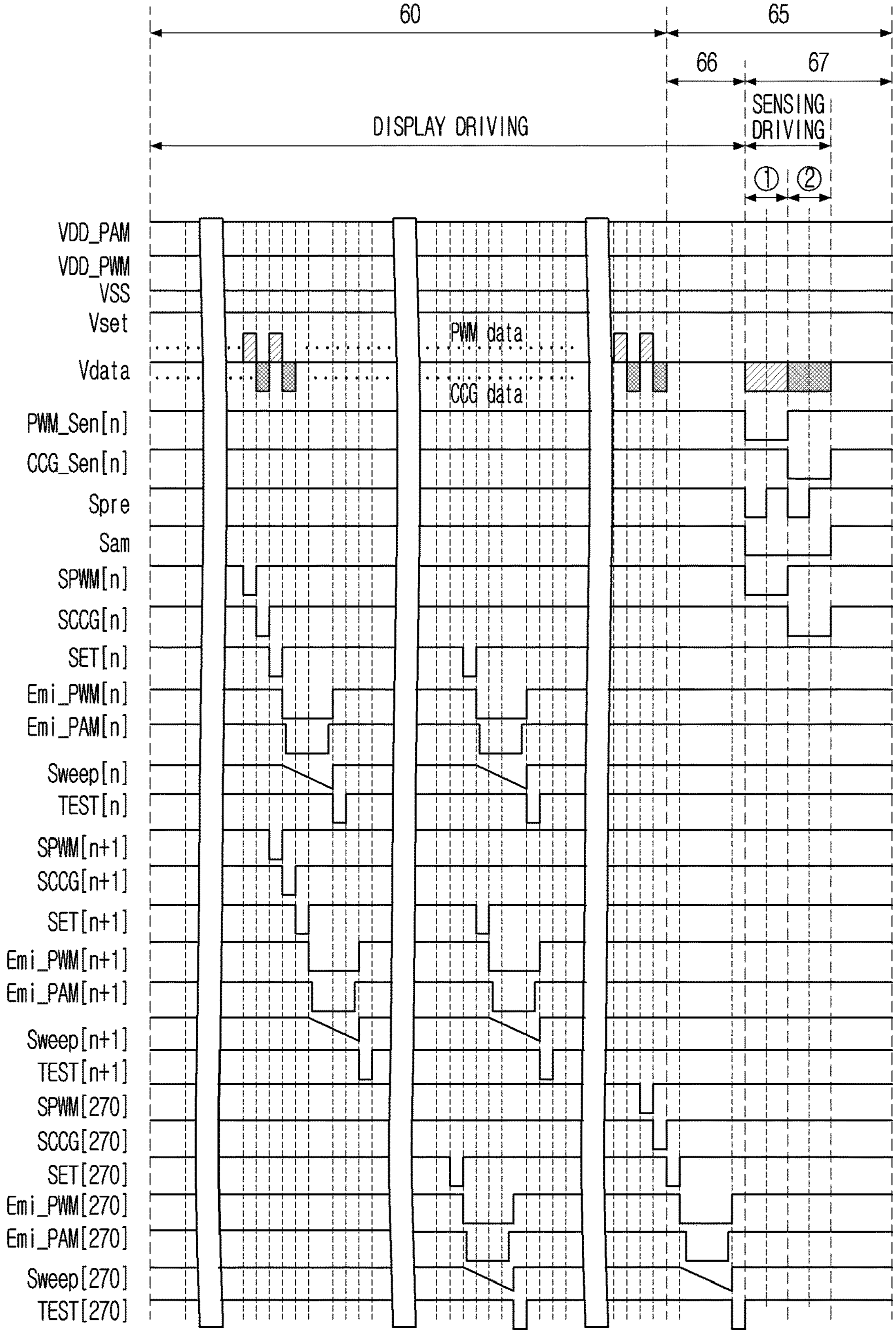
FIG. 10B is a driving timing diagram of the sub pixel circuits shown in FIG. 10A.

FIG. 10A is a detailed circuit diagram of the sub pixel circuits 110 and the sensing unit 200 according to an embodiment, and FIG. 10B is a driving timing diagram of the sub pixel circuits 110 illustrated in FIG. 10A.

The sub pixel circuits 110 shown in FIG. 10A are the same as the sub pixel circuits 110 shown in FIG. 8A, except that the image data voltage and the specific voltage are applied through one data signal line Vdata.

In this example, the PWM data voltage and the constant current generator data voltage are time-divided from one data driver and applied to the sub pixel circuits 110 through the data signal line Vdata during the data setting period, and the second specific voltage and the first specific voltage are time-divided from the one data driver and applied to the sub pixel circuits 110 through the data signal line Vdata during the sensing driving period.

Accordingly, two scan signals are required to apply a PWM data voltage and a constant current generator data voltage, which are time-divided and applied during a data setting period, to A and B nodes, respectively, and apply a second specific voltage and a first specific voltage, which are time-divided and applied during a sensing driving period, to the A and B nodes, respectively, and the scan signal SPWM (n) and the scan signal SCCG (n) of FIGS. 10A and 10B show these two scan signals.

Referring to FIGS. 10A and 10B, when the low-level scan signal SPWM (n) is applied to the sub pixel circuits 110, the PWM data voltage is applied to the A node through the turned-on transistor T1. When the low-level scan signal SCCG(n) is applied to the sub pixel circuits 110, the constant current generator data voltage CCG data is applied to the B node through the turned-on transistor T6.

When the low-level scan signal SPWM(n) is applied to the sub pixel circuits 110 during the PWM circuit 112 sensing period ① of the sensing driving periods, the second specific voltage is input to the Anode through the turned-on transistor T1. When the low-level scan signal SCCG(n) is applied to the sub pixel circuits 110, the first specific voltage is input to the B node through the turned-on transistor T6.

Referring to FIG. 8B, a scan signal is applied in the order of SPWM(n) and SCCG (n), but an embodiment is not limited thereto, and SCCG(n) signal may be applied first, and the SPWM(n) signal may be applied thereafter according to an embodiment.

The rest descriptions about the display driving and the sensing driving of the sub pixel circuits 110 are overlapped with FIGS. 8A and 8B and will not be further described.

Figure 11A:
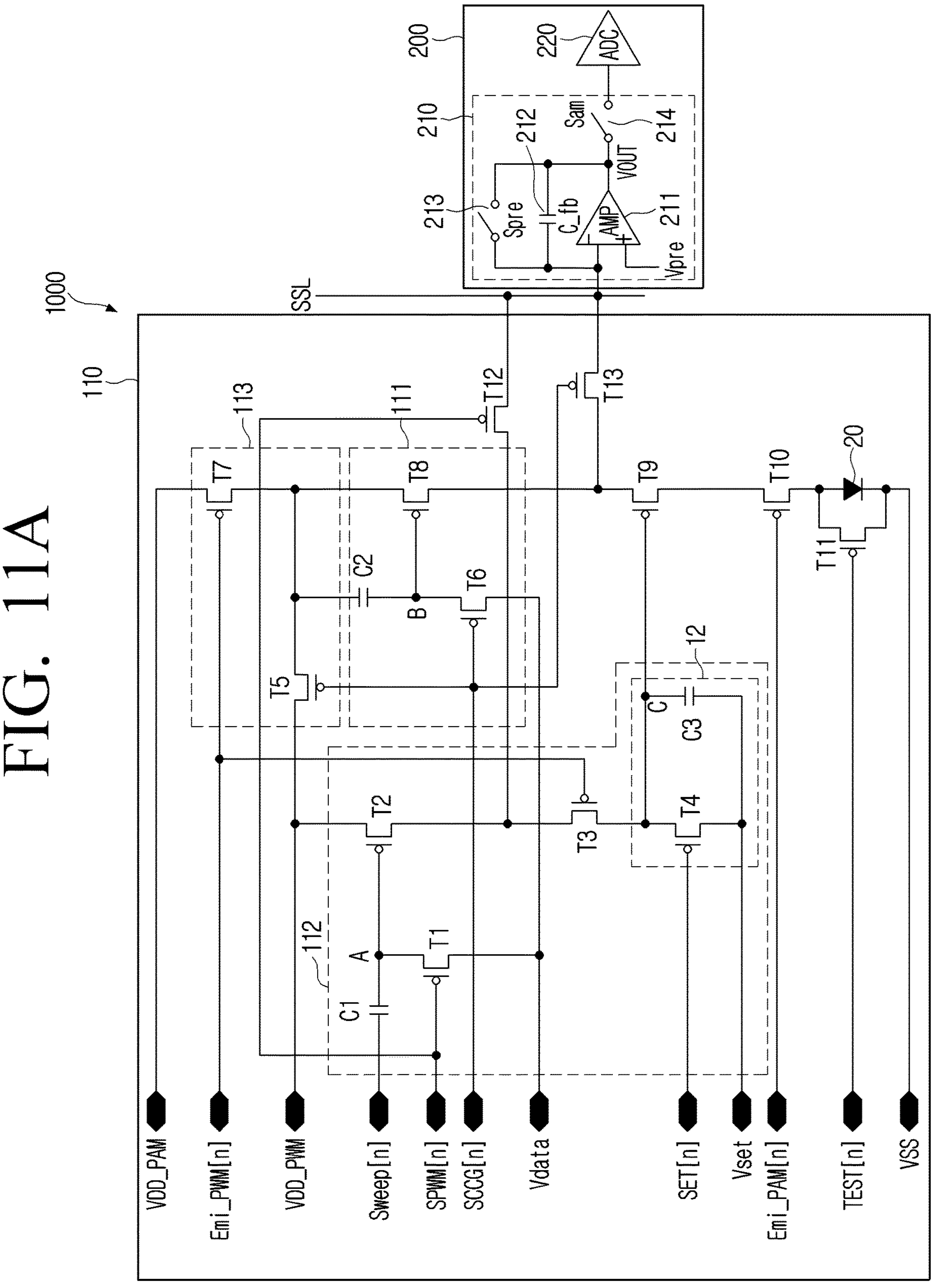
FIG. 11A is a detailed circuit diagram of sub pixel circuits and sensing units according to an embodiment.
Figure 11B:
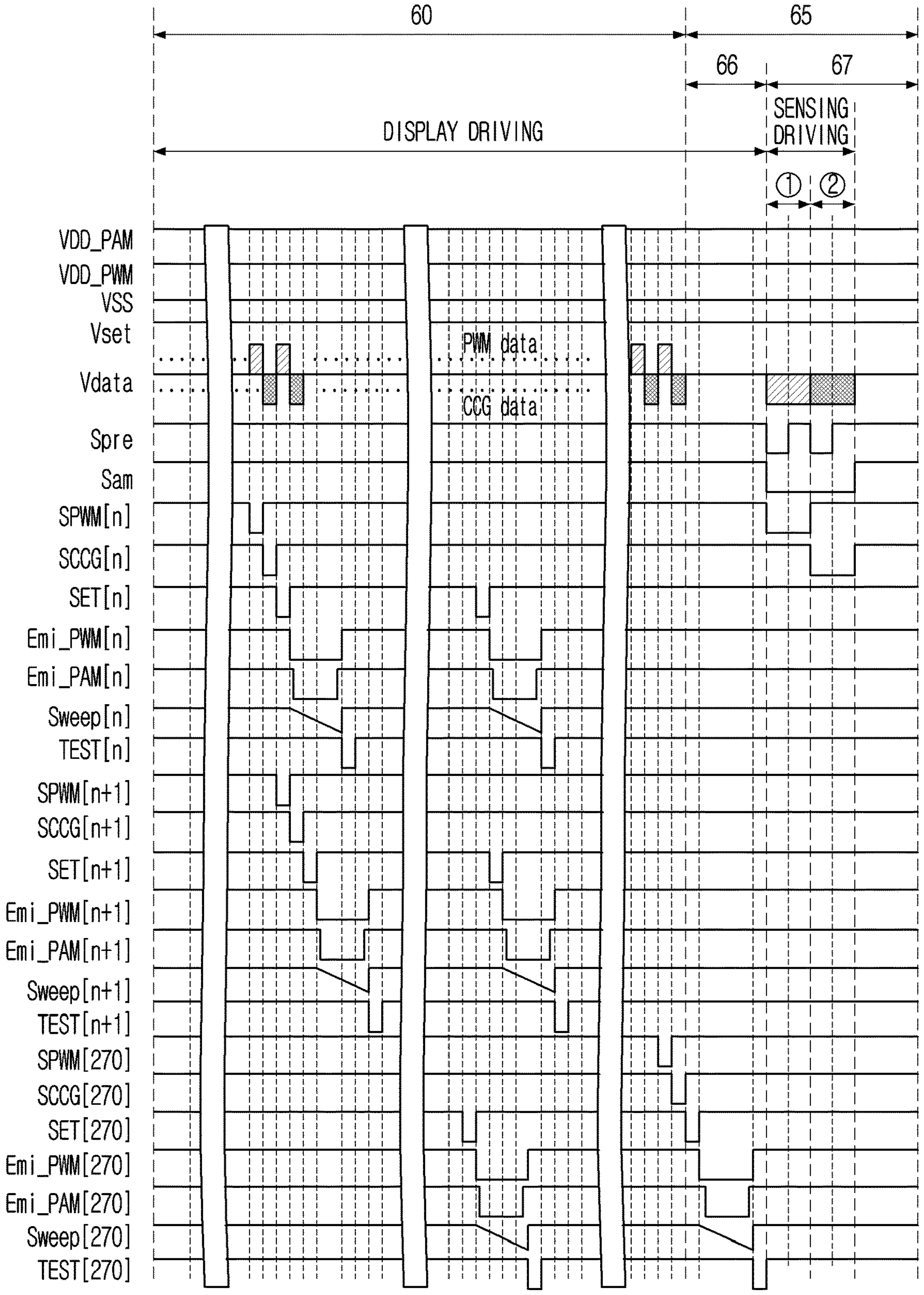
FIG. 11B is a driving timing diagram of the sub pixel circuits shown in FIG. 11A.

FIG. 11A is a detailed circuit diagram of the sub pixel circuits 110 and the sensing unit 200 according to an embodiment, and FIG. 11B is a driving timing diagram of the sub pixel circuits 110 illustrated in FIG. 11A.

The sub pixel circuits 110 shown in FIG. 11A are different from the sub pixel circuits 110 of FIG. 8A in terms of being applied with image data voltage (PWM data voltage, constant current generator data voltage) and specific voltage (second specific voltage, first specific voltage) through one data signal line Vdata, and are similar with the sub pixel circuits 110 of FIG. 10A.

Referring to FIGS. 11A and 11B, an image data voltage and a specific voltage are applied to sub pixel circuits 110 during a data setting period and a sensing driving period, respectively, using two scan signals (or scan signal lines), such as SPWM(n) and SCCG(n).

The sub pixel circuits 110 shown in FIG. 11A are different from an embodiment of FIG. 8A and similar to an embodiment of FIG. 9A in terms of using a scan signal without using a separate control signal (PWM_Sen(n), CCG_Sen(n) of FIG. 8A) in order to control the on/off of the transistor T12 and the transistor T13.

Referring to an embodiment of FIG. 11A, since two scan signals, such as SPWM(n) and SCCG(n), are used, the gate terminal of the transistor T12 is connected to the scan signal SPWM(n), and the gate terminal of the transistor T13 is connected to the scan signal SCCG(n).

In the case of an embodiment of FIGS. 11A and 11B, the switch (not shown) inside the amplifier 211 is turned off in the data setting period, and the switch inside the amplifier 211 is turned on in the sensing driving period, so that a current flows to the sensing unit 200 only in the sensing driving period.

The remaining contents of the display driving and sensing driving of the sub pixel circuits 110 are overlapped with the contents described above in FIGS. 8A through 10B, and thus the description thereof will be omitted.

Hereinafter, various embodiments will be described with reference to FIGS. 12A to 15B. In describing FIGS. 12A to 15B, the same contents as described above will be omitted or briefly described.

Figure 12A:
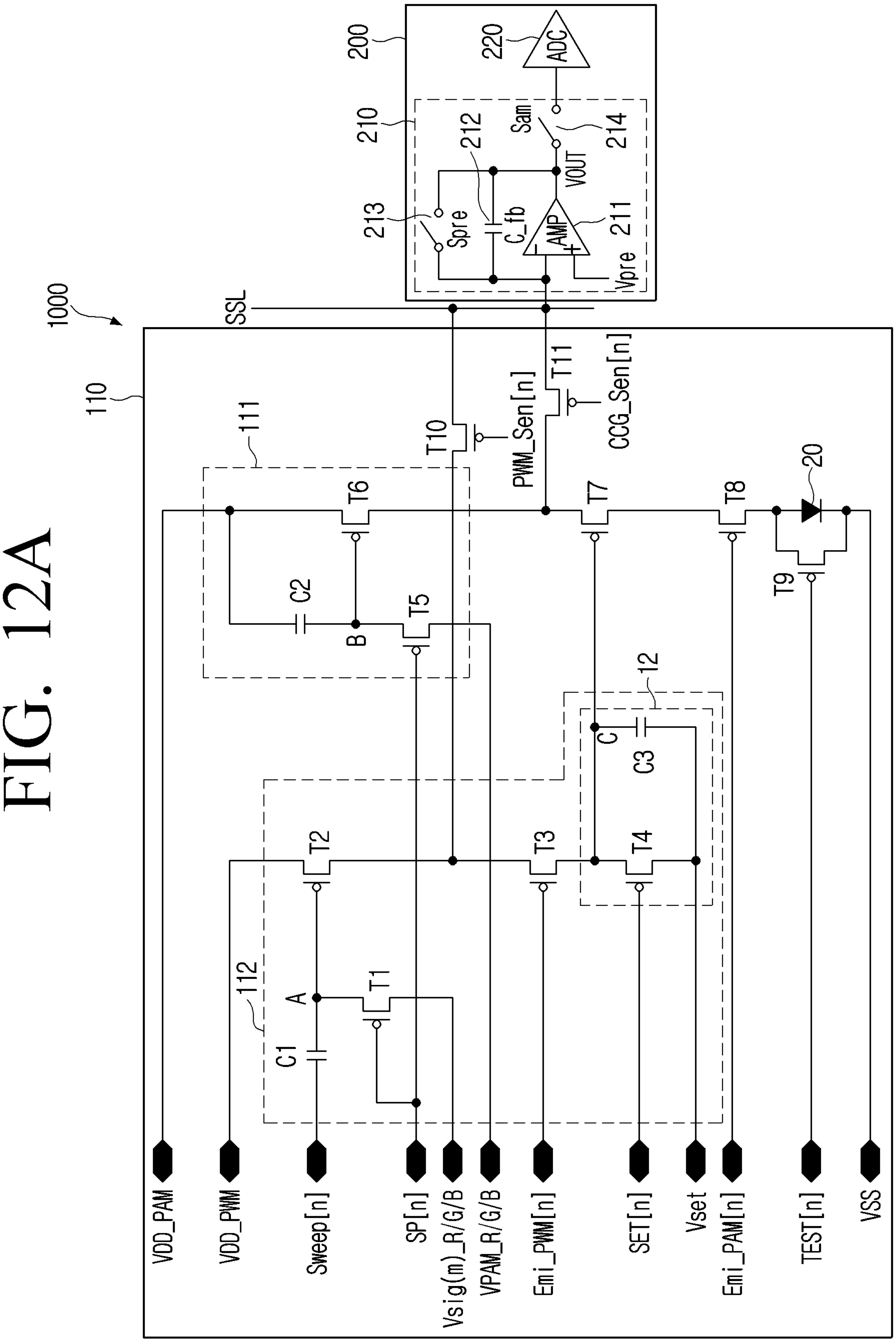
FIG. 12A is a detailed circuit diagram of sub pixel circuits and sensing units according to an embodiment.

FIG. 12A is a detailed circuit diagram of the sub pixel circuits 110 and the sensing unit 200 according to an embodiment.

Referring to FIG. 12A, the sub pixel circuits 110 includes the constant current generator circuit 111, the PWM circuit 112, the transistor T7, the transistor T8, the transistor T9, the transistor T10, and the transistor T11.

The constant current generator circuit 111 includes the first driving transistor T6, a capacitor C2 connected between a source terminal and a gate terminal of the first driving transistor T6, and the transistor T5 for applying a constant current generator data voltage applied through the data signal line VPAM_R/G/B to a gate terminal of the first driving transistor T6 while being turned on/off according to the scan signal SP(n).

The PWM circuit 112 includes the second driving transistor T2 in which the source terminal is connected to the first driving voltage VDD_PWM, the capacitor C1 for coupling the sweep voltage sweeping between two different voltages to the gate terminal of the second driving transistor T2, and the transistor T1 for applying the PWM data voltage to the gate terminal of the second driving transistor T2 while being turned on/off in accordance with the scan signal SP(n), and applying the PWM data voltage applied through the data signal line Vsgm(m)_R/G/B to the gate terminal of the second driving transistor T2.

The PWM circuit 112 also includes a reset unit 12. The reset unit 12 is configured to forcibly turn on the transistor T7 before each light emitting period starts. Since the description of the reset unit 12 is the same as that described above with respect to FIG. 8A, a duplicate description will be omitted.

Referring to FIG. 12A, the drain terminal of the second driving transistor T2 is connected to the gate terminal of the transistor T7 through the transistor T3 that is turned on according to the emission signal Emi_PWM(n).

The PWM circuit 112 may control the time at which the driving current flows through the inorganic light emitting element 20 in the light emitting period by controlling the turn on/off operation of the transistor T7 through the operation of the reset unit 12 and the on/off operation of the second driving transistor T2.

The transistor T8 has a source terminal connected to the drain terminal of the transistor T7, and a drain terminal connected to the anode terminal of the inorganic light emitting element 20. The transistor T8 may be turned on/off according to the control signal Emi_PAM(n) to electrically connect and disconnect the transistor T7 and the inorganic light emitting element 20. The on/off timing of transistor T8 is associated with the implementation of a black gray scale.

The transistor T9 is connected between the anode terminal and the cathode terminal of the inorganic light emitting element 20. The transistor T9 operates and performs the same function in the same manner as the transistor T11 of FIG. 8A, and a duplicate description will be omitted.

The source terminal of the transistor T11 is connected to a drain terminal of the first driving transistor T6, and a drain terminal is connected to the sensing unit 200. The transistor T11 operates and performs the same function in the same manner as the transistor T13 of FIG. 8A, and a duplicate description will be omitted.

The source terminal of the transistor T10 is connected to a drain terminal of the second driving transistor T2, and a drain terminal thereof is connected to the sensing unit 200. The transistor T10 operates and performs the same function as the transistor T12 of FIG. 8A, and a duplicate description will be omitted.

The cathode terminal of the inorganic light emitting element 20 is connected to the ground voltage VS S terminal.

The unit configuration of the sensing unit 200 is the same as the unit configuration of the sensing unit 200 of FIG. 8A and thus a duplicate description will be omitted.

Figure 12B:
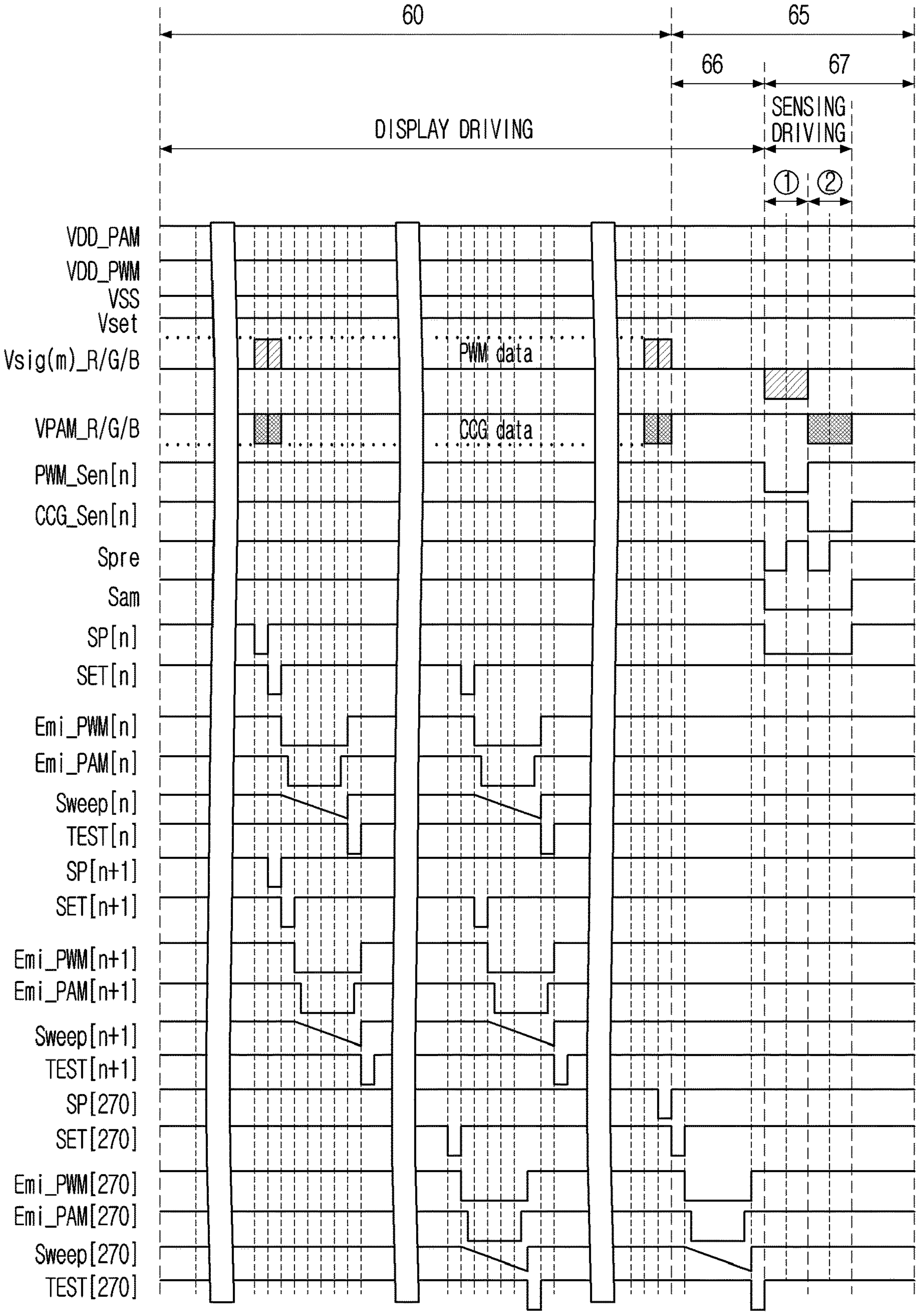
FIG. 12B is a driving timing diagram of the sub pixel circuits shown in FIG. 12A.

FIG. 12B is a driving timing diagram of the sub pixel circuits 110 shown in FIG. 12A. Specifically, FIG. 12B illustrates various control signals, driving voltage signals, and data signals applied to the sub pixel circuits 110 during one image frame period and the blanking interval.

Referring to FIG. 12B, the display panel 100 may be driven in the order of display driving and sensing driving.

During the display driving period, the display panel 100 is applied with a control signal SP, SET, Emi_PWM, Emi_PAM, Sweep, and TEST, as shown in FIG. 12B. For example, during the display driving period, the sub pixel circuits 110 included in the $n^{th}$ row line of the display panel 100 may be applied with the control signal SP(n), SET(n), Emi_PWM(n), Emi_PAM(n), Sweep(n), and TEST(n) as shown in FIG. 12B.

As described above, the sub pixel circuits included in each row line of the display panel 100 may be in the order of a data setting period and a plurality of light emitting periods. The sub pixel circuits included in the entire row line of the display panel 100 may be driven in the order of row lines.

Referring to FIG. 12B, after the scan signal SP (n) related to the image data voltage setting operation is applied, with respect to one row line (for example, $n^{th}$ row line), it may be identified that the emission signals SET(n), Emi_PWM(n), Emi_PAM(n), Sweep(n) related to the driving current providing operation are applied by a plurality of times.

In addition, referring to the relationship between the row lines, it is possible to identify that the scan signal SP(n) for the $n^{th}$ row line and the scan signal SP(n+1) for the (n+1)th row line are sequentially applied in the order of the row lines. Accordingly, it may be seen that the emission signals for the $n^{th}$ row line (SET(n), Emi_PWM(n), Emi_PAM(n), Sweep(n)) and the emission signals for the $n+1^{th}$ row line (SET(n+1), Emi_PWM(n+1), Emi_PAM(n+1), Sweep(n+1)) are sequentially applied in the row line order.

Hereinafter, the detailed operation of the sub pixel circuits 110 will be described with reference to the control signals (SP(n), SET(n), EMI_PWM(n), Emi_PAM(n), and Sweep (n)) associated with the $n^{th}$ row line and the circuit of FIG. 12B.

First, when the low-level scan signal SP(n) is applied to the sub pixel circuits 110 in the data setting period, the transistor T1 of the PWM circuit 112 and the transistor T5 of the constant current generator circuit 111 are turned on.

When the transistor T1 is turned on, the PWM data voltage applied from the second data driver is applied to the gate terminal (hereinafter, A node) of the second driving transistor T2 through the data signal line Vsig(m)_R/G/B.

Since the source terminal of the second driving transistor T2 is connected to the first driving voltage VDD_PWM terminal, a voltage corresponding to a difference between the first driving voltage VDD_PWM and the PWM data voltage is set between the source terminal and the gate terminal of the second driving transistor T2.

The PWM data voltage may be higher than the first driving voltage VDD_PWM. Therefore, the second driving transistor T2 remains turned off while the PWM data voltage is set to the A node.

When the transistor T5 is turned on, the constant current generator data voltage CCG data applied from the first data driver is applied to a gate terminal (hereinafter, referred to as B node) of the first driving transistor T6 through the data signal line VPAM_R/G/B.

The sub pixel circuits 110 of FIG. 12A do not include the driving voltage changing unit 113 unlike an embodiment of FIG. 8A to FIG. 11B. Instead, it may be seen that the source terminal of the first driving transistor T6 is directly connected to the second driving voltage VDD_PAM terminal (or line). Accordingly, a voltage corresponding to a difference between the second driving voltage VDD_PAM and the constant current generator data voltage is set between the source terminal and the gate terminal of the first driving transistor T6.

The constant current generator data voltage may be lower than the second driving voltage VDD_PAM. Therefore, when the constant current generator data voltage is set to the B node, the first driving transistor T6 maintains a turned-on state.

When the first light emitting period for the $n^{th}$ row line starts, a low-level emission signal SET(n) is applied to the transistor T4. Accordingly, the low voltage Vset is charged to the capacitor C3 through the turned-on transistor T3, and the gate terminal of the transistor T6 is applied with low voltage and the transistor T6 is turned on.

During the first light emitting period, the emission signal Emi(n) and Sweep(n) are applied to the sub pixel circuits 110 as illustrated in FIG. 12B.

In detail, when the low-level emission signal Emi_PAM (n) is applied to the transistor T8, the transistor T8 is turned on.

Accordingly, the driving current flows to the inorganic light emitting element 20 through the first driving transistor T6 maintaining the turned-on state, transistor T7 turned on according to SET(n) signal, and the transistor T8 turned on through Emi_PAM(n) signal.

The magnitude of the driving current is determined by the voltage difference between the source terminal and the gate terminal of the first driving transistor T6, in particular, the magnitude of the constant current generator data voltage set to the gate terminal of the first driving transistor T6.

When the low-level emission signal Emi_PWM(n) is applied to the transistor T3, the transistor T3 is turned on. When the emission signal Sweep(n) (e.g., a linearly decreasing sweep voltage as shown in FIG. 12B) is applied to the capacitor C1, the applied sweep voltage is coupled to the A node, and thus, the voltage of the A node is also linearly reduced.

Accordingly, when the difference between the voltage of the Anode and the first driving voltage VDD_PWM reaches the threshold voltage value of the second driving transistor T2, the second driving transistor T2 is turned on, and the high level first driving voltage VDD_PWM is applied to the gate terminal of the transistor T7 through the turned-on second driving transistor T2 and the transistor T3.

When a high-level voltage is applied to the gate terminal of the transistor T7, the transistor T7 is turned off, and the driving current does not flow to the inorganic light emitting element 20, and the inorganic light emitting element 20 stops emitting light. The time at which the driving current is provided to the inorganic light emitting element 20 is determined by the voltage difference between the source terminal and the gate terminal of the second driving transistor T2 and in particular, the magnitude of the PWM data voltage set to the gate terminal of the second driving transistor T2.

The emission signals (SET(n), Emi_PWM(n), Emi_PAM (n), and Sweep(n)) are respectively applied in the light emitting periods after the second time for the $n^{th}$ row line, and the inorganic light emitting elements 20 emit light on the basis of the image data voltage set in the data setting period.

Referring to FIG. 12B, after each light emitting period is terminated, a low-level TEST(n) signal is subsequently applied. Accordingly, the charge remaining on the inorganic light emitting element 20 through the turned-on transistor T9 may be completely discharged to the ground voltage VSS terminal, as described above.

Although the operation related to the $n^{th}$ row line has been described above, the operation of the remaining row lines may also be sufficiently understood through the above description.

Referring to the timing diagram of FIG. 12B, the time at which the emission signal Emi_PWM(n) becomes a low level and the time at which the emission signal Emi_PAM(n) is at a low level are different. This is to implement the black gray scale as described above.

If the PWM data voltage corresponding to the black gray scale is set to the A node, the transistor T7 should be turned off when the light emitting period starts. In practice, however, the transistor T7 is not immediately turned off because a time is required until the first driving voltage VDD_PWM is charged in the C node.

If the transistor T7 and the inorganic light emitting element 20 are directly connected without the transistor T8, even if the PWM data voltage corresponding to the black gray scale is set to the A node, the black gray scale cannot be accurately embodied due to the driving current leaked from the transistor T7.

To solve this problem, a transistor T8 may be disposed between the transistor T7 and the inorganic light emitting element 20 as shown in FIG. 12A. Also, as shown in FIG. 12B, after the emission signal Emi_PWM(n) becomes a low level and a predetermined time has elapsed, the emission signal Emi_PAM(n) may be at a low level. The predetermined time may be at least a time at which the voltage of the C node is charged to a voltage capable of turning off the transistor T9 from the Vset voltage. Accordingly, an accurate black gray scale may be embodied.

Referring to FIG. 12B, the sensing driving interval may include the PWM circuit 112 sensing period (①) and the constant current generator circuit 111 sensing period (②).

During the PWM circuit 112 sensing period ①, a second current flowing through the second driving transistor T2 is transmitted to the sensing unit 200 based on the second specific voltage.

During the constant current generator circuit 111 sensing period ②, a first current flowing through the first driving transistor T6 is transmitted to the sensing unit 200 based on the first specific voltage.

The sensing unit 200 may output the first sensing data and the second sensing data, respectively, based on the first and second currents.

According to an embodiment, the sensing driving may be performed in the blanking interval 65 as illustrated in FIG. 12B.

Accordingly, the sensing unit 200 may sense a current flowing through the driving transistors T6 and T2 based on a specific voltage applied in the blanking interval 65 of one image frame, and may output sensing data corresponding to the sensed current.

The sensing driving may be performed during a booting period, a power-off period, or a screen-off period of the display apparatus 1000.

Hereinafter, an operation of the display apparatus 1000 in the sensing driving period will be further described with reference to FIGS. 12A and 12B.

During the PWM circuit 112 sensing interval ①, a second specific voltage is applied from the second data driver to the data signal line Vsig(m)_R/G/B. The transistor T1 is turned on according to the scan signal SP(n), and the second specific voltage is inputted to the A node through the turned-on transistor T1.

In the PWM circuit 112 sensing interval ①, the transistor T10 is turned on according to the control signal PWM_Sen (n), and the second current flowing through the second driving transistor T2 is transmitted to the sensing unit 200 through the turned-on transistor T10. Accordingly, the sensing unit 200 may output second sensing data corresponding to the second current to the correction unit 300.

During the constant current generator circuit 111 sensing interval ②, a first specific voltage is applied from the first data driver to the data signal line VPAM_R/G/B. The transistor T5 is turned on according to the scan signal SP(n), and the first specific voltage is input to the B node through the turned-on transistor T5.

In the constant current generator circuit 111 sensing interval ②, the transistor T11 is turned on according to the control signal CCG_Sen(n), and the first current flowing through the first driving transistor T6 is transmitted to the sensing unit 200 through the turned-on transistor T11. Accordingly, the sensing unit 200 may output first sensing data corresponding to the first current to the correction unit 300.

The detailed operation of the sensing unit 200 during the first initialization period and the first sensing period of the PWM circuit 112 sensing period ① and the operation of the sensing unit 200 in the second initialization period and the second sensing period of the constant current generator circuit 111 sensing period ② are the same as FIG. 8B, and a duplicate description will be omitted.

The correction unit 300 may obtain first and second compensation values based on the first and second sensing data output from the sensing unit 200, and may store or update the obtained first and second compensation values in a memory. When the display driving is performed, the correction unit 300 may correct the constant current generator data voltage and the PWM data voltage to be applied to the sub pixel circuits 110 based on the first and second compensation values, respectively.

The sensing driving described above may be performed on one row line per one image frame or for a plurality of row lines per one image frame. The sensing driving described above may be performed sequentially in the order of a row line or in a random order, as described above.

The sensing driving described above may be performed in the order of the PWM circuit 112 sensing period ① and the constant current generator circuit 111 sensing interval ② but an embodiment is not limited thereto, and the constant current generator circuit 111 sensing interval ② may first proceed, and the PWM circuit 112 sensing period ① may then proceed.

For example, the sensing driving is performed after the display driving, but the sensing driving may be first performed, and the display driving may be performed afterwards, according to an embodiment.

The sub pixel circuits 110 of FIG. 12A do not include the driving voltage changing unit 113 described above, and the source terminal of the first driving transistor T6 is applied with the second driving voltage VDD_PAM in both of the data setting period and each light emitting period.

Unlike the sub pixel circuits 110 of FIG. 8A, the second driving voltage VDD_PAM applied to the row line operating in the data setting period may be affected by the second driving voltage VDD_PAM drop generated by the driving current flowing through the row line operating in the light emitting period.

As described above, this hinders setting of the accurate constant current generator data voltage to the constant current generator circuits 111 belonging to the row line operating in the data setting period.

In order to solve the IR drop problem of the second driving voltage VDD_PAM, in an embodiment of FIGS. 12A and 12B, a method of correcting a constant current generator data voltage may be used.

According to an embodiment of FIGS. 8A to 11B, by controlling the driving voltage applied to the source terminal of the first driving transistor T6 through the driving voltage changing unit 113, the IR drop problem of the second driving voltage VDD_PAM has been solved, and in an embodiment of FIGS. 12A to 15B, by correcting the constant current generator data voltage applied to the gate terminal of the first driving transistor T6, the IR drop problem of the second driving voltage VDD_PAM may be solved.

According to an embodiment, data (or information) related to IR drop values for each area of the display panel 100 according to the magnitude of the driving current may be stored in the storage unit (e.g., memory, etc.).

The magnitude of the driving current refers to an average current value provided to the display panel 100 provided by the driving voltage provision unit (e.g., power IC) so as to display the image frame on the display panel 100, and the value may vary according to an image represented by the image frame.

The driving current and the IR drop values for each area according to the driving current may be pre-sensed and calculated in the manufacturing step of the display apparatus 1000 and stored in a storage unit (not shown). The driving current and the IR drop values for each area according to the driving current may be pre-sensed, calculated and updated before the image is displayed in the use stage of the display apparatus 1000.

Accordingly, the correction unit 300 may correct the constant current generator data to be applied to the display panel 100 based on IR drop values for each area of the display panel 100 corresponding to the magnitude of the driving current required to display the current image frame.

Accordingly, the data driver may generate a constant current generator data voltage based on the corrected constant current generator data and apply the generated constant current generator data voltage to the display panel 100 to compensate for IR drop of the second driving voltage VDD_PAM by the driving current required for displaying the corresponding image frame.

The IR drop values for each area of the display panel 100 may be IR drop values for each row line of the display panel 100, but are not limited thereto.

Hereinafter, various embodiments will be described with reference to FIGS. 13A to 15B. Embodiments shown in FIGS. 13A to 15B are similar to those described above with reference to FIGS. 12A and 12B in terms of configuration and operating principle, and thus, a duplicate description is omitted and the difference is mainly described.

Figure 13A:
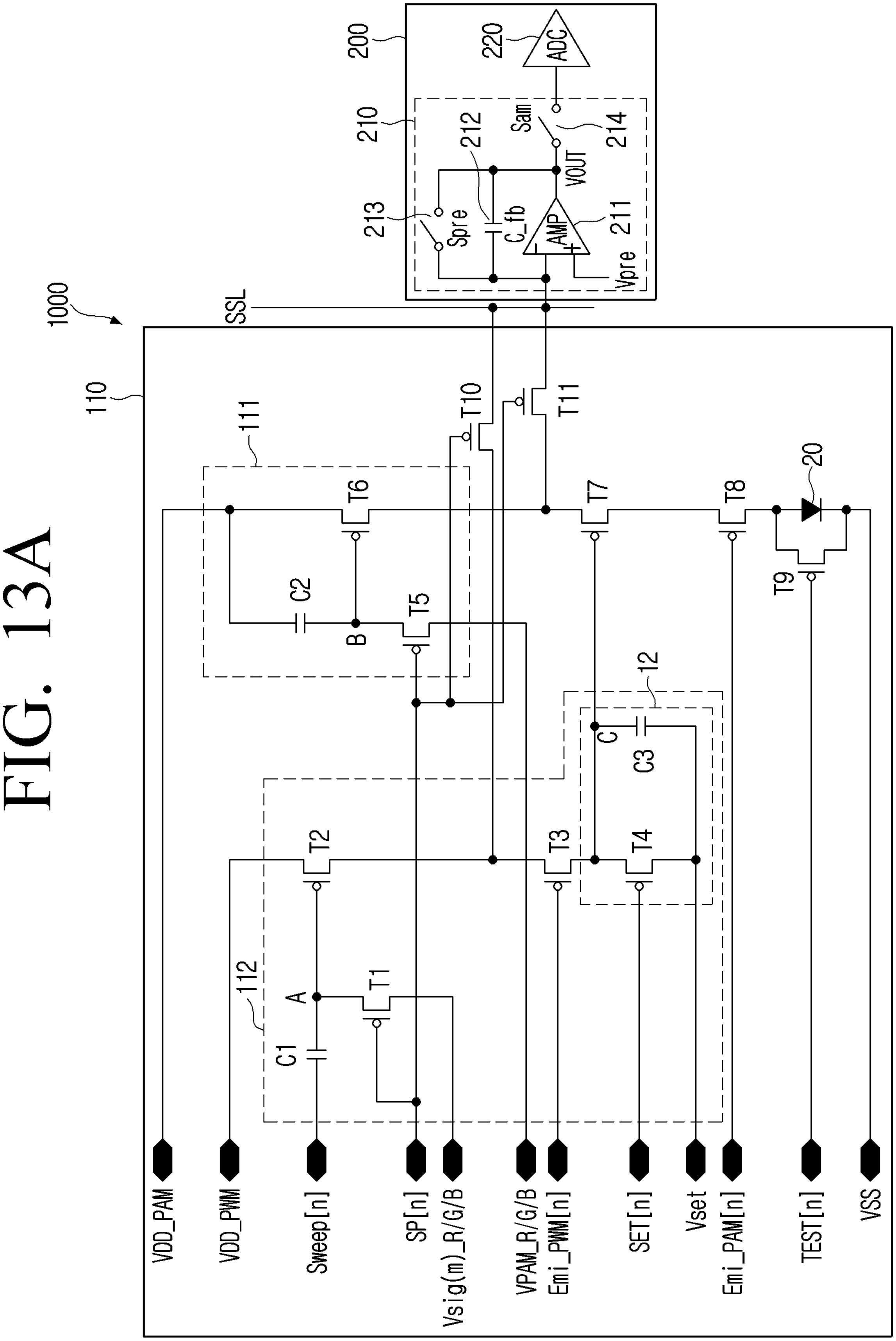
FIG. 13A is a detailed circuit diagram of sub pixel circuits and sensing units according to an embodiment.
Figure 13B:
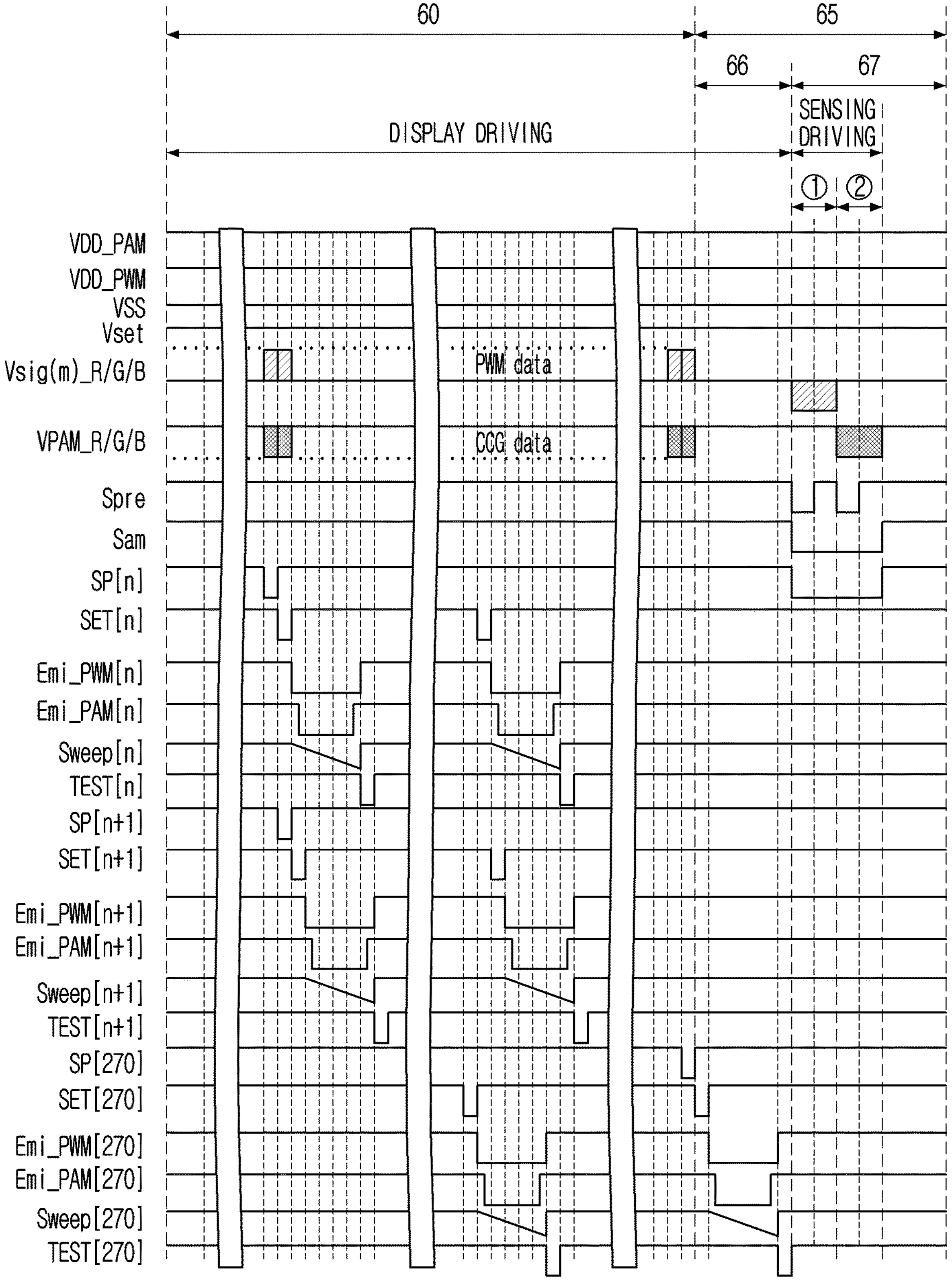
FIG. 13B is a driving timing diagram of the sub pixel circuits shown in FIG. 13A.

FIG. 13A is a detailed circuit diagram of the sub pixel circuits 110 and the sensing unit 200 according to an embodiment and FIG. 13B is a driving timing diagram of the sub pixel circuits 110 of FIG. 13A.

The sub pixel circuits 110 shown in FIG. 13A are different from FIG. 12A only in that the scan signal SP(n) is used without using a separate control signal (PWM_Sen(n), CCG_Sen(n)) of FIG. 12A to control on/off of the transistor T10 and transistor T11, and the rest is the same as the sub pixel circuit 110 of FIG. 12A. The driving timing shown in FIG. 12B is also the same as the driving timing of FIG. 12B, except that there is no control signal PWM_Sen(n) and CCG_Sen(n).

Referring to FIGS. 13A and 13B, the transistors T10 and T11 are turned on together as well as the transistors T1 and T5 as the low-level scan signal SP(n) is applied to the data setting period. However, in this example, by turning off the switch (not shown) inside the amplifier 211, a current may be prevented from flowing to the sensing unit 200. Accordingly, the sensing driving operation is not performed in the data setting period, and only the data setting operation is performed.

A switch inside the amplifier 211 may be turned on in the sensing driving interval. Therefore, in the sensing driving period, the first current and the second current may flow to the sensing unit 200, and accordingly, the sensing driving may be performed.

The second specific voltage is applied to the gate terminal of the second driving transistor T2 the PWM circuit 112 sensing interval ①, and the first specific voltage is applied to the gate terminal of the first driving transistor T6 during the constant current generator circuit 111 sensing interval ②, and the time when the second specific voltage is applied and the time at which the first specific voltage is applied are not overlapped with each other. Therefore, the sensing driving operation described with reference to FIGS. 12A and 12B may be performed in the same manner without using a separate control signal PWM_Sen(n), CCG_Sen(n).

The remaining contents of the display driving and sensing driving of the sub pixel circuits 110 are overlapped with the contents described above in FIGS. 12A and 12B, and thus the description thereof will be omitted.

Figure 14A:
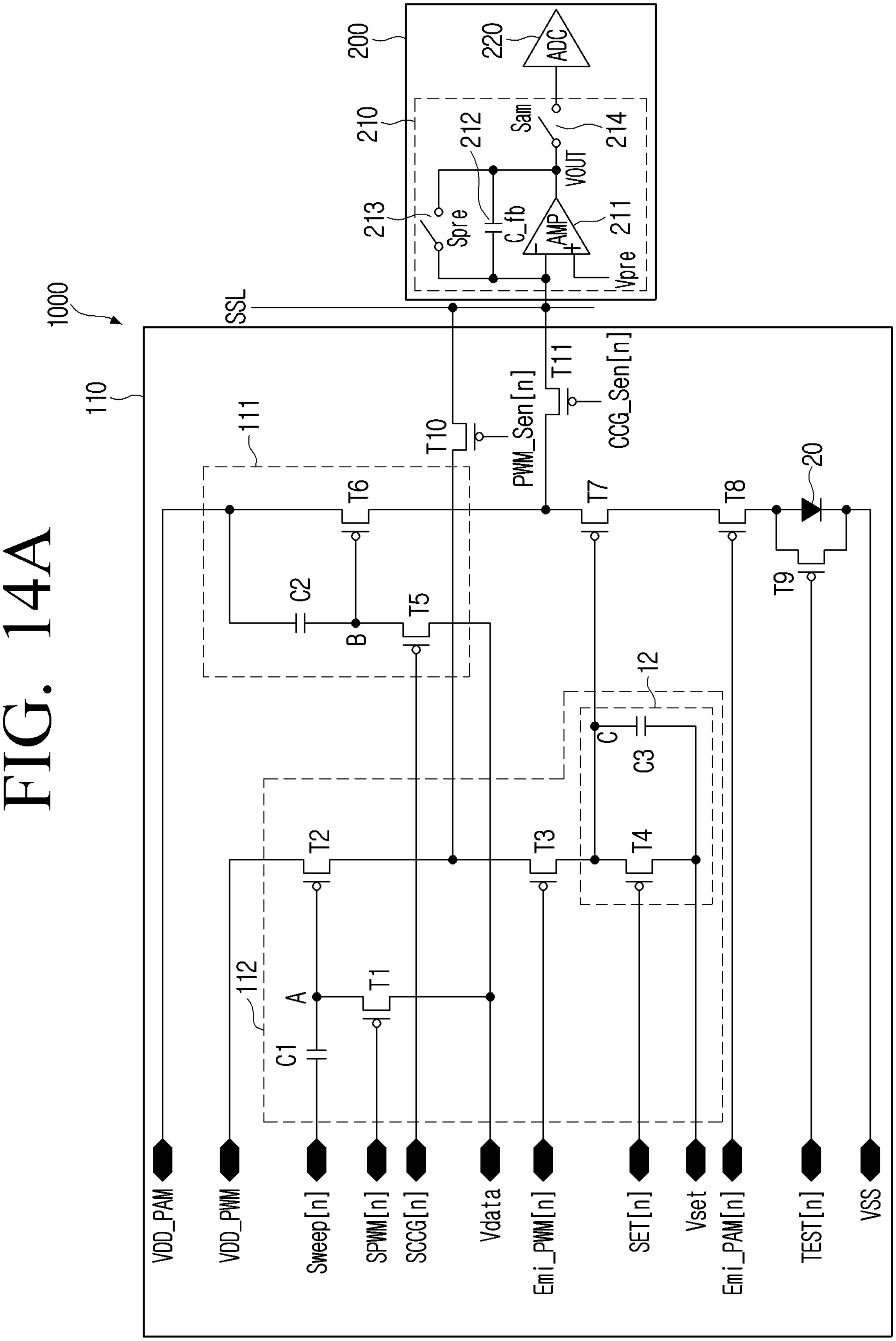
FIG. 14A is a detailed circuit diagram of sub pixel circuits and sensing units according to an embodiment.
Figure 14B:
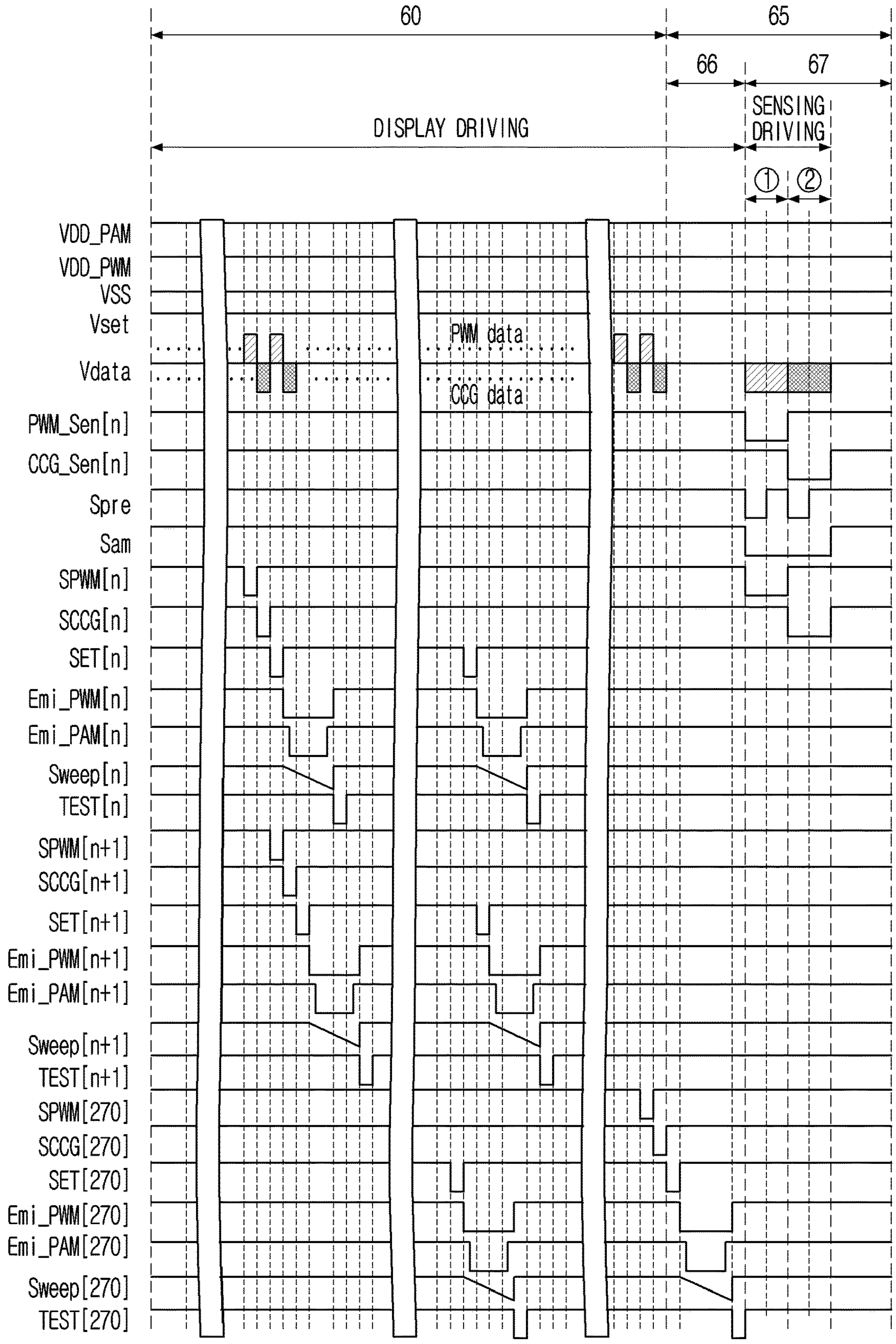
FIG. 14B is a driving timing diagram of the sub pixel circuits shown in FIG. 14A.

FIG. 14A is a detailed circuit diagram of the sub pixel circuits 110 and the sensing unit 200 according to an embodiment and FIG. 14B is a driving timing diagram of the sub pixel circuits 110 of FIG. 14A.

The sub pixel circuits 110 shown in FIG. 14A are the same as the sub pixel circuits 110 shown in FIG. 12A, except that the image data voltage and the specific voltage are applied through one data signal line Vdata.

In this example, the PWM data voltage and the constant current generator data voltage are time-divided and applied from one data driver to the sub pixel circuits 110 through the data signal line Vdata during the data setting period, and the second specific voltage and the first specific voltage from the one data driver are time-divided and applied to the sub pixel circuits 110 through the data signal line Vdata during the sensing driving period.

Accordingly, two scan signals are required to apply the PWM data voltage and the constant current generator data voltage, which are time-divided an applied during the data setting period, to the A and B nodes, respectively, and to apply the second specific voltage and the first specific voltage, which are time-divided and applied during the sensing driving period, to the A and B nodes, respectively, and the scan signal SPWM(n) and the scan signal SCCG(n) of FIGS. 14A and 14B show these two scan signals.

Referring to FIGS. 14A and 14B, when the low-level scan signal SPWM(n) is applied to the sub pixel circuits 110 in the data setting period, the PWM data voltage is applied to the A node through the turned-on transistor T1. Thereafter, when the low-level scan signal SCCG(n) is applied to the sub pixel circuits 110, the constant current generator data voltage CCG data is applied to the B node through the turned-on transistor T5.

When the low-level scan signal SPWM(n) is applied to the sub pixel circuits 110 during the PWM circuit 112 sensing interval ① in the sensing driving period, the second specific voltage is input to the A node through the turned-on transistor T1. Thereafter, when the low-level scan signal SCCG(n) is applied to the sub pixel circuits 110, the first specific voltage is input to the B node through the turned-on transistor T5.

The remaining contents of the display driving and sensing driving of the sub pixel circuits 110 are overlapped with the contents described above in FIGS. 12A and 12B, and thus the description thereof will be omitted.

Figure 15A:
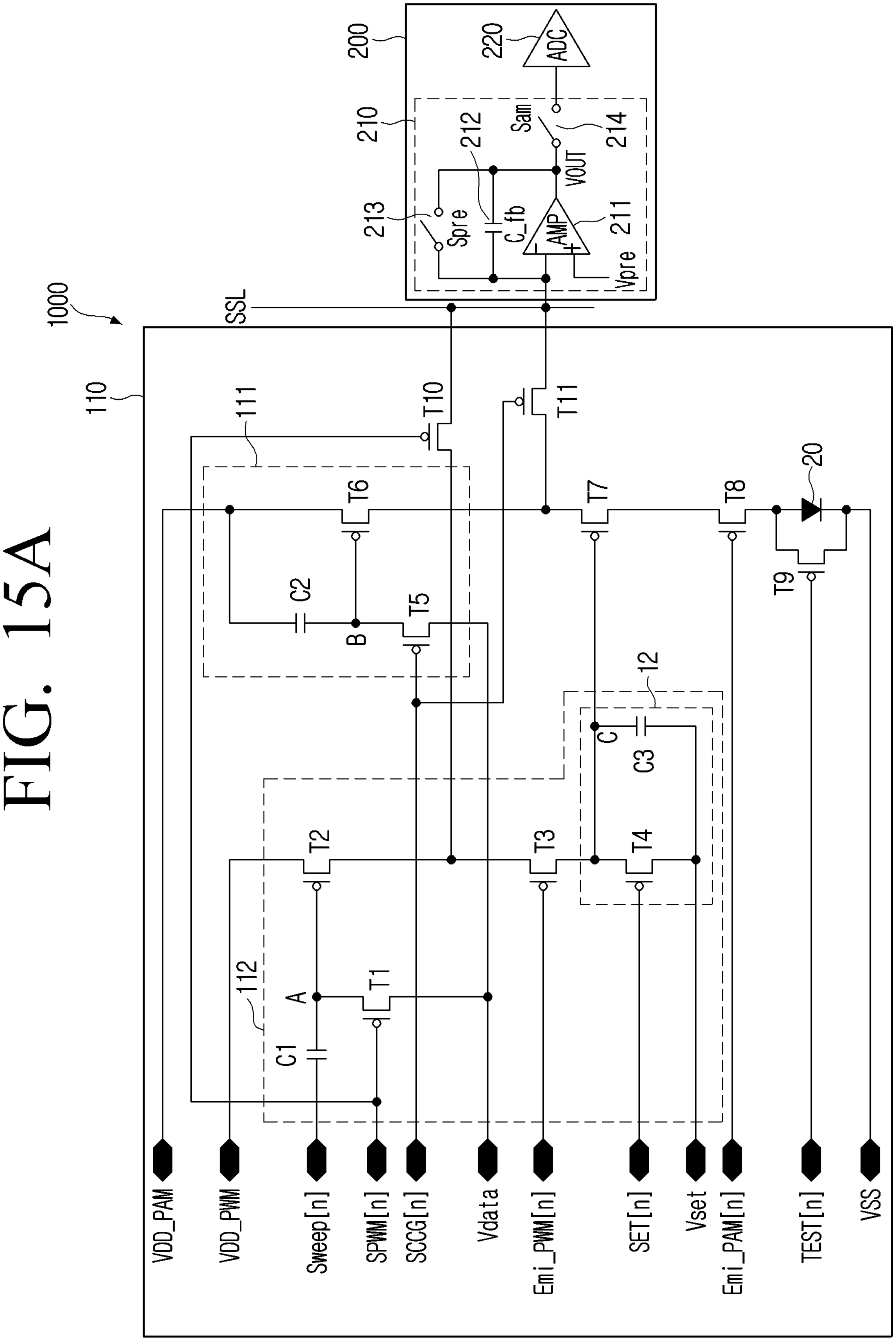
FIG. 15A is a detailed circuit diagram of sub pixel circuits and sensing units according to an embodiment.
Figure 15B:
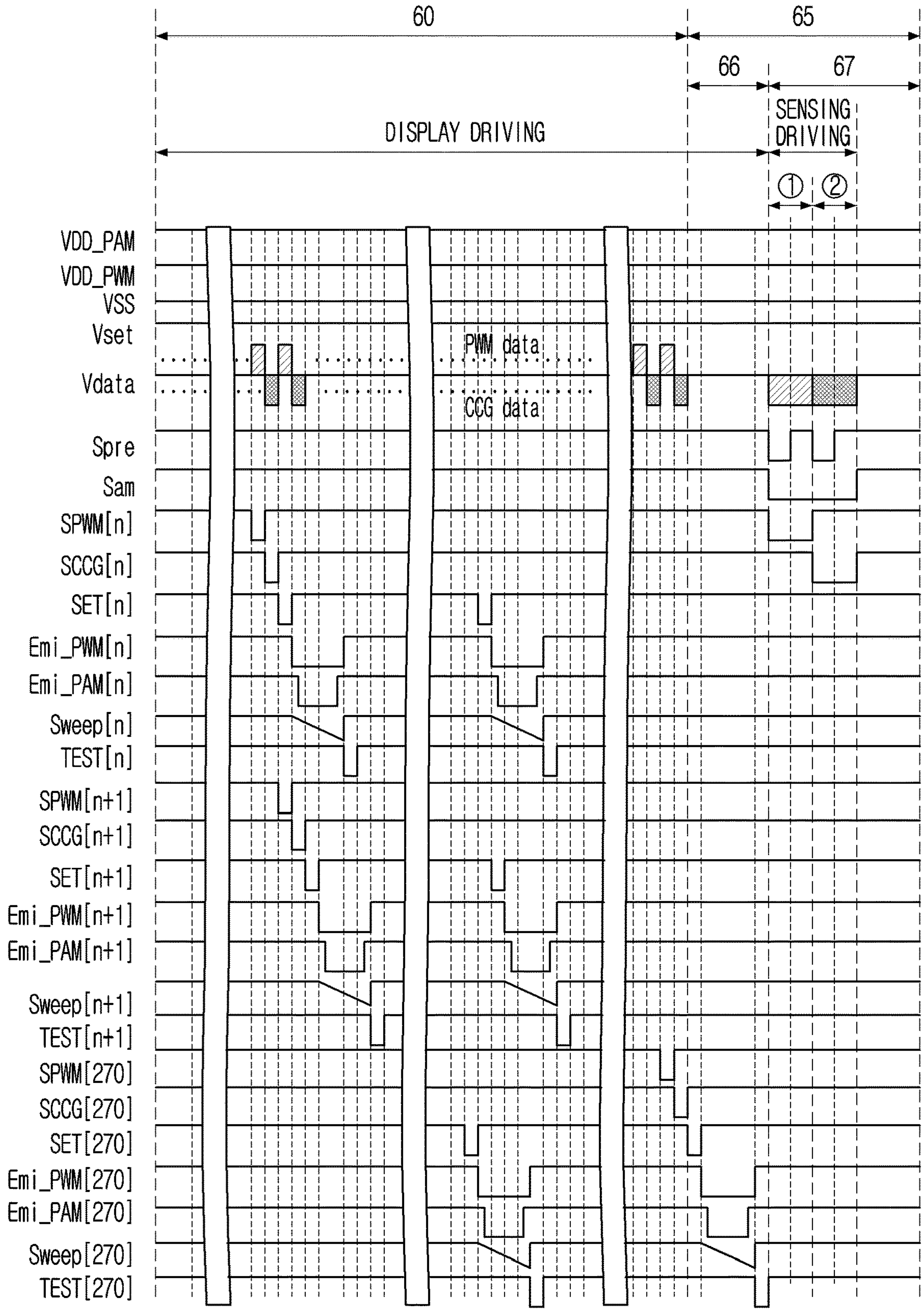
FIG. 15B is a driving timing diagram of the sub pixel circuits shown in FIG. 15A.

FIG. 15A is a detailed circuit diagram of the sub pixel circuits 110 and the sensing unit 200 according to an embodiment and FIG. 15B is a driving timing diagram of the sub pixel circuits 110 of FIG. 15A.

The sub pixel circuits 110 shown in FIG. 15A are similar to the sub pixel circuits 110 of FIG. 14A in that the image data voltage (PWM data voltage, a constant current generator data voltage) and a specific voltage (a second specific voltage, a first specific voltage) are applied through one data signal line Vdata.

Referring to FIGS. 15A and 15B, the image data voltage and the specific voltage are applied to the sub pixel circuits 110 in the data setting period and the sensing driving period, respectively, using two scan signals (or scan signal lines), such as SPWM(n) and SCCG(n).

The sub pixel circuits 110 shown in FIG. 15A are similar to an embodiment of FIG. 13A in that the scan signal SPWM (n) and the SCCG (n) are used without using a separate control signal (PWM_Sen(n), CCG_Sen(n) of FIG. 12A), in order to control the on/off of the transistor T10 and the transistor T11.

In an embodiment of FIG. 15A, since two scan signals, such as SPWM(n) and SCCG(n), are used, the gate terminal of the transistor T10 is connected to the scan signal SPWM (n), and the gate terminal of the transistor T11 is connected to the scan signal SCCG(n).

In an embodiment of FIGS. 15A and 15B, the switch (not shown) inside the amplifier 211 may be turned off in the data setting period, and the switch inside the amplifier 211 may be turned on in the sensing driving period, so that a current flows through the sensing unit 200 only in the sensing driving period.

The remaining contents of the display driving and sensing driving of the sub pixel circuits 110 are overlapped with the contents described above in FIGS. 12A through 14B, and thus the description thereof will be omitted.

Embodiments described in FIGS. 8A to 11B are advantageous in that the IR drop of the driving voltage is compensated during the operation, and embodiments described in FIGS. 12A to 15B are advantageous in that a relatively small number of transistors are used, and an accurate IR drop compensation is possible.

Since embodiments described in FIGS. 8A, 8B, 9A, 9B, 12A, 12B, 13A and 13B use two types of data drivers to provide a constant current generator data voltage and a PWM data voltage, there is no risk of heat generation of the data driver, relatively. In addition, a relatively simple configuration may be made in that it is possible to provide the scan signal SP(n) using one type scan driver.

However, since two types of data drivers are used, which may relatively increase cost, and two kinds of data signal lines (Vsin(m)_R/G/B, VPAM_R/G/B) are required so that design may be relatively complicated.

Embodiments described in FIGS. 10A, 10B, 11A, 11B, 14A, 14B, 15A and 15B may have a relatively simple design in that one type of data driver is used, which may relatively reduce costs and one type of data signal line Vdata is sufficient.

However, since a relatively high PWM data voltage and a relatively low constant current generator data voltage are alternately applied to the display panel 100 through one type of data driver, there is a risk of heat generation of the data driver, and two scan drivers are required to provide the scan signal SPWM(n) and the scan signal SCCG(n) so configuration may be complicated relatively.

Figure 16A:
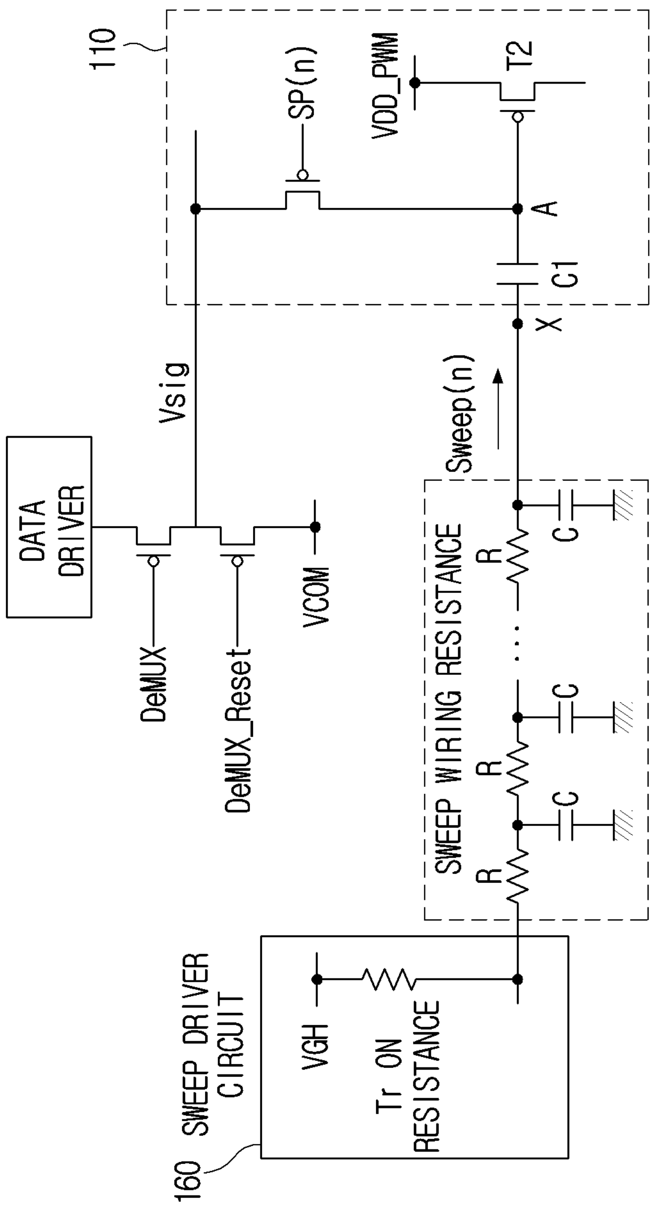
FIG. 16A is a diagram illustrating luminance non-conformity and horizontal crosstalk phenomena that may occur by a sweep load.
Figure 16B:
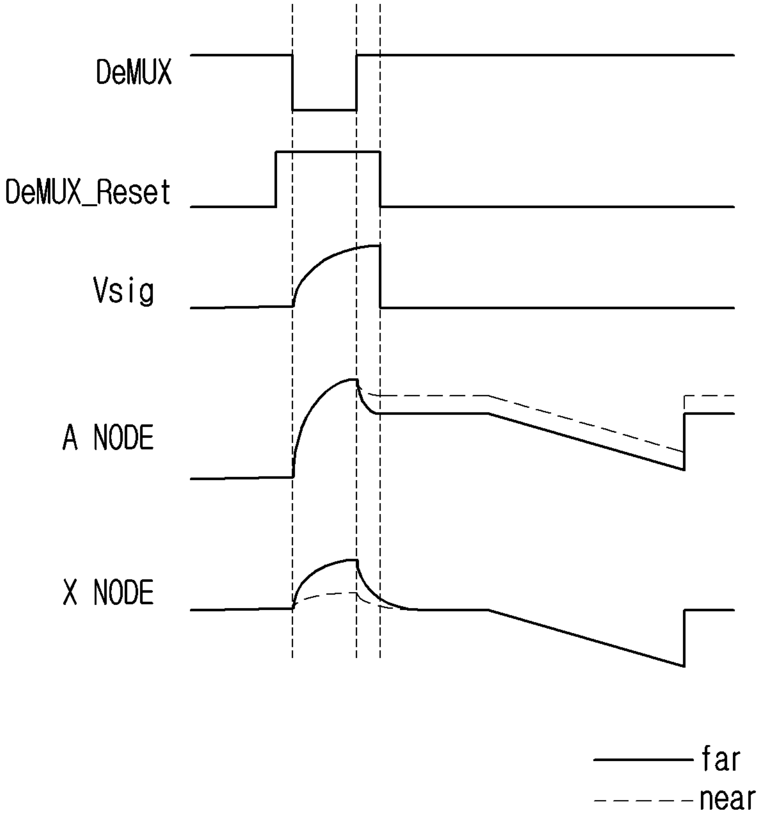
FIG. 16B is a diagram illustrating luminance non-conformity and horizontal crosstalk phenomena that may occur by a sweep load.

FIGS. 16A and 16B are diagrams illustrating luminance non-conformity and horizontal crosstalk phenomena that may occur by a sweep load.

As described above, in various embodiments, the light emitting period is sequentially performed in the order of the row lines of the display panel 100. Therefore, an emission signal is not applied through the global signal, and an emission driver circuit for providing an emission signal corresponding to each row line is required for each row line.

A sweep signal Sweep (n) for PWM driving of the display panel 100 is also provided to the display panel 100 through an emission driver circuit provided for each row line. Hereinafter, an emission driver for providing a sweep signal is referred to as a driver circuit.

In this example, in the process where the PWM data voltage is set, as the voltage of the gate terminal (that is, A node) of the second driving transistor T2 changes, the change of the voltage is coupled through the capacitor C1 and a change occurs in the voltage of the sweep signal. Thereafter, the voltage of the sweep signal is restored, and accordingly, the voltage set to the A node is changed. The amount of change in the Anode voltage varies depending on the sweep load as described below, which causes the generation of luminance non-uniformity and horizontal crosstalk.

FIG. 16A illustrates a configuration in which the sweep driver circuit 160 corresponding to one row line is connected to one of the sub pixel circuits 110 through the wirings.

As illustrated in FIG. 16A, the sweep signal Sweep(n) is transmitted to the sub pixel circuits 110 through the sweep driver circuit 160. There is a sweep wiring resistance, that is, RC load, exists between the sweep driver circuit 160 and the sub pixel circuits 110, and the magnitude thereof becomes smaller as getting closer to the sweep driver circuit 160, and becomes greater as getting away from the sweep driver circuit 160.

FIG. 16B shows waveforms of various signals shown in FIG. 16A. Here, far represents the voltage of the Anode and the X node at sub pixel circuits 110 disposed relatively far from the sweep driver circuit 160, and near represents the voltage of the A node and the X node at sub pixel circuits 110 arranged at a position relatively close to the sweep driver circuit 160.

When the low-level scan signal SP(n) is applied to the sub pixel circuits 110 in the data setting period, the PWM data voltage from the data driver is applied to the A node through the Vsig wiring. The PWM data voltage is a PWM data voltage corresponding to one of the R, G, and B pixels selected by the DeMUX circuit.

As shown in FIG. 16B, as the voltage of the A node changes, the change in the voltage of the A node is coupled to the X-node through the capacitor C1 so that the voltage of the X-node, that is, the sweep voltage is changed.

After that, the sweep voltage is restored to the original voltage level again by the operation of the sweep driver circuit 160, so that the voltage change of the X-node is inversely coupled through the capacitor C1 to affect the voltage of the A node.

Due to the influence of the sweep load, the voltage change of the A-node is increased as the sub pixel circuit 110 is located farther from the sweep driver circuit 160.

Accordingly, even though the same PWM data voltage is applied, different voltages may be set to the sub pixel circuits 110 according to the load, which causes the luminance non-uniformity. The luminance non-uniformity problem due to such a sweep load may cause horizontal crosstalk when viewed from the entire view of the display panel 100.

Referring to FIG. 16A, the Vsig line corresponds to the Vsig(m)_R/G/B line in an embodiment of FIGS. 8A, 9A, 12A and 13A described above, and corresponds to the Vdata line in an embodiment of FIGS. 10A, 11A, 14A and 15A. Although FIG. 16A shows SP(n) as the scan signal, it should be understood that the scan signal may be SPWM (n) in an embodiment of FIGS. 10A, 11A, 14A and 15A.

Since the luminance non-uniform and horizontal crosstalk problem described above is due to the voltage of the X-node being changed together as the PWM data voltage is applied to the A-node, the problem may be solved by making the voltage of the X-node maintained without changing the voltage of the X-node even when the PWM data voltage is applied to the A-node.

Figure 16C:
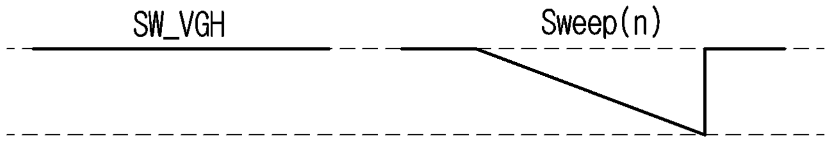
FIG. 16C illustrates a high-level voltage of a sweep signal.

According to an embodiment, while the PWM data voltage is set to the A node, the voltage of the X-node is held by using the high-level voltage SW_VGH of the sweep signal, as shown in FIG. 16C, thereby preventing a change in the voltage of the A node due to the sweep load. The high-level voltage SW_VGH of the sweep signal may be a global signal that is equally applied to all sub pixel circuits 110 of the display panel 100, but is not limited thereto.

FIGS. 17A to 20B show various embodiments capable of solving luminance non-uniformity and horizontal crosstalk problems caused by a sweep load. In the description of FIGS. 17A to 20B, the same contents as described above will be omitted.

Figure 17A:
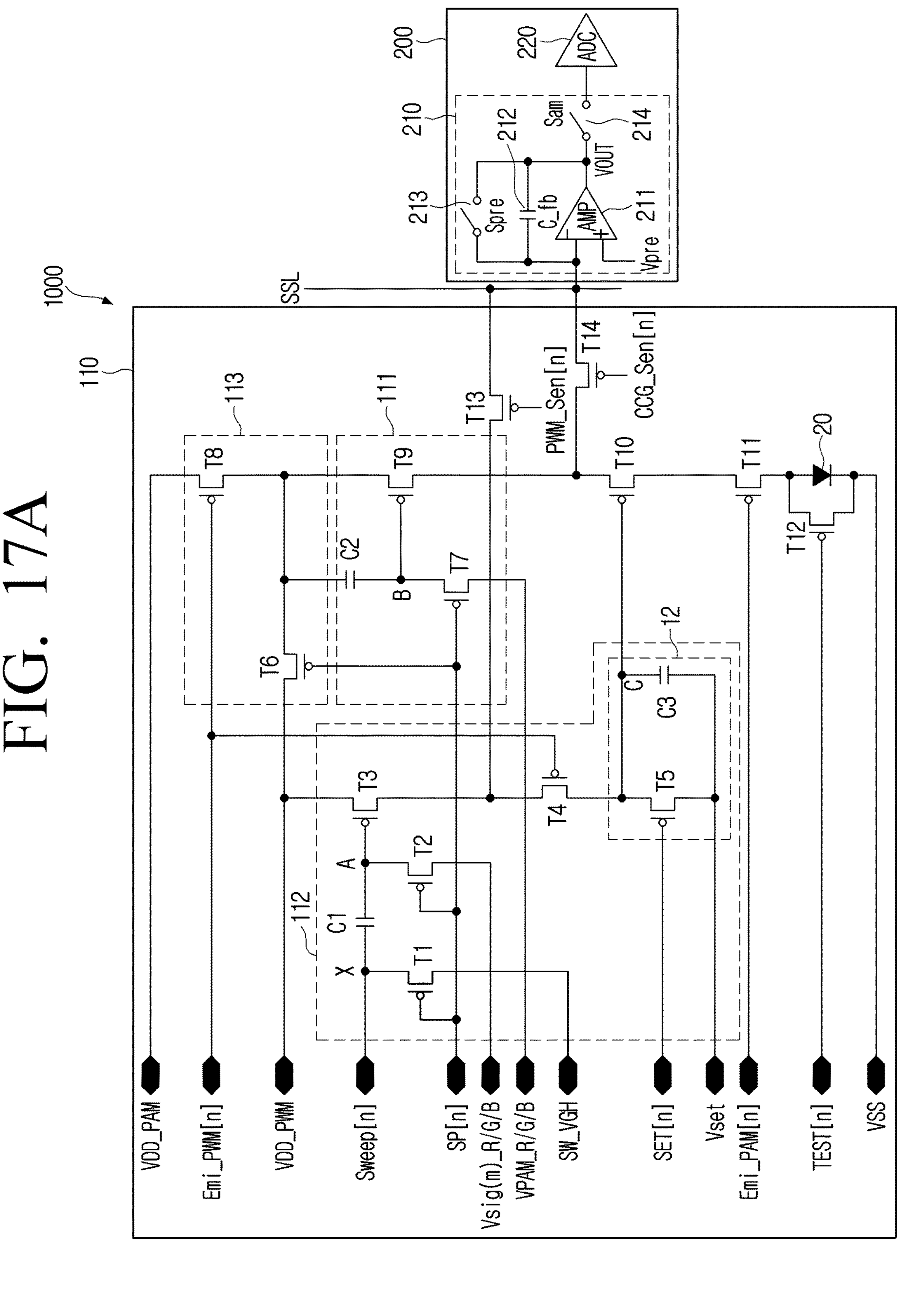
FIG. 17A is a detailed circuit diagram of sub pixel circuits and sensing units according to an embodiment.

FIG. 17A is a detailed circuit diagram of the sub pixel circuits 110 and the sensing unit 200 according to an embodiment.

The sub pixel circuits 110 shown in FIG. 17A are the same as the sub pixel circuits 110 of FIG. 8A, except that the sub pixel circuits 110 of FIG. 17A further includes the transistor T1 for applying a high-level voltage SW_VGH of the sweep signal to an input terminal of the sweep signal Sweep(n) input terminal during the data setting period.

In detail, the source terminal of the transistor T1 receives the high-level voltage SW_VGH of the sweep signal, the gate terminal is connected to the scan signal SP(n) line, and the drain terminal is connected to the X-node.

When the low-level scan signal SP(n) is applied during the data setting period, the transistor T1 is turned on, as well as the transistor T2. While the PWM data voltage is applied to the A-node through the sig(m)_R/G/B signal line, the voltage of the X-node is maintained at the high level voltage (SW_VGH) of the sweep signal, and thus the above-described luminance non-uniformity and horizontal crosstalk problem may be solved.

Figure 17B:
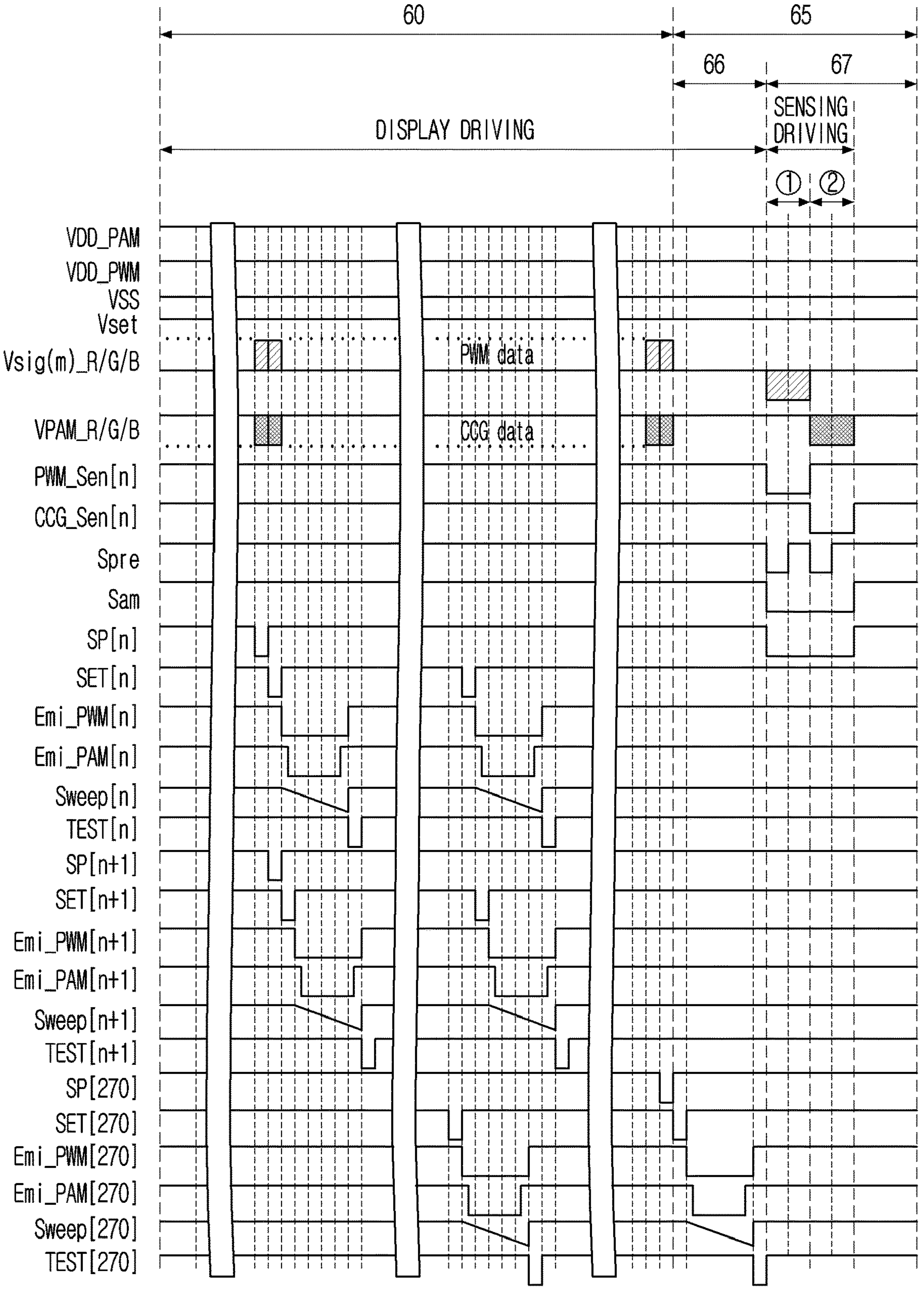
FIG. 17B is a driving timing diagram of the sub pixel circuits shown in FIG. 17A.

FIG. 17B is a driving timing diagram of the sub pixel circuits 110 shown in FIG. 17A, and is the same as the driving timing of FIG. 8B. For convenience the high-level voltage SW_VGH of the sweep signal is not shown separately in FIG. 17B.

Figure 18A:
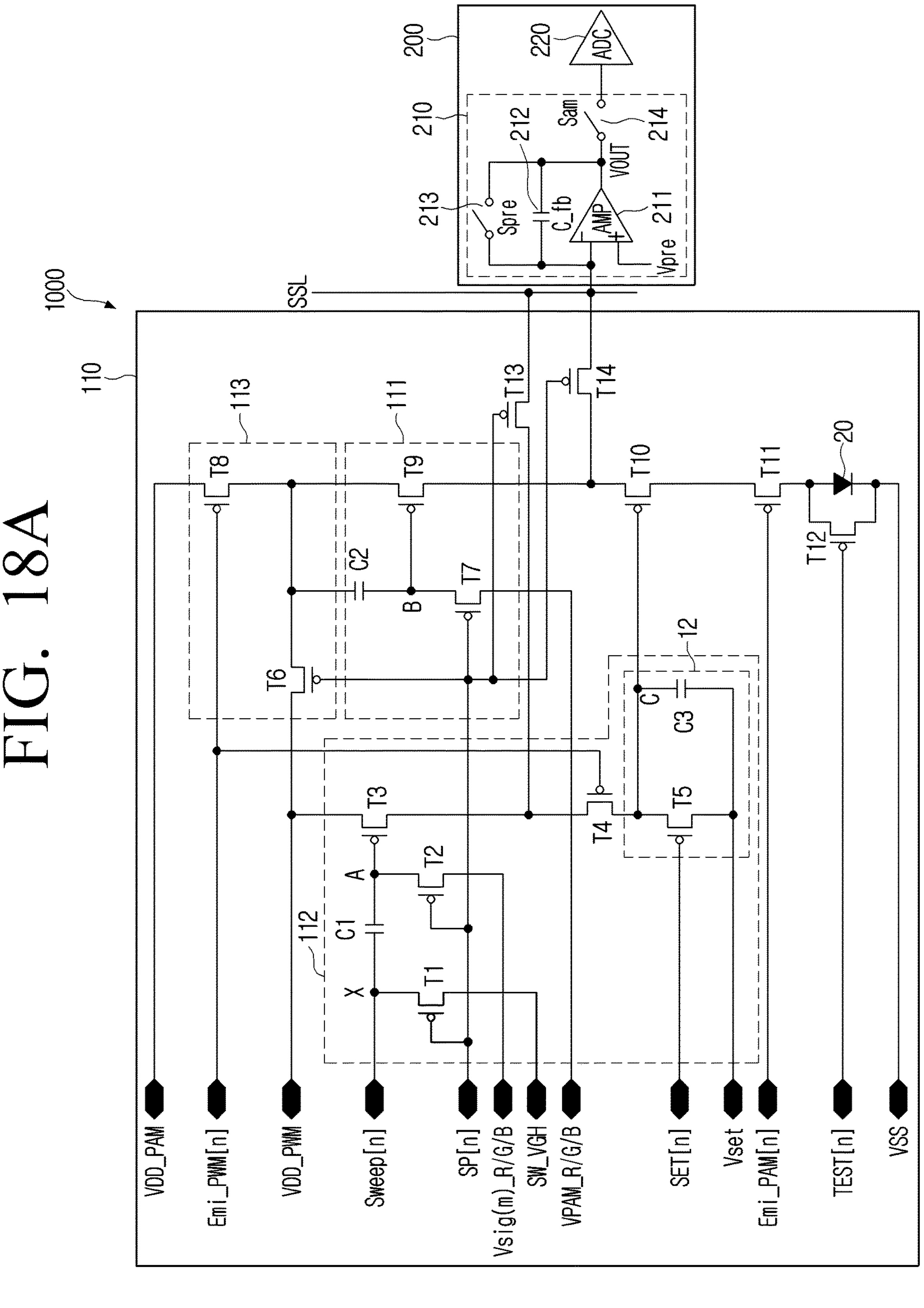
FIG. 18A is a detailed circuit diagram of sub pixel circuits and sensing units according to an embodiment.

FIG. 18A is a detailed circuit diagram of the sub pixel circuits 110 and the sensing unit 200 according to an embodiment.

The sub pixel circuits 110 shown in FIG. 18A are the same as the sub pixel circuits 110 of FIG. 9A, except that the transistor T1 for applying a high level voltage SW_VGH of the sweep signal to an input terminal of the sweep signal Sweep(n) during a data setting period.

In detail, the source terminal of the transistor T1 receives the high-level voltage SW_VGH of the sweep signal, the gate terminal is connected to the scan signal SP(n) line, and the drain terminal is connected to the X-node.

When the low-level scan signal SP(n) is applied during the data setting period, the transistor T1 is turned on, as well as the transistor T2. Therefore, while the PWM data voltage is applied to the A node through the Vsig(m)_R/G/B signal line, the voltage of the X-node is maintained at the high level voltage SW_VGH of the sweep signal, so that the luminance non-uniformity and the horizontal crosstalk problem described above may be solved.

Figure 18B:
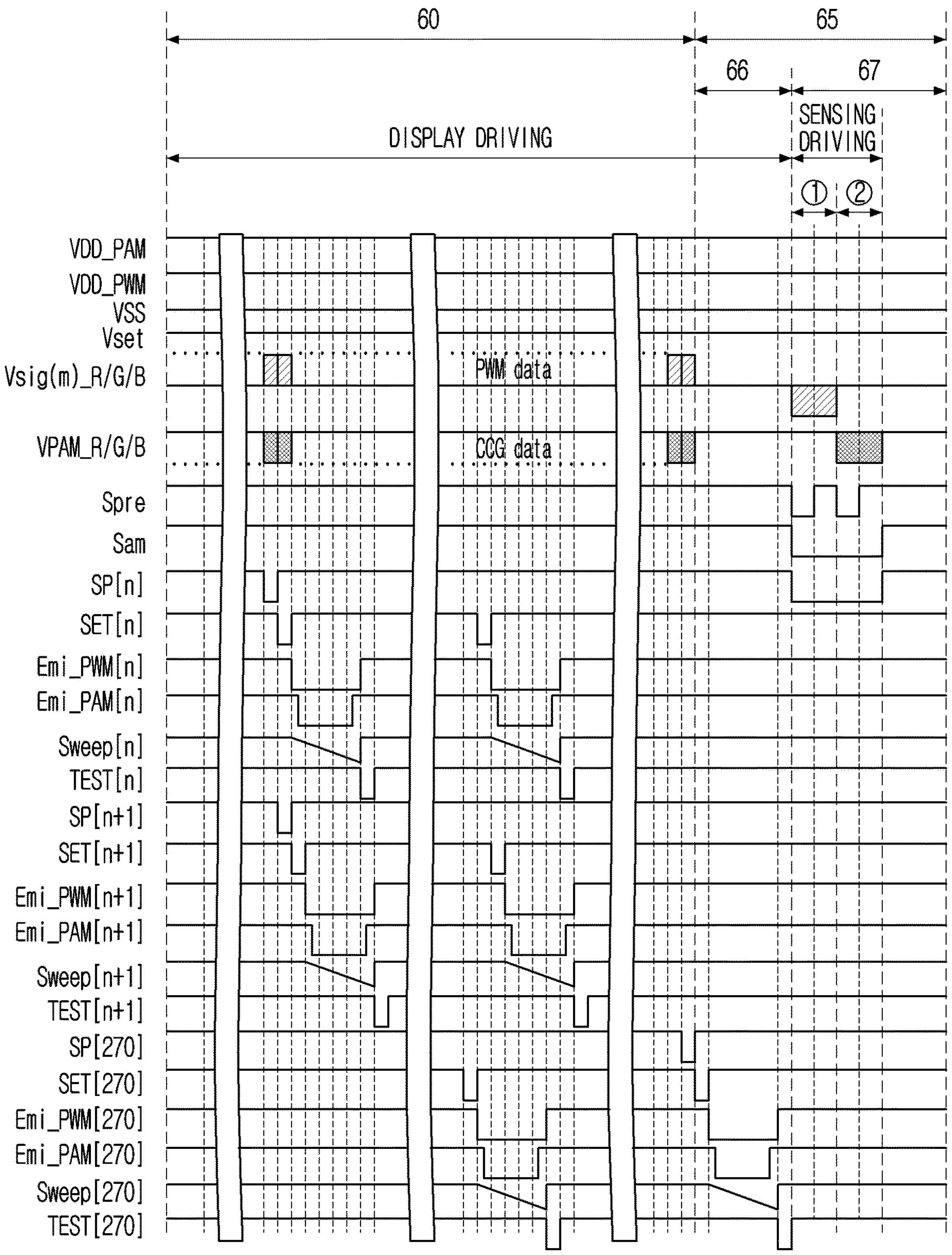
FIG. 18B is a driving timing diagram of the sub pixel circuits shown in FIG. 18A.

FIG. 18B is a driving timing diagram of the sub pixel circuits 110 shown in FIG. 18A, and is the same as the driving timing of FIG. 9B. For convenience, the high-level voltage SW_VGH of the sweep signal is not shown separately in FIG. 18B.

Figure 19A:
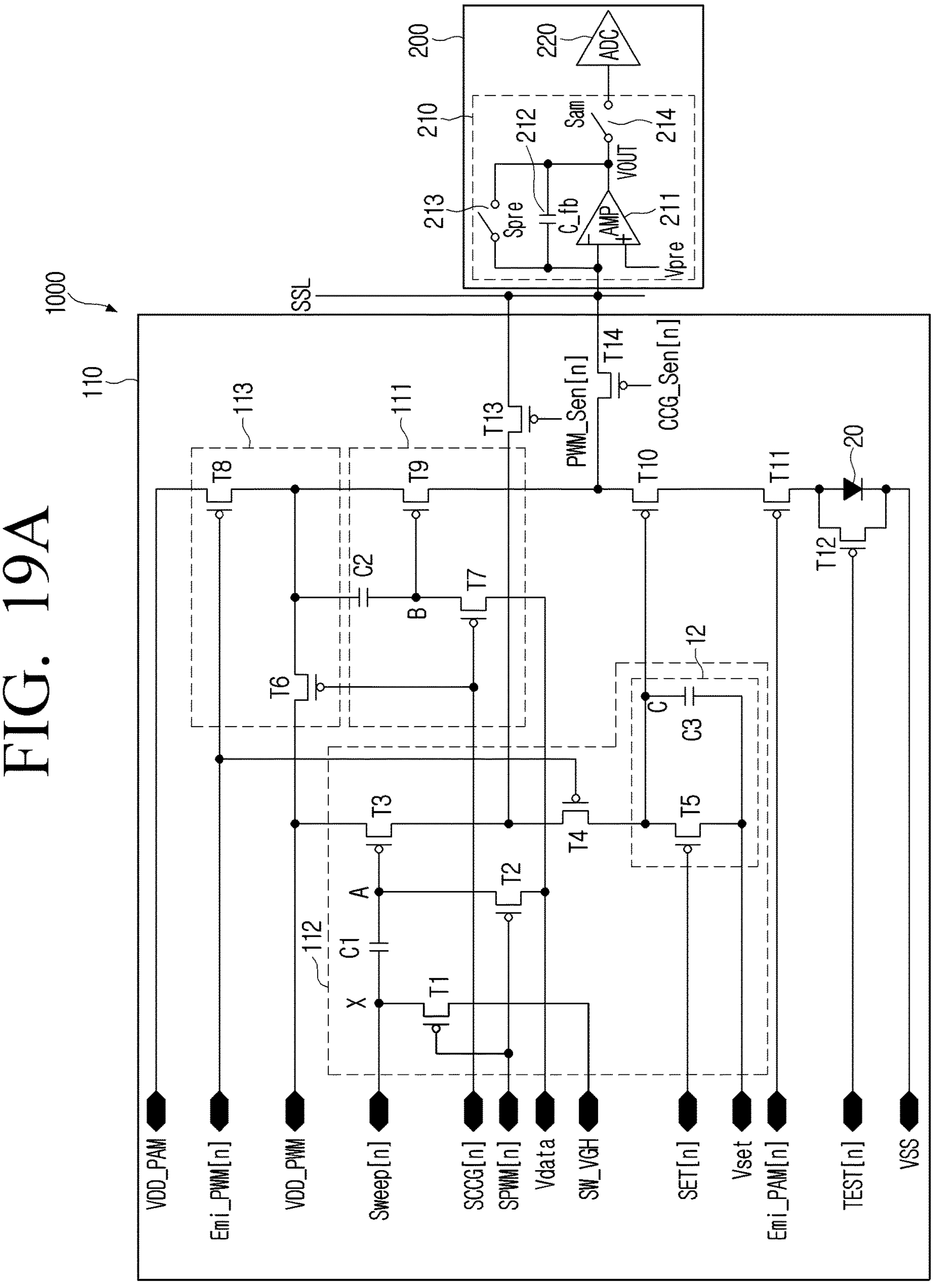
FIG. 19A is a detailed circuit diagram of sub pixel circuits and sensing units according to an embodiment.

FIG. 19A is a detailed circuit diagram of the sub pixel circuits 110 and the sensing unit 200 according to an embodiment.

The sub pixel circuits 110 shown in FIG. 19A are the same as the sub pixel circuits 110 of FIG. 10A, except that the transistor T1 for applying the high level voltage SW_VGH of the sweep signal to an input terminal of the sweep signal Sweep(n) during a data setting period.

The source terminal of the transistor T1 receives the high level voltage SW_VGH of the sweep signal, the gate terminal is connected to the scan signal SPWM(n) line, and the drain terminal is connected to the X node.

When the low-level scan signal SPWM(n) is applied during the data setting period, the transistor T1, as well as the transistor T2, are turned on. Therefore, while the PWM data voltage is applied to the A-node through the Vdata signal line, the voltage of the X-node is maintained at the high-level voltage SW_VGH of the sweep signal, and thus the above-described luminance non-uniformity and horizontal crosstalk problem may be solved.

Figure 19B:
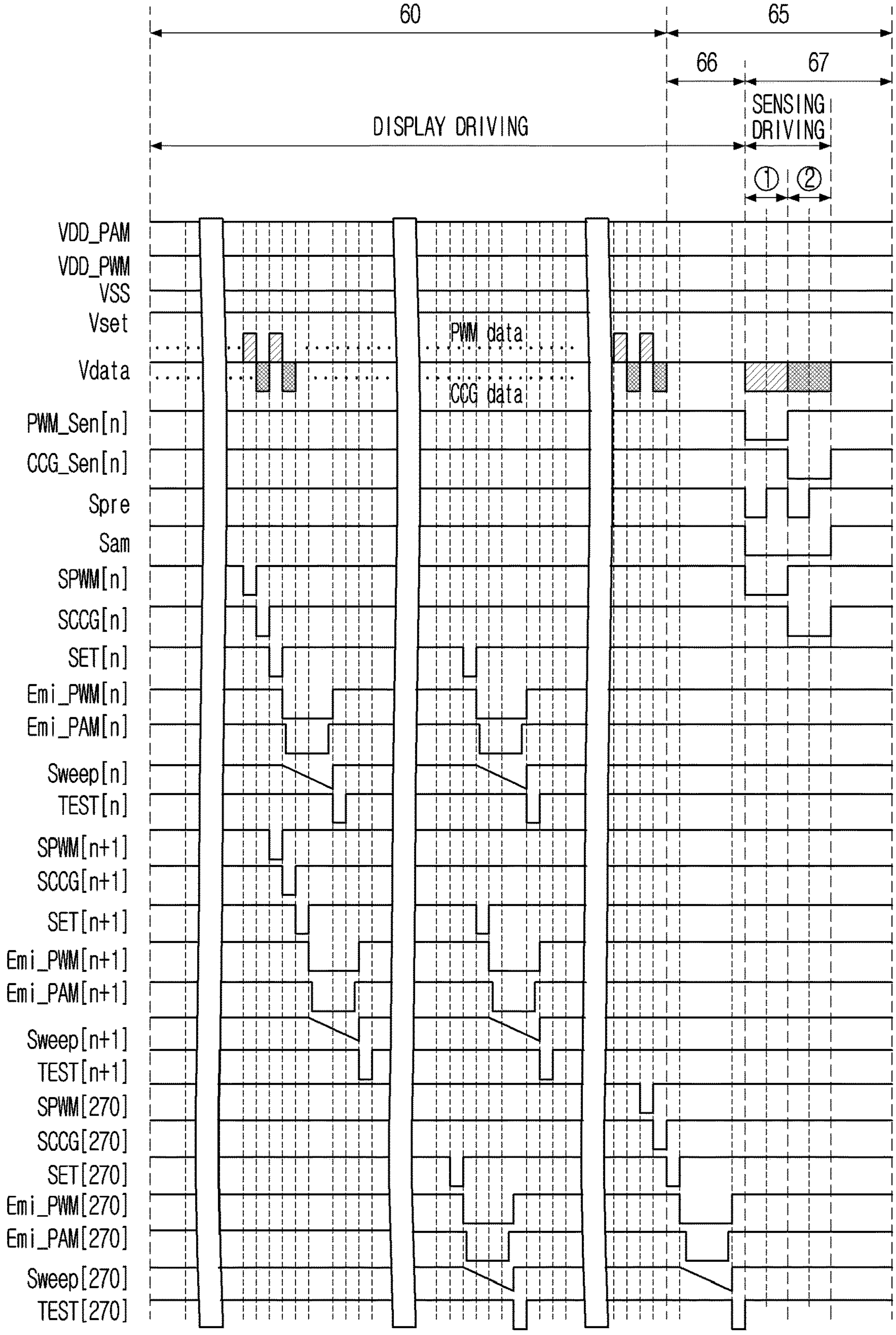
FIG. 19B is a driving timing diagram of the sub pixel circuits shown in FIG. 19A.

FIG. 19B is a driving timing diagram of the sub pixel circuits 110 of FIG. 19A, and is the same as the driving timing diagram of FIG. 10B. For convenience, the high level voltage SW_VGH of the sweep signal is not separately illustrated in FIG. 19B.

Figure 20A:
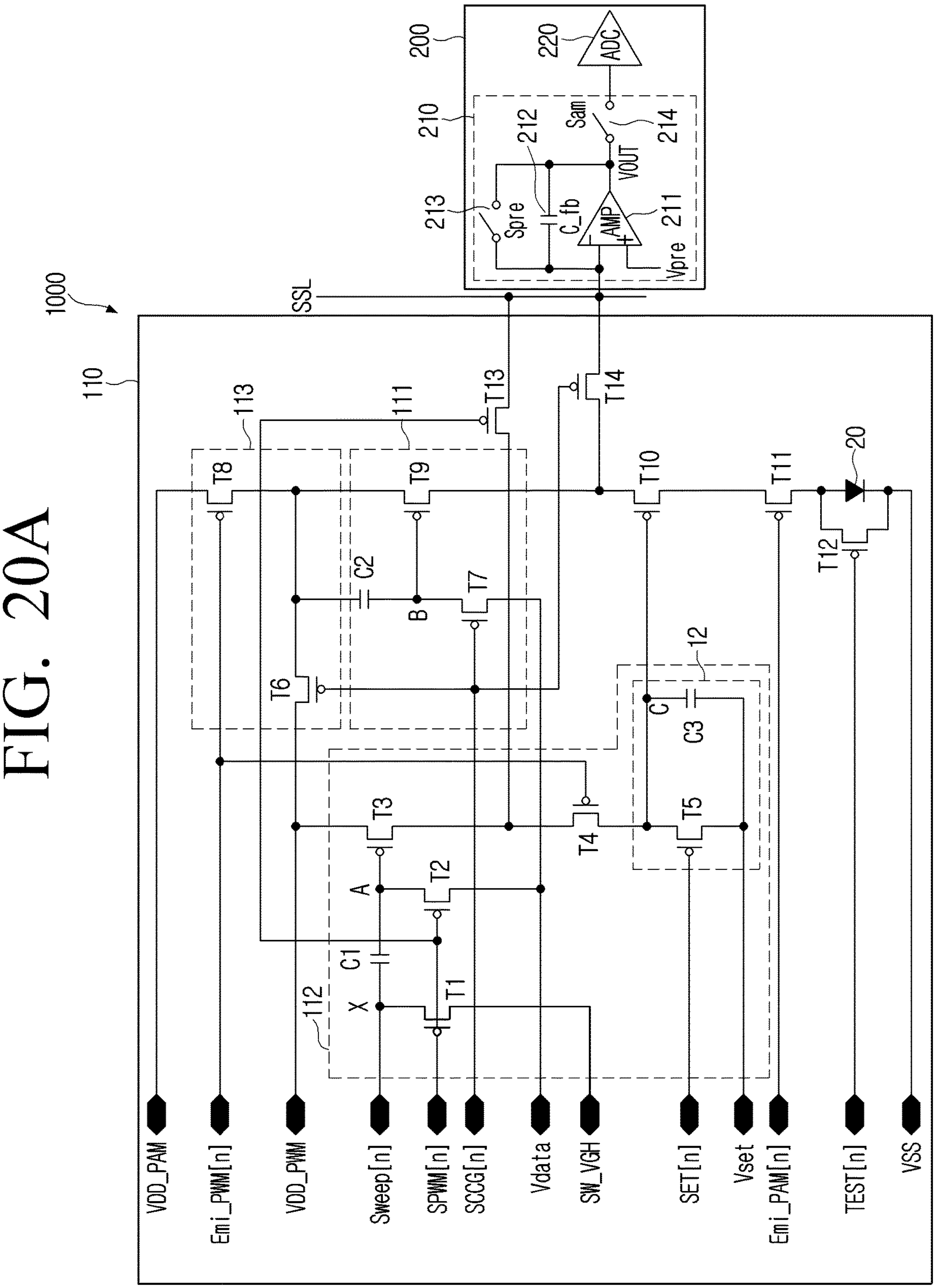
FIG. 20A is a detailed circuit diagram of sub pixel circuits and sensing units according to an embodiment.

FIG. 20A is a detailed circuit diagram of the sub pixel circuits 110 and the sensing unit 200 according to an embodiment.

The sub pixel circuits 110 shown in FIG. 20A are the same as the sub pixel circuits 110 of FIG. 11A, except that the transistor T1 for applying the high level voltage SW_VGH of the sweep signal to an input terminal of the sweep signal Sweep(n) during a data setting period.

The source terminal of the transistor T1 receives the high-level voltage SW_VGH of the sweep signal, the gate terminal is connected to the scan signal SPWM(n) line, and the drain terminal is connected to the X-node.

When the low-level scan signal SPWM(n) is applied during the data setting period, the transistor T1 as well as the transistor T2 are turned on. Therefore, while the PWM data voltage is applied to the A-node through the Vdata signal line, the voltage of the X-node is maintained at the high-level voltage SW_VGH of the sweep signal, and thus the above-described luminance non-uniformity and horizontal crosstalk problem may be solved.

Figure 20B:
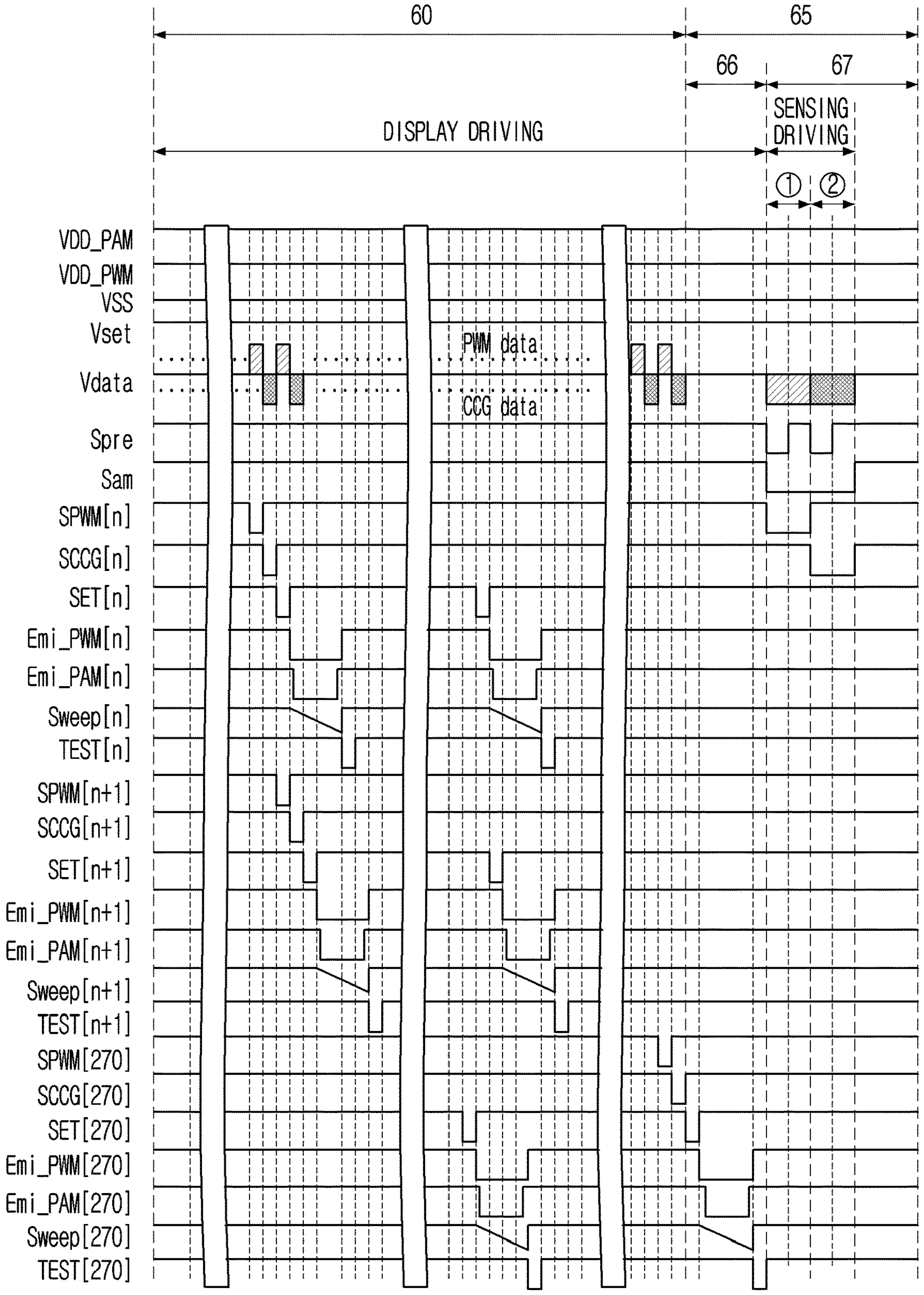
FIG. 20B is a driving timing diagram of the sub pixel circuits shown in FIG. 20A.

FIG. 20B is a driving timing diagram of the sub pixel circuits 110 shown in FIG. 20A, and is the same as the driving timing diagram of FIG. 11B. For convenience, the high-level voltage SW_VGH of the sweep signal is not shown separately in FIG. 20B.

Referring to FIG. 17A to FIG. 20B, the transistor T1 for improving luminance non-uniformity and horizontal crosstalk by a sweep load may be added to embodiments described above in FIGS. 8A to 11B, but an embodiment is not limited thereto.

In other words, for embodiments of FIGS. 12A, 13A, 14A and 15A, the problem of luminance non-conformity and horizontal crosstalk problems above may be solved by connecting the transistor T1 for applying the high level voltage SW_VGH of the sweep signal to the input terminal of the sweep signal Sweep(n) to the opposite terminal of the A node of the capacitor C1 during the data setting period.

Figure 21A:
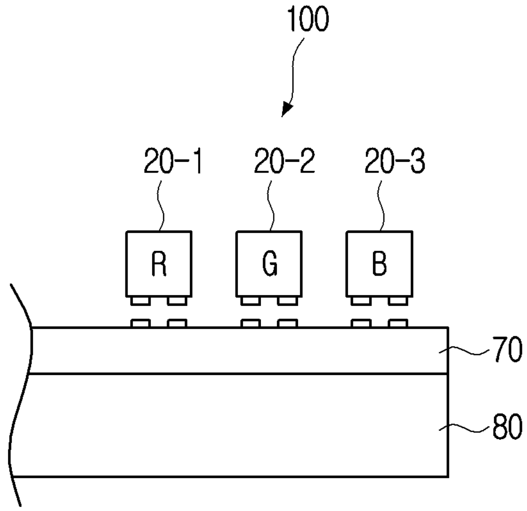
FIG. 21A is a cross-sectional view of a display panel according to an embodiment.

FIG. 21A is a cross-sectional view of the display panel 100 according to an embodiment. Referring to FIG. 21A, one pixel included in the display panel 100 is illustrated for convenience.

Referring to FIG. 21A, the display panel 100 may include a glass substrate 80, a TFT layer 70, and inorganic light emitting elements R, G, B (20-1, 20-2, and 20-3). The sub pixel circuit 110 described above may be embodied as a TFT, and may be included in the TFT layer 70 on the glass substrate 80.

Each of the inorganic light emitting elements R, G, B (20-1, 20-2, and 20-3) may be mounted on the TFT layer 70 to be electrically connected to the corresponding sub pixel circuit 110 to configure the sub pixel described above.

Although not illustrated, in the TFT layer 70, the sub pixel circuit 110 for providing a driving current to the inorganic light emitting elements (20-1, 20-2, 20-3) exists for each of the inorganic light emitting elements (20-1, 20-2, 20-3), and each of the inorganic light emitting elements (20-1, 20-2, 20-3) may be mounted or placed on the TFT layer 70, respectively, so as to be electrically connected with the corresponding sub pixel circuit 110.

Referring to FIG. 21A, the inorganic light emitting element R, G, B (20-1, 20-2, 20-3) is a micro LED in a flip chip type. An embodiment is not limited to thereto, and according to an embodiment, the inorganic light emitting elements R, G, B (20-1, 20-2, 20-3) may be a lateral type or a vertical type of micro LED.

Figure 21B:
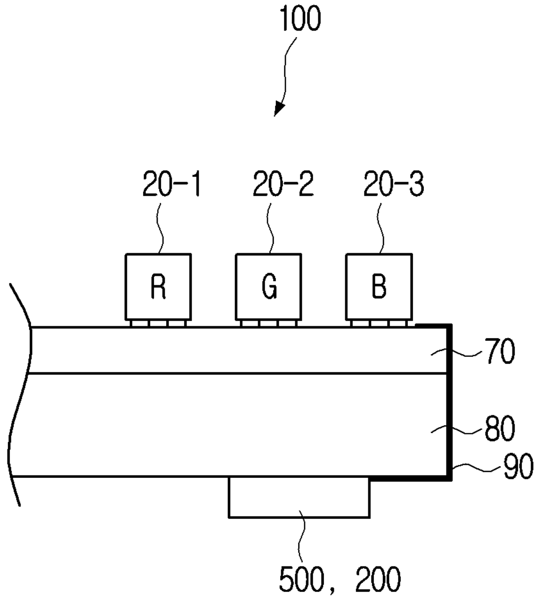
FIG. 21B is a cross-sectional view of a display panel according to an embodiment.

FIG. 21B is a cross-sectional view of the display panel 100 according to an embodiment.

Referring to FIG. 21B, the display panel 100 may include the TFT layer 70 formed on one surface of the glass substrate 80, the inorganic light emitting elements R, G, B (20-1, 20-2, 20-3) mounted on the TFT layer 70, the driving unit 500, the sensing unit 200, and a connection wire 90 for electrically connecting the sub pixel circuit 110 and the driving unit 500 and/or sensing unit 200 formed on the TFT layer 70.

As described above, according to an embodiment, at least some of the various circuits of the driving unit 500 may be implemented in a separate chip form to be arranged on a rear surface of the glass substrate 80 and may be connected to the sub pixel circuits 110 formed on the TFT layer 70 through the connection wire 90. According to an embodiment, the sensing unit 200 may also be disposed on the rear surface of the glass substrate 80, and may be connected to sub pixel circuits 110 formed in the TFT layer 70 through the connection wire 90.

Referring to FIG. 21B, the sub pixel circuits 110 included in the TFT layer 70 may be electrically connected to the driving unit 500 and/or sensing unit 200 through the connection wire 90 formed on an edge (or side) of the TFT panel (hereinafter, the TFT layer 70 and the glass substrate 80 in combination is called the TFT panel). The connection wire 90 may include at least a portion of the scan line SCL, the data line DL, and the sensing line SSL described above.

A reason of forming the connection wire 90 in the edge area of the display panel 100 to connect the sub pixel circuits 110 and the driving unit 500 and/or sensing unit 200 included in the TFT layer 70 is that, when connecting the sub pixel circuits 110 and the driving unit 500 and/or sensing unit 200 by forming a hole penetrating the glass substrate 80, there may be a problem such as crack in the glass substrate 80 due to the temperature difference between the manufacturing process of the TFT panel 70, 80 and the process of filling the hole with a conductive.

Figure 21C:
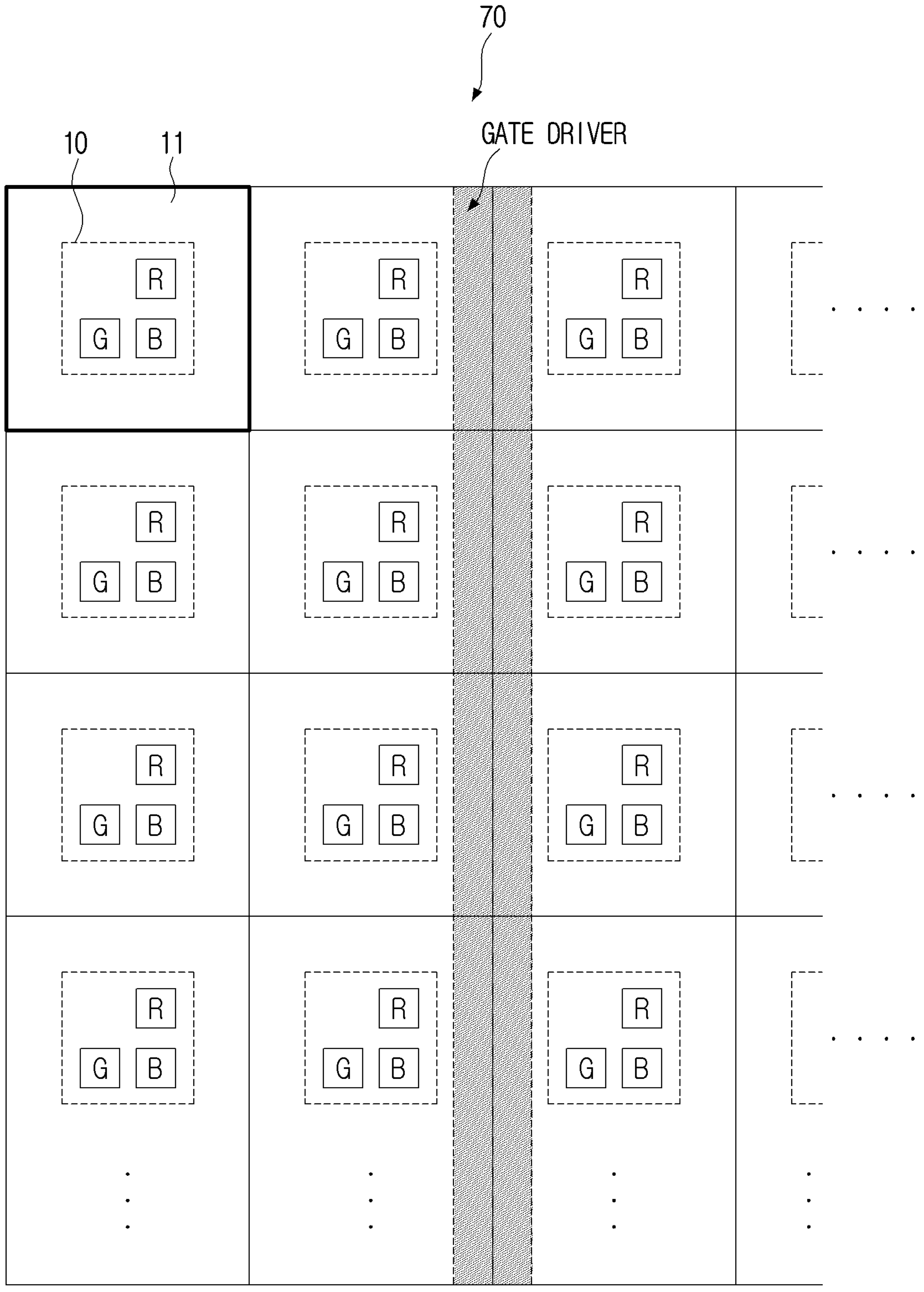
FIG. 21C is a plan view of a TFT layer according to an embodiment.

As described above, according to an embodiment, at least some of the various driving units and circuits of the driving unit 500 may be formed in the TFT layer with sub pixel circuits formed in the TFT layer in the display panel 100 and may be connected to the sub pixel circuits. FIG. 21C illustrates this embodiment.

FIG. 21C is a plan view of the TFT layer 70 according to an embodiment. Referring to FIG. 21C, there is a remaining area 11 other than an area (in this area, sub pixel circuits 110 corresponding to each of the R, G, B sub pixel circuits included in the pixel 10 are present) occupied by one pixel in the TFT layer 70.

In the TFT layer 70, remaining areas 11 are present and thus, some of the various driving units or circuits of the driving unit 500 described above may be formed on the remaining areas 11.

FIG. 21C illustrates an example in which the gate driving units described above are implemented in the remaining area 11 of the TFT layer 70. As such, a structure in which the gate driving units are formed inside the TFT layer 70 may be called a gate in panel (GIP) structure, but a name is not limited thereto.

FIG. 21C is merely one example, and a circuit which may be included in the remaining area 11 of the TFT layer 70 is not limited to the gate driving units. According to an embodiment, the TFT layer 70 may further include a demultiplexer (DeMUX) circuit for selecting R, G, and B sub pixel circuits, and an electro static discharge (ESD) protection circuit for protecting the sub pixel circuit 110 from the static electricity, a sweep voltage providing circuit, or the like.

Although the substrate on which the TFT layer 70 is formed is the glass substrate 80 was described as an example, an embodiment is not limited thereto. For example, the TFT layer 70 may be formed on a synthetic resin substrate. In this case, the sub pixel circuits 110 and the driving unit 500 and/or the sensing unit 200 of the TFT layer 70 may be connected through a hole passing through the synthetic resin substrate.

It has been described that the sub pixel circuits 110 are implemented in the TFT layer 70. However, an embodiment is not limited thereto. According to an embodiment, when the sub pixel circuits 110 are implemented, the pixel circuit chip in the form of an ultra-small micro-IC may be implemented in a sub pixel unit or pixel unit without using the TFT layer 70, and the pixel circuit chip may be mounted on the substrate. A position in which the sub pixel chip is placed may be, for example, around the corresponding inorganic light emitting element 20, but is not limited thereto.

It has been described that the gate drivers are formed in the TFT layer 70, but an embodiment is not limited thereto. According to an embodiment, gate drivers (e.g., scan driver, emission driver, sweep driver) or gate driver circuits for each row line constituting gate drivers (scan driver circuits for each row line, emission driver circuits for each row line, and row driver circuits for each row line) may be implemented as a gate driver chip or a gate driver circuit chips in the form of an ultra-small micro-IC, and the gate driver chip or the gate driver circuit chips may be mounted on the TFT layer 70.

According to various embodiments, the TFT forming the TFT layer (or the TFT panel) is not limited to a specific structure or type. In other words, the TFT recited in various examples may be implemented as a low temperature poly silicon (LTPS) TFT, an oxide TFT, a poly silicon or a-silicon TFT, an organic TFT, and a graphene TFT, or the like, and may be applied to a P type (or N-type) MOSFET in a Si wafer CMOS process.

The display panel 100 according to various embodiments may be applied to a wearable device, a portable device, a handheld derive as a single unit and various electronic products or electronic part products requiring a display.

The display panel 100 according to various embodiments may be applied to a small display device such as a personal computer monitor, a TV, or the like, and a large display device such as a digital signage, an electronic display, etc. through the assembly arrangement of the plurality of display panels 100.

According to various embodiments as described above, the wavelength of light emitted by the inorganic light emitting element may be prevented from being changed according to the gray scale. The stains on the image that may appear due to threshold voltage and mobility difference between driving transistors, or the forward voltage non-conformity of inorganic light emitting elements, may be easily compensated. In addition, the color correction is facilitated. In the case of forming a large-area display panel by combining the module-type display panels, or forming one large display panel, the stain compensation and color correction may be more easily performed. The effect of the drop of the driving voltage generated differently for each position of the display panel to the process of setting the data voltage may be compensated. An optimized driving circuit may be designed, and the inorganic light emitting element may be stably and efficiently driven.

Although embodiments have been described with reference to the drawings, various modifications and changes may be made by those of skill in the art from the above description. For example, suitable results may be obtained even when the described techniques are performed in a different order, or when components in a described electronic device, architecture, device, or circuit are coupled or combined in a different manner, or replaced or supplemented by other components or their equivalents.

What is claimed is:

1. A display apparatus comprising:

a display panel comprising:

a pixel array comprising pixels arranged in in a plurality of row lines, each of the pixels comprising a plurality of inorganic light emitting elements, and sub pixel circuits corresponding to inorganic light emitting elements of the pixel array;

a driving circuit configured to set an image data voltage sequentially to the sub pixel circuits based on a first driving voltage, and drive the sub pixel circuits so that a driving current corresponding to the set image data voltage is provided sequentially to the inorganic light emitting elements of the pixel array based on a second driving voltage;

a sensing circuit configured to sense a current flowing through a driving transistor included in each of the sub pixel circuits based on a specific voltage which is applied to the sub pixel circuits, and output sensing data corresponding to the sensed current; and a correction circuit configured to correct an image data voltage to be applied to each of the sub pixel circuits based on the sensing data, wherein the first driving voltage and the second driving voltage are applied to the sub pixel circuits through a first wiring and a second wiring, respectively, the first wiring and the second wiring being separate wirings, wherein the sub pixel circuits are driven in an order of a data setting period and a plurality of light emitting periods for each of the plurality of row lines, wherein the driving circuit is further configured to:

set the image data voltage to sub pixel circuits of a row line among the plurality of row lines in the data setting period, and drive the sub pixel circuits of the row line so that the driving current is provided to inorganic light emitting elements of the row line, in each of the plurality of light emitting periods, wherein the driving transistor comprises a first driving transistor and a second driving transistor, wherein each of the sub pixel circuits comprises:

a constant current generator circuit which comprises the first driving transistor, the constant current generator being configured to provide the driving current of a magnitude corresponding to a voltage difference between a source terminal and a gate terminal of the first driving transistor, to a corresponding inorganic light emitting element through the first driving transistor; and a pulse width modulation (PWM) circuit which comprises the second driving transistor, the PWM circuit being configured to control a time at which the driving current is provided to the corresponding inorganic light emitting element based on a voltage difference between the source terminal and the gate terminal of the second driving transistor, wherein the image data voltage comprises a constant current generator data voltage and a PWM data voltage, and wherein the driving circuit is further configured to set the constant current generator data voltage and the PWM data voltage, respectively, to the gate terminal of the first driving transistor and the second driving transistor during the data setting period.

2. The display apparatus of claim 1, wherein the driving circuit is further configured to:

set the image data voltage to the sub pixel circuits in an order of the plurality of row lines, and drive the sub pixel circuits so that the driving current corresponding to the set image data voltage is provided in the order of the plurality of row lines to the inorganic light emitting elements of the pixel array.

3. The display apparatus of claim 1, wherein a first light emitting period among the plurality of light emitting periods is temporally consecutive with the data setting period, and wherein the plurality of light emitting periods are spaced apart by a preset time interval.

4. The display apparatus of claim 1, wherein the first driving voltage is applied to the source terminal of the first driving transistor and the second driving transistor during the data setting period, and wherein the second driving voltage is applied to the source terminal of the first driving transistor and the first driving voltage is applied to the source terminal of the second driving transistor during the plurality of light emitting periods.

5. The display apparatus of claim 4, wherein each of the sub pixel circuits further comprises a driving voltage changing circuit, and wherein the driving circuit is further configured to control the driving voltage changing circuit to apply the first driving voltage to the source terminal of the first driving transistor in the data setting period and apply the second driving voltage to the source terminal of the first driving transistor in the plurality of light emitting periods.

6. The display apparatus of claim 5, wherein the constant current generator circuit further comprises:

a capacitor connected between the source terminal and the gate terminal of the first driving transistor, and wherein the voltage difference between the source terminal and the gate terminal of the first driving transistor is maintained through the capacitor regardless of change in a driving voltage applied to the source terminal of the first driving transistor.

7. The display apparatus of claim 1, wherein each of the sub pixel circuits further comprises a first transistor comprising a gate terminal connected to a drain terminal of the second driving transistor and a source terminal connected to a drain terminal of the first driving transistor in the plurality of light emitting periods, wherein the constant current generator circuit is further configured to provide the driving current flowing through the first driving transistor to the inorganic light emitting element while the first transistor is turned on, and wherein the PWM circuit is further configured to turn off the first transistor, based on the second driving transistor being turned on based on a sweep voltage applied in a state where the PWM data voltage is set to the gate terminal of the second driving transistor.

8. The display apparatus of claim 7, wherein the PWM circuit comprises a reset circuit to turn on the first transistor before each of the plurality of light emitting periods starts.

9. The display apparatus of claim 1, wherein the specific voltage comprises a first specific voltage applied to the constant current generator circuit and a second specific voltage applied to the PWM circuit, and wherein the sensing circuit is further configured to:

sense a first current flowing through the first driving transistor based on the first specific voltage and output first sensing data corresponding to the first current, and sense a second current flowing through the second driving transistor based on the second specific voltage and output second sensing data corresponding to the second current.

10. The display apparatus of claim 9, wherein each of the sub pixel circuits further comprises:

a second transistor to transfer the first current to the sensing circuit; and a third transistor to transfer the second current to the sensing circuit, and wherein the each of the sub pixel circuits is further configured to:

provide the first current to the sensing circuit through the second transistor which is turned-on while the first specific voltage is applied to the constant current generator circuit, and provide the second current to the sensing circuit through the third transistor which is turned-on while the second specific voltage is applied to the PWM circuit.

11. The display apparatus of claim 9, wherein the correction circuit is further configured to correct the constant current generator data voltage based on the first sensing data and the PWM data voltage based on the second sensing data.

12. The display apparatus of claim 1, wherein the sensing circuit is further configured to sense the current flowing through the driving transistor based on the specific voltage applied in a blanking interval of one image frame.

13. The display apparatus of claim 1, wherein the driving circuit is further configured to apply the specific voltage to sub pixel circuits corresponding to some row lines among the plurality of row lines for each image frame.

* * * * *